US007023868B2

(12) United States Patent
Rabenko et al.

(10) Patent No.: US 7,023,868 B2
(45) Date of Patent: Apr. 4, 2006

(54) VOICE GATEWAY WITH DOWNSTREAM VOICE SYNCHRONIZATION

(75) Inventors: Theodore F. Rabenko, Duluth, GA (US); David Hartman, Irvine, CA (US); James C. H. Thi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1110 days.

(21) Appl. No.: 09/737,175

(22) Filed: Dec. 13, 2000

(65) Prior Publication Data

US 2001/0033583 A1 Oct. 25, 2001

Related U.S. Application Data

(63) Continuation-in-part of application No. 09/548,400, filed on Apr. 13, 2000, now Pat. No. 6,765,931.

(60) Provisional application No. 60/170,592, filed on Dec. 13, 1999, provisional application No. 60/170,595, filed on Dec. 13, 1999, provisional application No. 60/160,124, filed on Oct. 18, 1999, provisional application No. 60/136,685, filed on May 28, 1999, provisional application No. 60/129,134, filed on Apr. 13, 1999.

(51) Int. Cl.
*H04L 12/28* (2006.01)
*H04L 12/58* (2006.01)
*H04L 7/00* (2006.01)

(52) U.S. Cl. .................. 370/419; 370/516; 375/354

(58) Field of Classification Search ............ 370/413, 370/419–420, 476, 503, 516, 412; 379/93.05, 379/387.01; 375/354, 362–363

See application file for complete search history.

(56) References Cited

U.S. PATENT DOCUMENTS

| 4,815,109 | A | * | 3/1989 | Kao ........................... 375/373 |
| 5,204,676 | A | * | 4/1993 | Herrmann .................... 341/61 |
| 5,790,538 | A | * | 8/1998 | Sugar .......................... 370/352 |
| 6,169,747 | B1 | * | 1/2001 | Sartain et al. ............... 370/468 |
| 6,829,244 | B1 | * | 12/2004 | Wildfeuer et al. .......... 370/412 |

FOREIGN PATENT DOCUMENTS

| WO | WO 99/35876 | 7/1999 |
| WO | WO 99/59279 | 11/1999 |

* cited by examiner

*Primary Examiner*—Seema S. Rao
*Assistant Examiner*—Kevin C. Harper
(74) *Attorney, Agent, or Firm*—Christie, Parker & Hale, LLP

(57) ABSTRACT

A network gateway is configured to facilitate on line and off line bi-directional communication between a number of near end data and telephony devices with far end data termination devices via a hybrid fiber coaxial network and a cable modem termination system. The described network gateway combines a QAM receiver, a transmitter, a DOCSIS MAC, a CPU, a voice and audio processor, a voice synchronizer, an Ethernet MAC, and a USB controller to provide high performance and robust operation. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

26 Claims, 39 Drawing Sheets

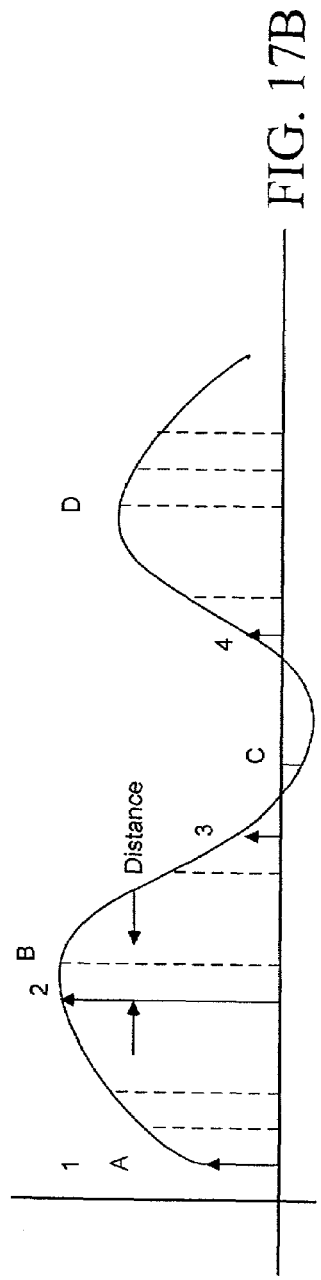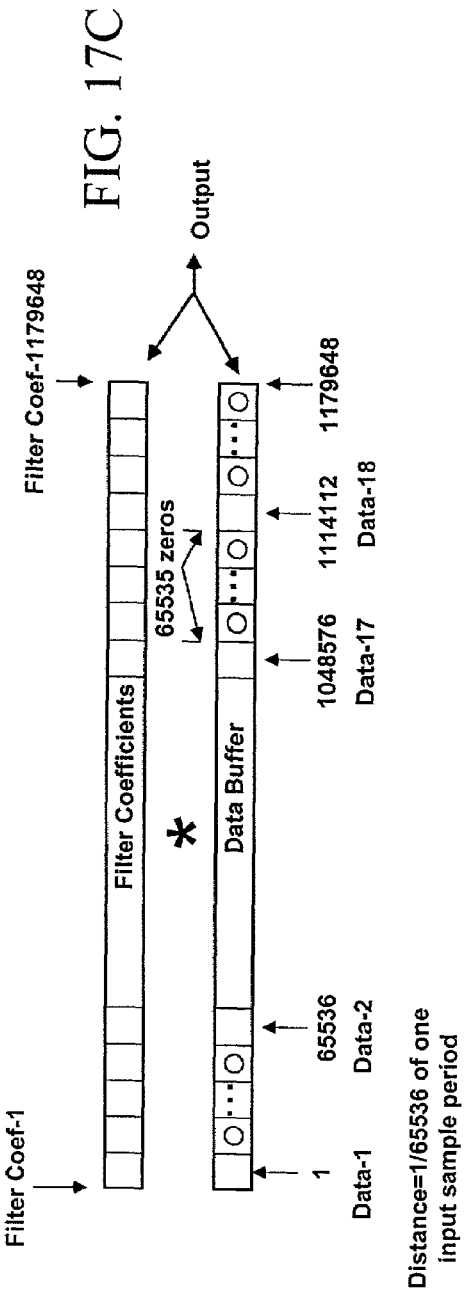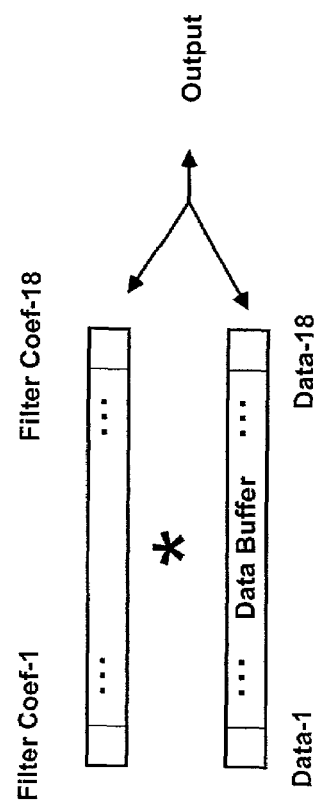

US 7,023,868 B2

VOICE GATEWAY WITH DOWNSTREAM VOICE SYNCHRONIZATION

CROSS-REFERENCE TO RELATED APPLICATION(S)

The present application is a continuation-in-part of patent application Ser. No. 09/548,400, filed Apr. 13, 2000, now U.S. Pat. No. 6,765,931, which claims priority to provisional Application No. 60/129,134, filed Apr. 13, 1999, Application No. 60/136,685, filed May 28, 1999, and Application No. 60/160,124, filed Oct. 18, 1999, Application No. 60/170,595, filed Dec. 13, 1999 and Application No. 60/170,592, filed Dec. 13, 1999. The priority of these applications are hereby claimed under 35 U.S.C. §§119(e), 120. These applications are expressly incorporated herein by referenced as though fully set forth in full.

FIELD OF THE INVENTION

The present invention relates generally to telecommunications systems, and more particularly, to a system for interfacing telephony devices with DOCSIS compatible networks.

BACKGROUND

Traditional dial-up modems provide online access through the public telephone network at up to 56 Kbps (equal to 56,000 bits per second). A cable modem, on the other hand, provides users with high-speed Internet access through a cable television network. Cable modem is capable of providing data rates as high as 56 Mbps, and is thus suitable for high speed Internet access, digital television (such as pay-per-view) and digital telephony.

SUMMARY OF THE INVENTION

In one aspect of the present invention, a method of synchronizing data clocked by a first clock to a second clock includes generating a clock error signal as a function of one or more data control flags, and fractionally resampling the data as a function of the offset.

In another embodiment of the present invention, a synchronization circuit, includes an error generation unit that generates a clock error signal as a function of an average far end sampling rate and a near end sampling rate and a sample tracker adapted to receive sampled data packets, wherein the sample tracker fractionally resamples the sampled data as a function of the clock error signal.

In a further aspect of the present invention, a network gateway adapted to exchange voice signals between a network line at a first clock frequency and a packet based network at a second clock frequency, includes a network port to interface with a packet based network; a telephony port to interface with a telephony device; a processor coupled to each of the ports and a voice synchronizer, coupled between the network and telephony ports. The voice synchronizer includes an error generation unit for generating a clock error signal in accordance with the ratio of the first and second clocks and a sample tracker, that receives sampled data packets, and fractionally resamples the sampled data as a function of the clock error signal.

DESCRIPTION OF THE DRAWINGS

These and other features, aspects, and advantages of the present invention will become better understood with regard to the following description, appended claims, and accompanying drawings where:

FIG. 14A is a block diagram of a timing recovery system for synchronizing the timing regeneration circuit clock of the network gateway to the CMTS clock in accordance with a preferred embodiment of the present invention;

FIG. 17B is a timing diagram illustrates the offset in input and output sample counts in an buffer overflow condition;

FIG. 17C graphically illustrates the zero buffer padding required between data points in the data buffer and the low pass filter coefficients which, when applied to the samples stored in the buffer yield the resampled signal;

FIG. 17D graphically illustrates the regeneration of the desired resampled output with a reduced number of filter coefficients;

DETAILED DESCRIPTION

Figure 1:
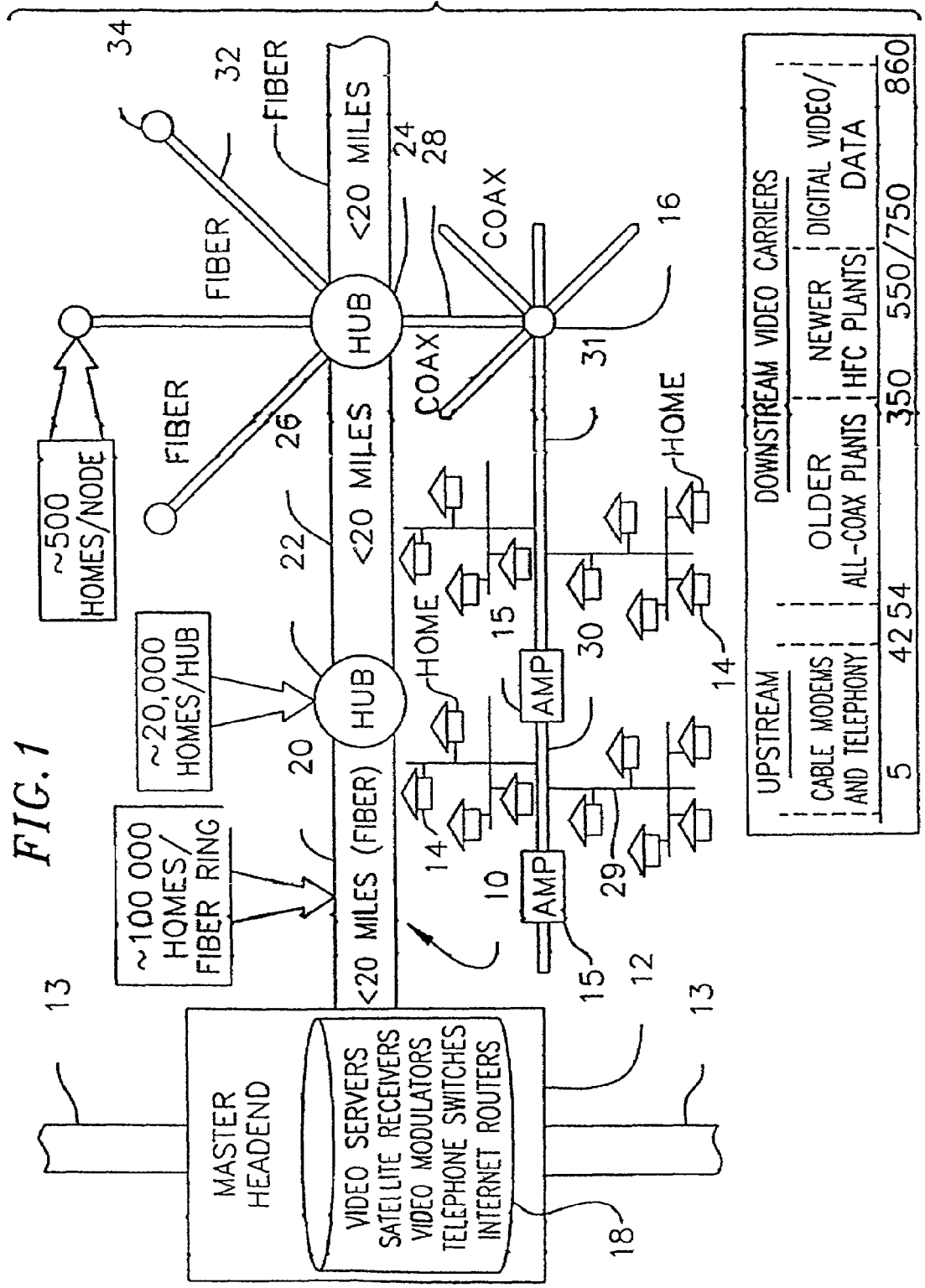
FIG. 1 is a schematic diagram of a hybrid fiber coaxial (HFC) network showing typical pathways for data transmission between the headend (which contains the cable modem termination system) and a plurality of homes (each of which contain a cable modem)

In an exemplary embodiment of a cable modem system, a headend or cable modem termination system (CMTS) is located at a cable company facility and functions as a modem which services a large number of subscribers. Each subscriber has a cable modem (CM). Thus, the cable modem termination system must be capable of facilitating bidirectional communication with any desired one of the plurality of cable modems.

As used herein, the cable modem termination system (CMTS) is defined to include that portion of a headend which facilitates communication with a number of cable modems. A typical cable modem termination system includes a burst receiver, a continuous transmitter and a medium access control (MAC).

The cable modem termination system communicates with the cable modems via a hybrid fiber coaxial (HFC) network, wherein optical fiber provides communication to a number of fiber nodes and each fiber node typically serves approximately 500 to 2,000 subscribers, which communicate with the node via coaxial cable. The subscribers communicate with the fiber node via a common or shared coaxial cable.

The HFC network of a cable modem system utilizes a point-to-multipoint topology to facilitate communication between the cable modem termination system and the cable modems. Frequency domain multiple access (FDMA)/time division multiplexing (TDM) is used to facilitate communication from the cable modem termination system to each of the cable modems, i.e., in the downstream direction. Frequency domain multiple access (FDMA)/time domain multiple access (TDMA) is used to facilitate communication from each cable modem to the cable modem termination system, i.e., in the upstream direction.

The cable modem termination system includes a downstream modulator for facilitating the transmission of data communications to the cable modems and an upstream demodulator for facilitating the reception of data communications from the cable modems.

The downstream modulator of the cable modem termination system generally utilizes either 64 QAM or 256 QAM in a frequency band of 54 MHz to 860 MHz to provide a data rate of up to 56 Mbps. Since the upstream channel has a much lower data rate requirement, the upstream demodulator may use either QPSK or 16 QAM in a frequency range of 5 MHz to 42 MHz to provide a data rate of up to 10 Mbps.

Similarly, each cable modem includes an upstream modulator for facilitating the transmission of data to the cable modem termination system and a downstream demodulator for receiving data from the cable modem termination system. In the described exemplary embodiment, the upstream modulator of each cable modem typically uses either QPSK or 16 QAM within the 5 MHz to 42 MHz bandwidth of the upstream demodulator and the downstream demodulator of each cable modem may use either 64 QAM or 256 QAM in the 54 MHz to 860 MHz bandwidth of the downstream modulator (in North America). As those skilled in the art will appreciate, other modulation schemes may be used depending on the application.

In order to accomplish TDMA for upstream communication, time slots may be assigned to each cable modem within which cable modems having a message to send to the cable modem termination system. The assignment of such time slots is accomplished by providing a request contention area in the upstream data path within which the cable modems are permitted to contend in order to place a message which requests additional time in the upstream data path for the transmission of their message. The cable modem termination system responds to these requests by assigning time slots to the cable modems making such a request, so that as many of the cable modems as possible may transmit their messages to the cable modem termination system utilizing TDMA and so that the transmissions are performed without undesirable collisions.

Because of the use of TDMA, the cable modem termination system uses a burst receiver, rather than a continuous receiver, to receive packets of information from the cable modems via upstream communications. As those skilled in the art will appreciate, a continuous receiver may be utilized where generally continuous communications (as opposed to burst communications as in the present invention) are performed, so as to substantially maintain timing synchronization between the cable modem transmitter and the CMTS receiver, for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

However, the burst communications inherent to TDMA systems entail periodic and frequent reacquisition of the signal. That is, during TDMA communications, the signal is reacquired for each separate burst transmission being received.

Referring now to FIG. 1, a hybrid fiber coaxial (HFC) network 10 facilitates the transmission of data between a headend 12, which includes at least one cable modem termination system, and a number of homes 14, each of which contains a cable modem. Such hybrid fiber coaxial networks are commonly utilized by cable providers to provide Internet access, cable television, pay-per-view and the like to subscribers.

Approximately 500 homes 14 are in electrical communication with each node 16, 34 of the hybrid fiber coaxial network 10, typically via coaxial cables 29, 30, 31. Amplifiers 15 facilitate the electrical connection of the more distant homes 14 to the nodes 16, 34 by boosting the electrical signals so as to desirably enhance the signal-to-noise ratio of such communications and by then transmitting the electrical signals over coaxial cables 30, 31. Coaxial cable 29 electrically interconnects the homes 14 with the coaxial cables 30, 31, which extend between amplifiers 15 and nodes 16, 34. Each node 16, 34 is electrically connected to a hub 22, 24, typically via an optical fiber 28, 32. The hubs 22, 24 are in communication with the headend 12, via optical fibers 20, 26. Each hub is typically capable of facilitating communication with approximately 20,000 homes 14.

The optical fibers 20, 26 extending intermediate the headend 12 and each hub 22, 24 defines a fiber ring which is typically capable of facilitating communication between approximately 100,000 homes 14 and the headend 12. The headend 12 may include video servers, satellite receivers, video modulators, telephone switches and/or Internet routers 18, as well as the cable modem termination system. The headend 12 communicates via transmission line 13, which may be a T1 or T2 line, with the Internet, other headends and/or any other desired device(s) or network.

Figure 2:
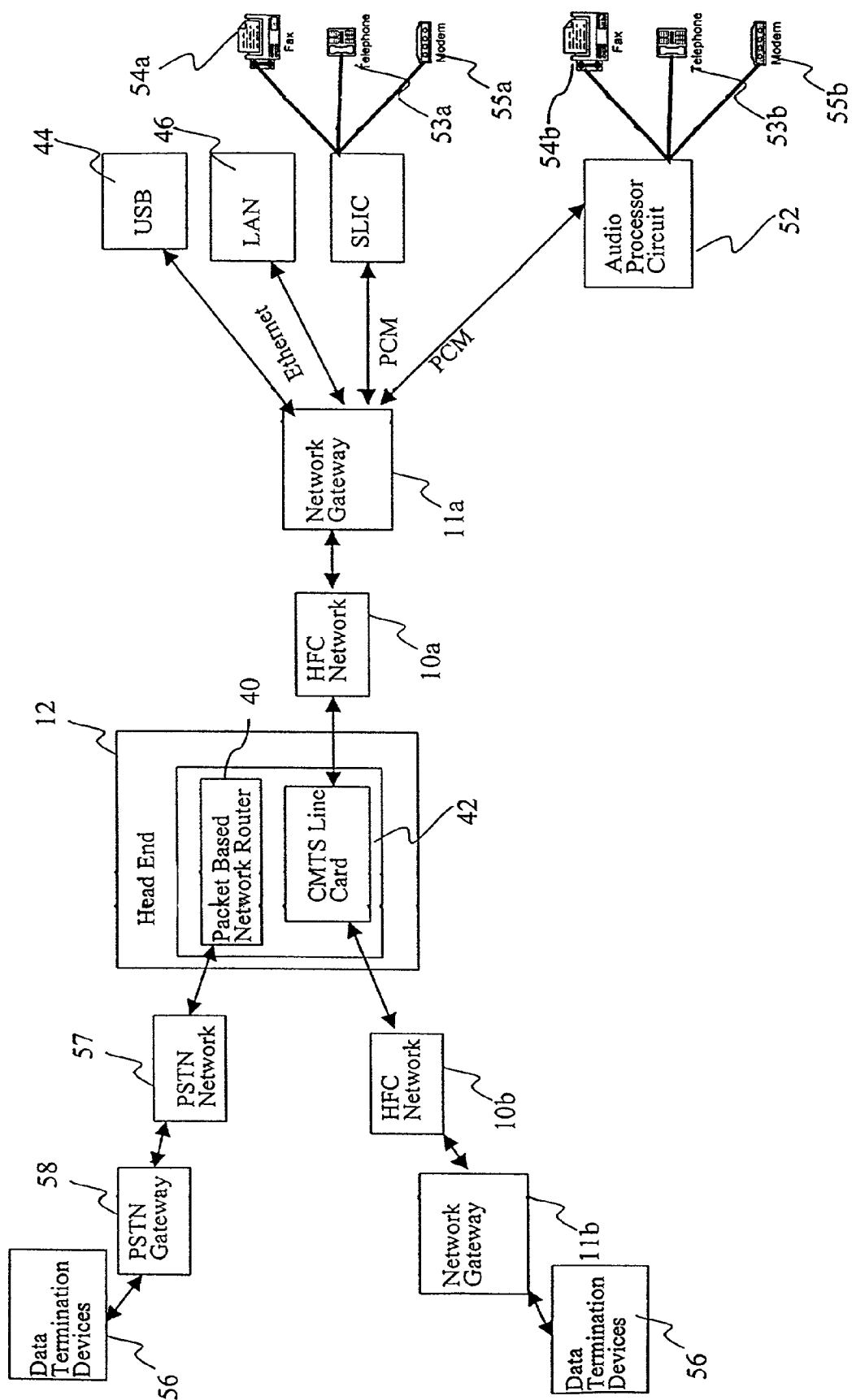
FIG. 2 is a simplified block diagram of a network gateway integrated into a cable modem system wherein the network gateway interfaces a plurality of packet based and circuit switched systems with a cable modem termination system CMTS), defined as a line card, disposed at the headend.

In an exemplary embodiment of the present invention, a network gateway may facilitate on line and off line bi-directional communication between a number of near end data or telephony devices and far end data termination devices via a cable modem termination system. An exemplary topology is shown in FIG. 2 with a network gateway 11a providing an interface to HFC network 10a for a telephone 53a, fax machine 54 and modem 53c through a subscriber loop interface circuit (SLIC) 50. The network gateway 11a also provides an interface to the 10a HFC network for a telephone 53*b*, a fax machine 54*b* and a modem 55*b* through our audio processor 52. A local area network (LAN) 46 and a universal synchronous bus (USB) 44 can also be provided access to the HFC network 10*a* via the network gateway 11*a*. The HFC network is coupled to a CMTS line card 42 in the CMTS 12. The CMTS card 12 is coupled a packet based network router 40 to determine whether the communication will be transported via a far end HFC network 10*b*, a far end PSTN network 57 or the Internet 43. In the case of a far end PSTN network a PSTN gateway 58 provides an interface between a far end PSTN device 56 and a PSTN network 57 connected to the CMTS 12.

In the case of a far end HFC network, a network gateway 11*b* provides an interface between the far end data termination devices 56B and the far end HFC network 10*b* connected to the CMTS 12. As those skilled in the art will appreciate, the far end data termination devices 56 can include a variety of telephony and data devices including a telephone, fax machine, and modem via a SLIC or audio processor, as well as a LAN or USB.

A packet based network router 40 facilitates communication between the near end data devices and off line far end data terminating devices 56 via a circuit switched networks such as the public switched telephone network (PSTN) 57 and a PSTN gateway 58. Data termination devices include by way of example, analog and digital phones, ethernet phones, Internet Protocol phones, fax machines, data modems, cable modems, interactive voice response systems, PBXs, key systems, and any other conventional telephony devices known in the art. One of skill in the art will appreciate that the described exemplary network gateway is not limited to a telephony interface to the HFC network, but rather may interface with a variety of communication media such as for example, asymmetric digital subscriber line (ADSL), DSL, T1 or other networks known in the art. Therefore, the described hybrid fiber coaxial network 10*a* is by way of example and not limitation.

Figure 3:
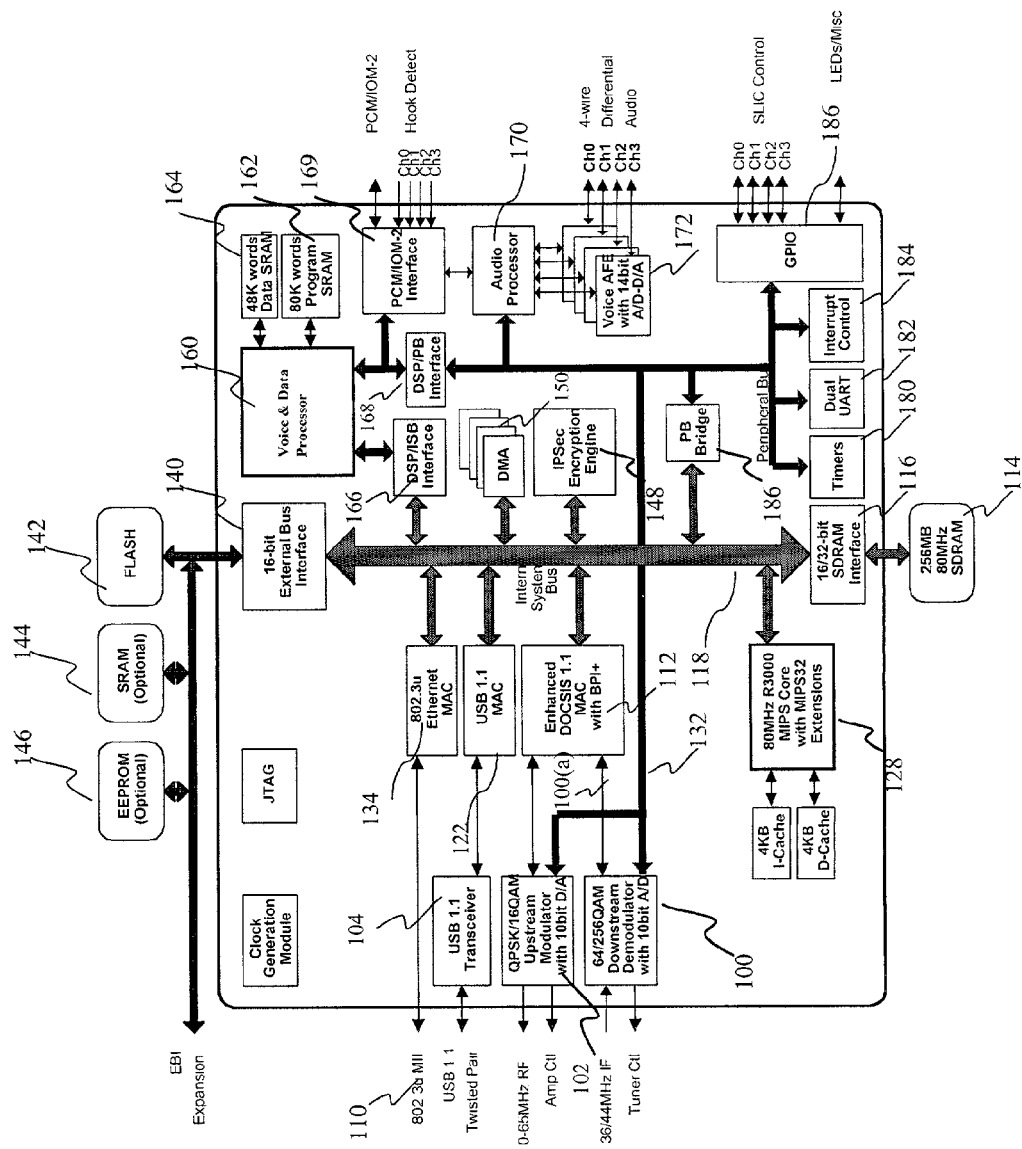
FIG. 3 is a is a system block diagram of an exemplary network gateway in accordance with a preferred embodiment of the present invention.

An exemplary embodiment of the network gateway is shown schematically in FIG. 3. The described exemplary embodiment may provide a highly integrated solution implemented single chip that is compliant with the Data Over Cable Service Interface Specification (DOCSIS). DOCSIS was developed to ensure that cable modem equipment built by a variety of manufacturers is compatible, as is the case with traditional dial-up modems. The described exemplary embodiment can provide integrated functions for communicating with the CMTS. For example, a QPSK upstream modulator 102 transmits data to the far end data terminating device, a QAM downstream demodulator 100 receives data from the far end data terminating device via a CMTS, and a QPSK out of band downstream demodulator 106 receives out of band MPEG-2 encoded messages from the CMTS.

In addition, the described exemplary embodiment can support multiple inputs in accordance with a variety of protocols. For example, a universal serial bus transceiver 104 provides transparent bi-directional IP traffic between devices operating on a USB such as for example a PC workstation, server printer or other similar devices and the far end data terminating device. Additionally, an I.E.E 802.3 compliant media independent interface (MII) 110 in conjunction with an Ethernet MAC 134 also provide bi-directional data exchange between devices such as, for example a number of PCs and or Ethernet phones and the far end data terminating device. A voice and data processor 160 is used for processing and exchanging voice, as well as fax and modem data between packet based networks and telephony devices.

The QAM downstream demodulator 100 may utilize either 64 QAM or 256 QAM in the 54 to 860 MHz bandwidth to interface with the CMTS. The QAM downstream demodulator 100 accepts an analog signal centered at the standard television IF frequencies, amplifies and digitizes the signal with an integrated programable gain amplifier and A/D converter. The digitized signal is demodulated with recovered clock and carrier timing. Matched filters and then adaptive filters remove multi-path propagation effects and narrowband co-channel interference. Soft decisions are then passed off to an ITU-TJ. 83 Annex A/B/C compatible decoder. The integrated decoder performs error correction and forwards the processed received data, in either parallel or serial MPEG-2 format to a DOCSIS Media Access Controller (MAC) 112.

The output of the downstream demodulator 100 is coupled to the DOCSIS MAC 112. The DOCSIS MAC 112 may include baseline privacy encryption and decryption as well as robust frame acquisition and multiplexing with MPEG-2-TS compliant video and audio streams. The DOCSIS MAC 112 implements the downstream portions of the DOCSIS protocol. The DOCSIS MAC 112 extracts DOCSIS MAC frames from MPEG-2 frames, processes MAC headers, and filters and processes messages and data.

Downstream data packets and message packets may be then placed in system memory 114 by a SDRAM interface 116 via the internal system bus 118. The SDPAM interface 116 preferably interfaces to a number of off the shelf SDRAMs which are provided to support the high bandwidth requirements of the Ethernet MAC 112 and other peripherals. The SDRAM interface 116 may support multiple combinations of 8, 16 or 32 bit wide SDRAMs, allowing for external data storage in the range of about 2 to 32 MBytes. The DOCSIS MAC 112 includes a number of direct memory access (DMA) channels for fast data access to and from the system memory 114 via the internal system bus 118.

The upstream modulator 102 provides an interface with the CMTS. The upstream modulator 102 may be configured to operate with numerous modulation schemes including QPSK and 16-QAM. The upstream modulator 102 supports bursts or continuous data, provides forward error correction (FEC) encoding and pre-equalization, filters and modulates the data stream and provides a direct 0–65 MHz analog output.

The DOCSIS MAC 112 can also implement the upstream portions of the DOCSIS protocol before transmission by the upstream modulator 102. The DOCSIS MAC 112 receives data from one of the DMA channels, requests bandwidth and frames the data for TDMA with other modems on the same upstream frequency.

The DOCSIS MAC interfaces with the MIPS core 128 via the ISB 118. An exemplary embodiment of the MIPS core 128 includes a high performance CPU operating at a speed of at least 80 MHz with 32-bit address and data paths. The MIPS core includes two way set associative instruction and data caches on the order of about 4 kbytes each. The MIPS core 128 can provide standard EJTAG support with debug mode, run control, single step and software breakpoint instruction as well as additional optional EJTAG features.

The upstream modulator 102 and the downstream demodulator 100 are controlled by the MIPS core 128 via a serial interface which is compatible with a subset of the Motorola M-Bus and the Philips I$^2$C bus. The interface consists of two signals, serial data (SDA) and serial clock (SCL), which may control a plurality of devices on a common bus. The addressing of the different devices may be accomplished in accordance with an established protocol on the two wire interface.

The described exemplary embodiment of the network gateway includes a full-speed universal serial bus (USB) transceiver 1104 and USB MAC 122 which is compliant with the USB 1.1 specification. The USB MAC 122 provide concurrent operation of control, bulk, isochronous and interrupt endpoints. The USB MAC 122 also can support standard USB commands as well as class/vendor specific commands. The USB MAC 122 include integrated RAM which allows flexible configuration of the device. Two way communication of information to a device operating on a USB can be provided, such as for example a PC on a USB 1.1 compliant twisted pair. The USB MAC 122 can be arranged for hardware fragmentation of higher layer packets from USB packets with automatic generation and detection of zero length USB packets. The USB MAC 122 may include DMA channels which are used to communicate received data to the system memory 114 via the internal system bus 118. Data stored in system memory 114 may then be processed and communicated to the cable modem termination system (not shown) via the DOCSIS MAC 112 and the upstream modulator 102. Similarly data received from the cable modem termination system and processed by the downstream demodulator 100 and stored in system memory as higher layer packets can be retrieved by the USB MAC 122 via the ISB 118 and assembled into USB packets with automatic generation of zero length USB packets. USB packets may then be communicated to the external device operating on the USB via the USB transceiver 104.

A media independent interface (MII) 110 can provide bi-directional communication with devices such as for example a personal computer (PC) operating on an Ethernet. The media independent interface 110 can forward data to and receive information from the Ethernet MAC 134. The Ethernet MAC 134 can also perform all the physical layer interface (PHY) functions for 100BASE-TX full duplex or half-duplex Ethernet as well as 10BBASE-T full or half duplex. The Ethernet MAC 134 can also decode the received data in accordance with a variety of standards such as for example 4B5b, MLT3, and Manchester decoding. The Ethernet MAC can perform clock and data recovery, stream cipher de-scrambling, and digital adaptive equalization. The Ethernet MAC 134 may include DMA channels which are used for fast data communication of processed data to the system memory 114 via the internal system bus 118. Processed data stored in system memory 114 may then be communicated to the cable modem termination system(not shown) via the upstream modulator 102. Similarly, data received from the cable modem termination system is processed by the downstream demodulator 100 and stored in system memory as higher layer packets which can then be retrieved by the Ethernet MAC 1134 via the ISB 118 and encoded into Ethernet packets for communication to the external device operating on the Ethernet via the MII 110. The Ethernet MAC 134 may also perform additional management functions such as link integrity monitoring, etc.

In addition to the SDRAM interface 116, the described exemplary embodiment of the gateway includes a 16-bit external bus interface (EBI) 140 that supports connection to flash memories 142, external SRAM 144 or EPROMS 144. Additionally, the EBI 140 may be used to interface the described exemplary network gateway with additional external peripherals. The EBI 140 can provide a 24 bit address bus and a 16-bit bi-directional data bus. Separate read and write strobes can be provided along with multiple firmware configurable chip select signals. Each chip select can be fully programmable, supporting block sizes between about 4 K-bytes and 8 M-bytes, extended clock cycle access control and 8 or 16-bit selection of peripheral data bus width. In the described embodiment, the EBI 140 can support both synchronous and asynchronous transfers. Pseudonymous transfers may be supported through the use of read/write strobes to indicate the start and duration of a transfer. The EBI 140 can include DMA access capability to or from the SDRAM interface 116. The DMA operation may take one or more forms. For example, in EBI mode, an EBI bridge can act as the DMA controller, and perform all pointer and buffer management tasks during DMA operations. In an external mode, an external device can act as the DMA controller and the EBI 140 can serve as a simple bridge. In DMA mode the MIPS core 128 can be responsible for DMA setup.

The network gateway may be vulnerable to network breaches due to peripheral devices such as PC employing windows or network Macintosh computers. These operating systems include "file sharing" and "printer sharing" which allow two or more networked computers in a home or office to share files and printers. Therefore the exemplary embodiment of the gateway includes IP security module 1148 which interfaces with ISB 118. The MIPS core 128 can set-up and maintain all security associations. The MIPS core 128 can also filter all IP traffic and route any messages requiring security processing to the security module via the ISB 118. The security module 150 may support single DES (CBC and ECB modes) triple DES (CBC and ECB modes) MD-5 and SHA authentication in hardware to provide support for virtual private networks.

The security module 148 can implement the basic building blocks of the developing IP Security Standard (IPsec). The security module 148 may also be used to implement any other security scheme that uses the same basic blocks as IPsec, which uses two protocols to provide traffic security. A first protocol, IP Encapsulating Security Payload (ESP), provides private data privacy with encryption and limited traffic flow confidentiality. ESP may also provide connection less integrity, data source authentication and an anti-replay service. A second format, IP Authentication Header (AH), provides connection less integrity, data source authentication and an optical anti-replay service. Both protocols may be used to provide access based on the distribution of cryptographic keys and the management of traffic flows. The protocols may be used alone or in combination to satisfy the security requirements of a particular system. In addition, the security module 148 can support multiple modes of operation depending on a security association to the traffic carried by a simplex connection. For example, transport mode security association between two hosts, primarily protects protocols above the IP layer while tunnel mode security association provides security and control to a tunnel of IP packets.

The exemplary security module 148 addresses possible differences in packet format between IPsec and future security applications with a generalized scheme to determine where the authentication/encryption algorithms are applied within a data packet. The authentication/encryption algorithms consider each packet to consist of three parts, a header, body and trailer. The appropriate algorithm can be applied, using any specified parameters to the body section only.

In an encryption mode, the security module 148 can add and initialize any necessary headers, determine necessary parameters, generate the associated control message and add the control and data message. In the authentication mode, the control fields of the received data packets are parsed, the parameters are determined via a security association lookup table, control message is created and the control and data messages are enqueued.

The exemplary embodiment of the network gateway includes a DMA controller 150 having a number of channels that enable direct access over the ISB 118 between peripherals and the system memory 114. With the exception of the security module 148, packets received by the network gateway 98 cause DMA transfers from a peripheral to memory, which is referred to as a receive operation. A DMA transfer from memory to a peripheral is referred to as a transmit operation. Programmable features in each channel can allow DMA controller 150 to manage maximum ISB burst lengths for each channel, enable interrupts, halt operation in each channel, and save power when certain modules are not operational. The maximum ISB burst length may be programmed independently for each channel preferably up to 64 32 bit words. Each channel can include maskable interrupts connected to the MIPS core 128 which indicate buffer complete, packet complete and or invalid descriptor detected. Busy DMA channels may be stalled or completely disabled by the MIPS core 128. Source clocks (not shown) for each channel are can be connected to the channels based on the internal peripheral they service. For power reduction, these clocks may be turned off and on coincident with the respective peripheral's clock.

The DMA controller 150 can be operable in both non-chaining and chaining mode. In the non-chaining mode the DMA channel refers to its internal registers for the pertinent information related to a scheduled DMA burst transfer. The DMA controller can set-up the buffer start address, byte count, and status word registers before initiating the DMA channel for each allocated buffer. In the transmit direction, the DMA channels can send the specified number of bytes (preferably up to 4095) from the specified byte address. In the receive direction, the DMA channels can insert data into a specified memory location until a buffer has been completely filled or the end of a packet is detected.

Figure 4:
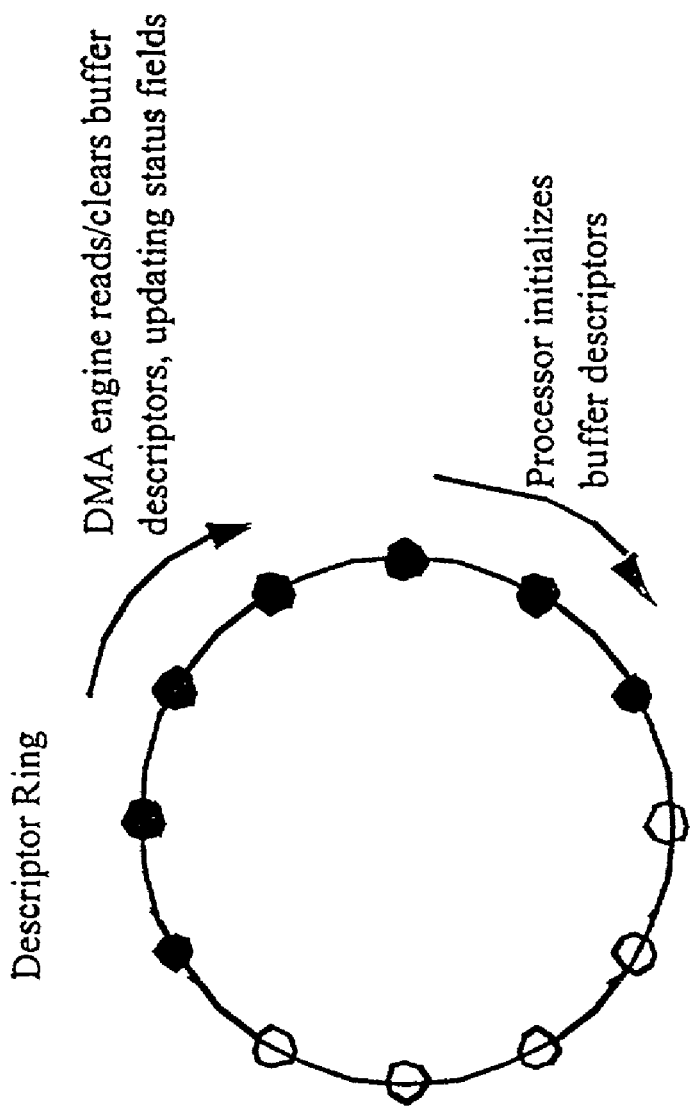
FIG. 4 is a graphical depiction of the chaining mode of operation of the system direct memory access controller in accordance with a preferred embodiment of the present invention.

In the chaining mode, the system memory can be partitioned as shown in FIG. 4 preferably using descriptor rings containing pointers to memory buffers as well as status information for each memory buffer. The MIPS core 128 can write the descriptor pointers while the DMA controller 150 follows by inserting/taking data into/from the location designated by the descriptor. Upon completion of the transfer of a buffer, the DMA controller 150 effectively clears the descriptor by updating the status to indicate that the data has been inserted/taken. Specific information may be added to the descriptor to indicate the length of data in the block, specifying whether the data is the first or last block of a packet, etc.

In the downstream direction, the MIPS core 128 can fill or recognize a data block for a particular DMA channel, then write the next unused descriptor in the ring indicating that the block is filled and where the downstream data exists in memory. The DMA controller 1150 can follow the DSP write to the descriptor ring, sending out data and clearing the descriptor when the transfer is complete. When the DMA controller 150 reads a descriptor that does not contain valid data, it can go idle until initiated by the DSP core.

In the upstream direction, the MIPS core 128, can allocates memory space for incoming data, then write the descriptor with the start address for that buffer. The DMA controller 150 read the base address and insert data until either the buffer is full or an end of packet has been detected.

The DMA controller 150 can update the descriptor, communicating to the MIPS core 128 that the block is full, indicating the length of the data on the block, and/or asserted first and or last buffer flags.

The described exemplary network gateway can include a voice processor 160 for processing and transporting voice over packet based networks such as PCs running network on a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet based system. The described embodiment of the voice processor 160 also supports the exchange of voice, as well as fax and modem, between a traditional circuit switched network or any number of telephony devices and the CMTS (not shown). The voice processor may be implemented with a variety of technologies including, by way of example, embedded communications software that enables transmission of voice over packet based networks.

The embedded communications software is preferably run on a programmable digital signal processor (DSP). In an exemplary embodiment the voice processor 160 utilizes a ZSP core from LSI Logic Core ware library for mid to high end telecommunications applications. The DSP core 160 can include at least about 80 k words internal instruction RAM 162 and at least about 48 k words internal data RAM 164. The DSP core 160 can interface with the internal system bus 118 via a DSP/ISB interface 166 and the peripheral bus 132 via the DSP/PB interface 168.

The DSP core 160 can provide a JTAG Emulator interface as well as internal training recovery clock (TRC) sync interface. The voice processor 160 can include a grant synchronizer that insures timely delivery of voice signals to the MIPS core 128 for upstream transmission. In addition, a PCM interface 170 can provide the voice processor 160 with an interface to an internal audio processor 170 as well as an external audio processing circuits to support constant bit rate (CBR) services such as telephony. The PCM interface can provide multiple PCM channel controllers to support multiple voice channels. In the described exemplary embodiment of the gateway, there are four sets of transmit and receive FIFO registers, one for each of the four PCM controllers. However, the actual number of channels that may be processed may vary and is limited only by the performance of the DSP. The internal system bus 118 is used to transfer data, control and status messages between the voice processor 160 and the MIPS core 128. FIFO registers are preferably used in each direction to store data packets.

The described exemplary embodiment of the gateway includes an internal audio processor 170 with an analog front end 172 which interface the voice processor 169 with external subscriber line interface circuits (SLICs) for bi-directional exchange of voice signals. The audio processor 170 may include programable elements that implement filters and other interface components for a plurality of voice channels. In the transmit mode the analog front end 172 accepts an analog voice signal and digitizes the signal and forwards the digitized signal to the audio processor 170.

The audio processor 170 decimates the digitized signal and conditions the decimated signal to remove far end echos. As the name implies, echos in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user. The audio processor can apply a fixed gain/attenuation to the conditioned signal and forwards the gain adjusted signal to the voice processor 160 via the PCM interface. In the receive mode the audio processor accepts a voice signal from the PCM interface and preferably applies a fixed gain/attenuation to the received signal. The gain adjusted signal is then interpolated from 8 kHz to 96 kHz before being D/A converted for communication via a SLIC interface to a telephony device.

Each audio channel can be routed to a PCM port to allow for system level PCM testing. The PCM system tests, by way of example may require compliance with ITU G.711 for A-law and μ-law encoding/decoding.

The described exemplary embodiment of the network gateway include integrated peripherals including independent periodic interval timers 180, a dual universal asynchronous receiver-transmitter (UART) 182 that handles asynchronous serial communication, a number of internal interrupt sources 184, and a GPIO module 186 that provides multiple individually configurable input/output ports. In addition, multiple GPIO ports can be provided to drive various light emitting diodes (LEDs) and to control a number of external SLICs. A peripheral bus bridge 186 can be used to interface the low speed peripheral to the internal system bus 118.

A. DOCSIS Cable Modem

1. Downstream Demodulator

Figures 5, 6:
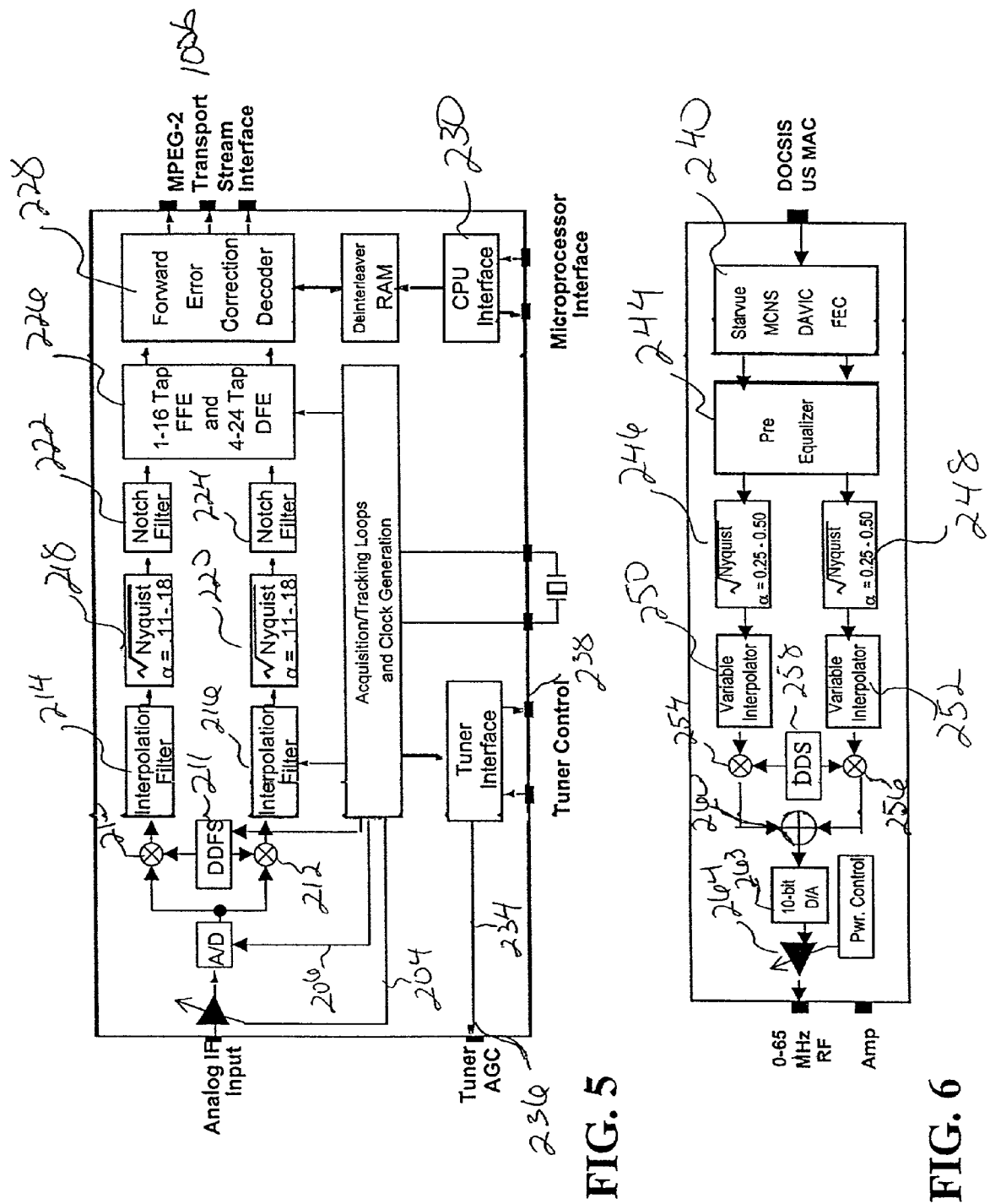
FIG. 5 is a system block diagram of a DOCSIS downstream demodulator in accordance with a preferred embodiment of the present invention.
FIG. 6 is a system block diagram of a DOCSIC upstream modulator in accordance with a preferred embodiment of the present invention.

The DOCSIS downstream demodulator 100 can support 64/256 QAM. Referring to FIG. 5 the downstream demodulator 100 accepts an analog IF input signal 198, amplifies and digitizes the input signal with an integrated programable gain amplifier (PGA) 200, and an bit A/D converter 202. An on chip gain recovery loop 204 circuit controls the PGA 200 to provide an on chip automatic gain control (AGC) function. The timing recovery also includes an on chip voltage controlled oscillator (not shown) which can be locked to an off chip crystal, controls the sampling of the A/D converter 202. The stability of the crystal reference allows for accurate sub-sampling of the IF signal to produce a digital data stream centered on a lower IF center frequency.

A digital demodulator 208 demodulates the digitized output 202(*a*) of the A/D converter 202, with recovered clock and carrier timing. The digital demodulator 208 includes digital mixers 210, 212 which mix a complex data stream generated by a direct digital frequency synthesizer (DDFS) 211 under the control of the timing recovery loop with the digitized signal 202(*a*). Matched interpolation filters 214, 216 convert mixer outputs 214(*a*), 216(*a*) to in-phase (I) and quadrature-phase(Q) baseband signals correctly sampled in both frequency and phase. Dual square root Nysquist filters 218, 220 which may accommodate 11–18% roll-off factors, filter the I & Q baseband signals to reduce inter-symbol interference. In addition, notch filters 222, 224 may be used to substantially reduce narrowband co-channel interference caused by intermodulation products from analog CATV channels. Notch filters 222, 224 preferably place notches in the frequency spectrum at the frequencies of these subcarriers.

The downstream demodulator 102 preferably includes a configurable multi-tap decision directed equalizer 226. In the described exemplary embodiment, a 40 tap equalizer is used to remove intersymbol interference generated by worst case coaxial cable channels with multipath spreads of up to 4.5 μsec at 5.26 Mbaud. Blind convergence algorithms facilitate equalizer acquisition.

In addition to adaptive equalization, the configurable multi-tap decision directed equalizer 226 performs phase recovery on the equalized constellation points using a quadrature synthesizer and complex mixer under the control of the carrier recovery loop to track out residual carrier offsets and instantaneous phase offsets such as those caused by tuner microphonics. The output of the adaptive equalizer phase recovery block is forwarded to a forward error correction (FEC) decoder 228. The FEC decoder can support numerous decoders including ITU-T J.83 Annex A/B/C compatible decoders.

The Annex A/C decoder consists of four major functions, frame synchronization, convolution de-interleaving, Reed-Solomon error correction and de-randomization. Hard decisions are preferably input into the frame synchronization block which locks onto the inverted sync bit pattern. The MIPS core 128 sets the characteristics of the frame synchronization acquisition and retention via a CPU interface 230. Once synchronized, data interleaving is removed by the convolution de-interleaver 232. The de-interleaver can be based on the Ramsey III approach, and can be programmable to provide depths from I=1–204 with J=204/I. An on chip RAM 234 can provide for I=1–12. After de-interleaving the data symbols are processed by a Reed-Solomon decoder, which can correct up to eight symbol errors per RS block. The decoded symbols are then de-randomized, which substantially undoes the randomization inserted at the modulator. The de-randomized output consists of MPEG-2 serial or parallel data, packet sync and a data clock.

The Annex B decoder includes five layers, trellis decoding, de-randomization, convolution de-interleaving, Reed-Solomon decoding and checksum decoding. The Annex B concatenated coding scheme along with interleaving provides good coding gain to combat gaussian noise while still protecting against burst errors. Soft decisions from the adaptative equalizer 226 are input to the trellis decoder which estimates the maximum likelihood of a sequence. The output sequences are forwarded to a frame synchronization and de-randomization block similar to those described for the Annex A/C decoders. A Reed-Solomon decoder preferably corrects up to three symbol errors per RS block. The checksum decoder accurately identifies block containing uncorrectable errors. The downstream demodulator outputs MPEG-2 serial or parallel data, packet sync and a data clock to the DOCSIS MAC.

The downstream demodulator 100 also includes two AGC loops which provide control for both RF and IF variable gain amplifiers (VGAs). The gain control allocated to each loop may be established via a CPU interface 230. The RF gain control loop 236 may be closed at the tuner AGC 236 while the IF loop 204 may be completed with either an off chip VGA (not shown) or preferably with the internal PGA 200. The power of the internal IF signal is estimated and compared to a programmable threshold. If the estimated power exceeds the threshold, the appropriate AGC integrator is incremented by a programmable value. If the estimated power is less than the threshold, the appropriate AGC integrator is decremented by a comparable amount. The timing recovery loop 206 may include a timing error discriminant, a loop filter, and a digital timing recovery block which controls the digital re-sampler The carrier frequency/ phase recovery and tracking loops are all digital loops which simultaneously offer a wide acquisition range and a large phase noise tracking ability. The loops may use decision directed techniques to estimate the angle and direction for phase/frequency compensation. The loops can be filtered by integral-plus-proportional filters, in which the integrator and linear coefficients of the filter are programmable to provide the means of setting the loop bandwidths. The upper bits of the loop filter can control the direct frequency synthesizer 210, providing both accurate frequency generation and fine phase resolution.

The downstream demodulator 100 uses an on chip VCO (not shown) referenced to a single off chip crystal which can provide all required chip clocks. In addition, a spare D/A demodulator provides a 1-bit pulse-width modulated signal which may be used with an off chip RC filter. In addition, the downstream modulator may provide tuner control ports 238 which may be used to program two serially controlled tuner phase locked loop (PLL) frequency synthesizers.

2. Upstream Modulator

Referring to FIG. 6, the upstream modulator 102 can support QPSK and 16-QAM processing of burst or continuous data signals 102(*a*) received from the DOCSIS MAC. Burst encoding logic 240 includes FIFO registers and a FEC encoder, preamble preend and symbol mapper. The burst FIFO register decouples the input data rate from the transmission data rate and allows data to be input while a burst is being actively transmitted. The FEC encoder processes data stored in the FIFO. The FEC encoder may be a Reed-Solomon encoder with data randomization. The parallel to serial conversion of bytes entering the randomizer and serial to parallel conversion of bits leaving the randomizer may be programmed to be most significant bit (MSB) or least significant bit (LSB) first. The encoder may be programmed to correct from zero to ten symbols errors per RS block. The FEC encoder may also be configured to integrate the randomizer before or after the RS encoder. A programmable preamble of up to 1024 bits may then be added to the data burst and the completed data burst can be then mapped into 90 degree DQPSK, QPSK or 16-QAM.

The output of the burst encoding logic 240 is coupled to a pre-equalizer 244 which may be selectively enabled to pre-distort the transmitted waveform to offset the effects of inter-symbol interference (ISI). The data burst is then shaped by square root Nyquist filters 246, 248 which may have a selectable excess bandwidth factor of 25% or 50%. The maximum passband ripple of these filters is preferably less than about 0.05 dB and the minimum stopband attenuation is preferably greater than about 60 dB. The shaped signals are forwarded to interpolation filter banks 250, 252 which interpolate the signal to the sample rate. The outputs of these filters are then mixed or modulated onto quadrature carriers generated by a digitally tunable frequency synthesizer 258 by mixers 254, 256. The I and Q components are then combined by summer 260. The summer 260 outputs a digital waveform carrying the data burst whose spectrum is preferably centered on the desired RF frequency to a D/A converter 262. The D/A converter converts the digital, shaped output burst to an analog waveform. The D/A converter 262 may have a sample rate of up to about 200 MHZ. A programmable gain attenuator 264 can be used to provide up to about 25 dB attenuation in steps on the order of about 0.4 dB.

3. DOCSIS MAC

The DOCSIS media access controller (MAC), includes baseline privacy encryption and decryption, transmission convergence support, a TDM/TDMA framer, and a scatter/gather DMA interface. The transmission convergence sublayer supports robust frame acquisition and multiplexing with MPEG-TS compliant video and audio streams. The TDM/TDMA preferably handles time synchronization with the cable modem termination system, upstream MAP decoding, bandwidth request generation and contention resolution. The DOCSIS MAC may be divided into four major functions, downstream functions, upstream functions, DMA interface and miscellaneous control. The downstream functions of the DOCSIS MAC include receiving MPEG frames 100(*b*) from the downstream demodulator, extracting the DOCSIS MAC frames from the MPEG frames, processing the MAC header, filtering messages and data, processing MAP and SYNC messages, decrypting data packets if necessary and providing cyclic redundancy checks (CRCs) on the MAC payloads.

Figure 7:
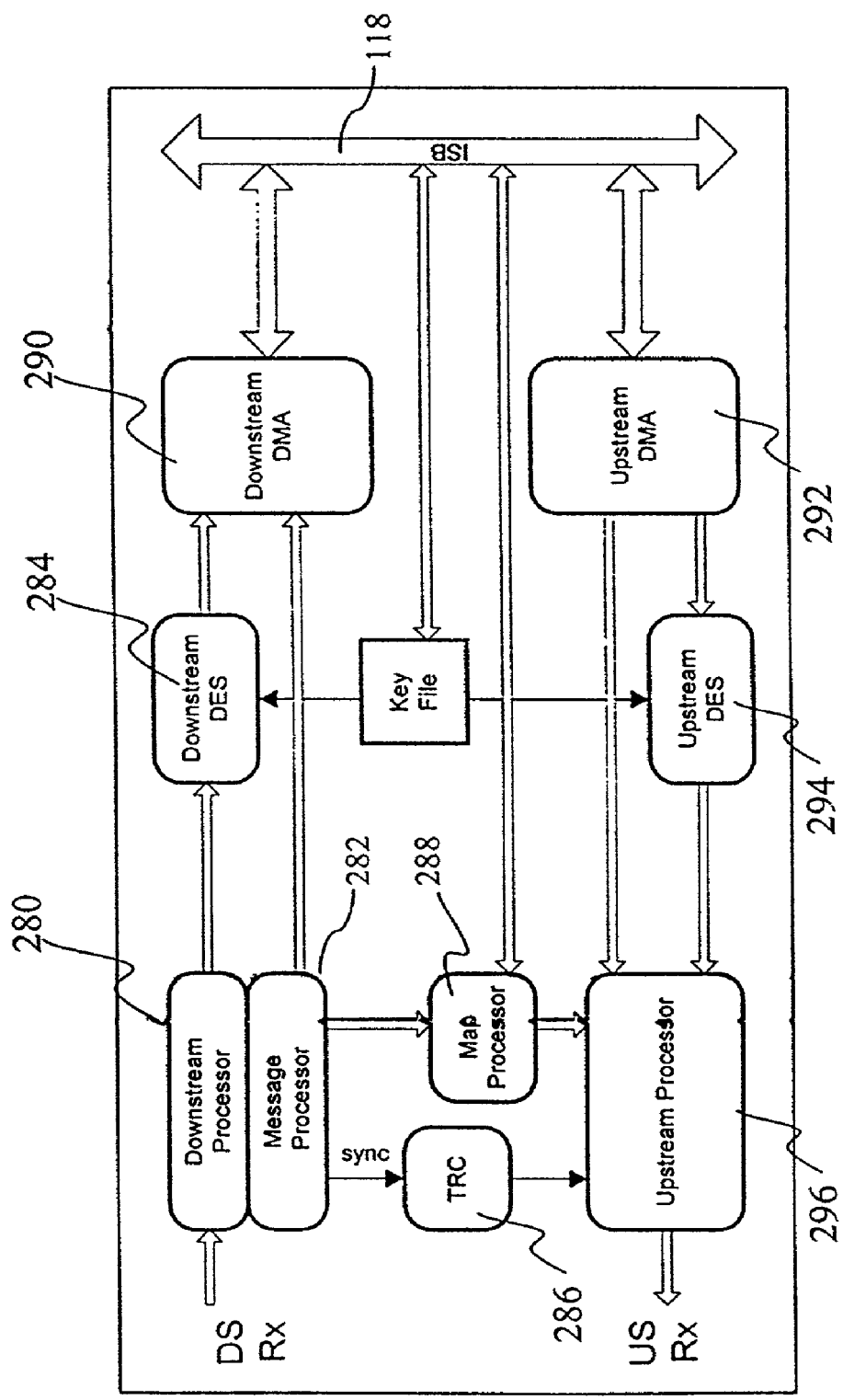
FIG. 7 is a system block diagram of a DOCSIS media access controller (MAC) in accordance with a preferred embodiment of the present invention.

Referring to FIG. 7, a downstream processor 280 can include a physical layer (PHY) interface which provides the interface to the downstream demodulator (not shown). The PHY receives the incoming MPEG stream, filters on the predefined PID, and uses the offset value contained in the MPEG frame to find the MAC frames. The extracted MAC frames pass to a MAC header processing block in a message processor 282 and through a rate conversion FIFO to a MAC header processing block in a downstream data encryption security (DES) processor 284 which provides baseline security by decrypting QAM downstream traffic. The MAC header processing blocks (not shown) examine the MAC header for type, wherein the MAC header processor in the message processor 282 processes only MAC messages while the MAC header processor in the downstream DES 284 processes packets that are not MAC messages.

The incoming MAC header is parsed for the presence of an extended header field. If the extended header field is present, the MAC header processor block parses the extended header type-length-value (TLV) fields, and searches for baseline privacy header. Once the baseline privacy header has been located, the MAC header processor forwards the associated value data to the downstream DES 284 for further parsing and interpretation. With the exception of the baseline privacy extended header, all other header types are preferably ignored by the MAC header processor. Both MAC header processing blocks determine the length of the extended header, calculate the header check sequence (HCS) over the MAC header and compare the calculated HCS with that contained in the MAC header. In the described exemplary embodiment, if the calculated HCS values do not match the HCS values contained in the MAC header, the MAC processor preferably discards the packets and signals the PHY interface requesting re-synchronization. Those packets where the calculated HCS values match the values contained in the MAC header, the MAC header processor preferably generates control signals to flag the type of packet, the beginning of the extended header, the beginning of the protocol data unit (PDU) and the length of the PDU. The MAC header processor routes all PDUs matching the network gateway extended header type to the downstream DES 284 for decryption.

The message processor 282 calculates the CRC over the message payload in accordance with the control signals generated by the MAC header processor and supplies data to the DMA controller 290. There are a number of fault conditions on the DMA interface that require specific action. If an HCS fail is generated by the MAC header processor the DMA is prematurely terminated. If the CRC is correct the message processor 282 preferably examines the type field of the message. The message processor 282 extracts the time stamp from SYNC messages and passes these to the timing regeneration circuit 286. The timing regeneration circuit 286 provides the timing recovery using the time stamp values from the sync messages. In addition, the message processor 282 forwards messages that match the upstream channel ID and UCD change count to a MAP processor 288. The remaining messages with valid CRC are passed to a downstream message DMA 290 through a rate adjustment FIFO. If a FIFO full state is encountered, the DMA discards the current packet, flushes the FIFO and waits until the next packet arrives.

The downstream DES 284 receives data packets and control signals from the header processor in the downstream processor 280. The downstream DES 284 determines what type of filtering should be applied to the packet based on information contained in the MAC header. If a packet supports baseline privacy the downstream DES filters the packet based on the silence identifier (SID). The DES 284 preferably decrypts packets using the key corresponding to the SID and even/odd key bit in the baseline privacy header. The DOCSIS MAC does not perform decryption on packets that do not contain a baseline privacy header. The DES 284 preferably filters packets based upon the destination address and forwards the filtered packets to a CRC processor (not shown) which calculates a CRC-32 over the entire PDU payload. If the calculated CRC does not match the value stored in the packet, a CRC error flag is set and the packet is marked as erred in the downstream DMA buffer.

The downstream DMA 290 is used to transfer data to system memory (not shown). The downstream DMA 290 may have two channels, one of which is used to transfer data into system memory, the other is used to transfer message packets into memory. The two channels can be substantially identical in function. The downstream DMA can use structures in the memory to control transfer of information. The structures can be established and maintained by firmware. Data can be stored in regions of memory called particles. One structure contains a ring of buffer descriptors with each buffer descriptor describing particles in the shared memory. The DMA can store received downstream data in the particles and update the status and length in the buffer descriptor. The other structure is an additional ring of descriptors used to refer to single packets. Where a packet may be contained in any number of particles described by a like number of buffer descriptors, there is only one packet descriptor associated with the packet.

The upstream DMA 292 can include 16 upstream channels which read upstream packet headers and protocol data units (PDUs) from system memory. The upstream DMA 292 can preferably insers the HCS, CRC and piggyback fields when transferring packets to an upstream DES 294. The upstream DES 294 examines the extended header to determine if encryption is enabled. If encryption is not enabled, the upstream DES 294 forwards the packet to the upstream processor 296, otherwise if encryption is enabled the upstream DES 292 preferably uses the SID and even odd key bit in the extended header to perform a key lookup. The upstream DES 292 then encrypts the packet and forwards the packet to the upstream processor 294. The upstream processor 294 extracts MAC information elements (IEs) from the MAP FIFO and compares the elements to a next upstream minislot count. If the counts match, the upstream processor 294, evaluates the type of slot described by the MAP information element. If the network gateway needs to respond to the information element, the upstream processor 294 preferably loads the appropriate physical layer parameters to the upstream modulator 102 (see FIG. 3) and forwards the appropriate message or data packet. This operation depends on the slot type and status of the network gateway. The upstream processor 296 preferably responds to initial maintenance slots and will ignore all station maintenance slots and requests until the MIPS core 128 (see FIG. 3) signals that the network gateway has been initially ranged and assigned a SID (temporary or permanent) The upstream processor 296 responds to initial maintenance slots by extracting the ranging request message from internal memory that is programmed by the MIPS core. Once the network gateway has been initially ranged, the upstream processor 296 responds to station messages, requests, request/data regions, and grants and not to initial maintenance messages.

Once ranged, the upstream processor 296, monitors the upstream DMA queues. In the described exemplary embodiment there are 16 independent upstream queues maintained by the upstream DMA 292. When a packet is ready for transmission, the upstream processor randomly selects one of the available requests slots. The upstream processor 296 then waits to receive a grant, an acknowledgment (grant with length zero) or an ACK time past the time it sent its request upstream. If the upstream processor 296 does not receive an acknowledgment or grant before the ACK time has past, the upstream processor 296 preferably uses truncated binary exponential back-off to select another request slot to resend its request. Once granted, the upstream processor 296, signals the upstream DMA 292 to begin extracting the packet from memory and forwarding the packet to the upstream DES for processing as described above. The upstream processor 296 then forwards the packet to the upstream modulator (not shown) at the appropriate transmission time.

4. Integrated Ethernet MAC

Referring to FIG. 3, the integrated Ethernet MAC performs all the physical layer interface functions for 100BASE-TX full duplex or half duplex Ethernet on CAT 5 twisted pair and 10BASE-T full or half duplex Ethernet on CAT 3, 4 or 5 twisted pair. The Ethernet MAC 122 may be coupled directly to the Ethernet network via the media independent interface 110. In 100BASE-TX mode, the Ethernet MAC 122 preferably monitors the twisted pair for transitions in the energy level of the received signal. Signals can be qualified using squelch detect circuits. The Ethernet MAC enters and remains in a "link fail" state when valid signals are not detected on the receive twisted pair. In the link fail state, the Ethernet MAC 122 preferably transmits only idle codes. When the Ethernet MAC 122 detects a valid signal for a predetermined period, the Ethernet MAC 122 enters a link pass state and the appropriate transmit and receive functions are enabled.

The Ethernet MAC 122 preferably provides the ability to negotiate its mode of operation over the twisted pair link using the auto negotiation mechanisms defined in the IEEE 802.3u specifications, the contents of which are incorporated herein by reference as if set forth in full. Auto-negotiation should be selectively enabled by the Ethernet MAC. When enabled, the Ethernet MAC 122 preferably chooses a mode of operation by advertising its abilities and comparing those abilities to those received from its link partner.

Figure 8:
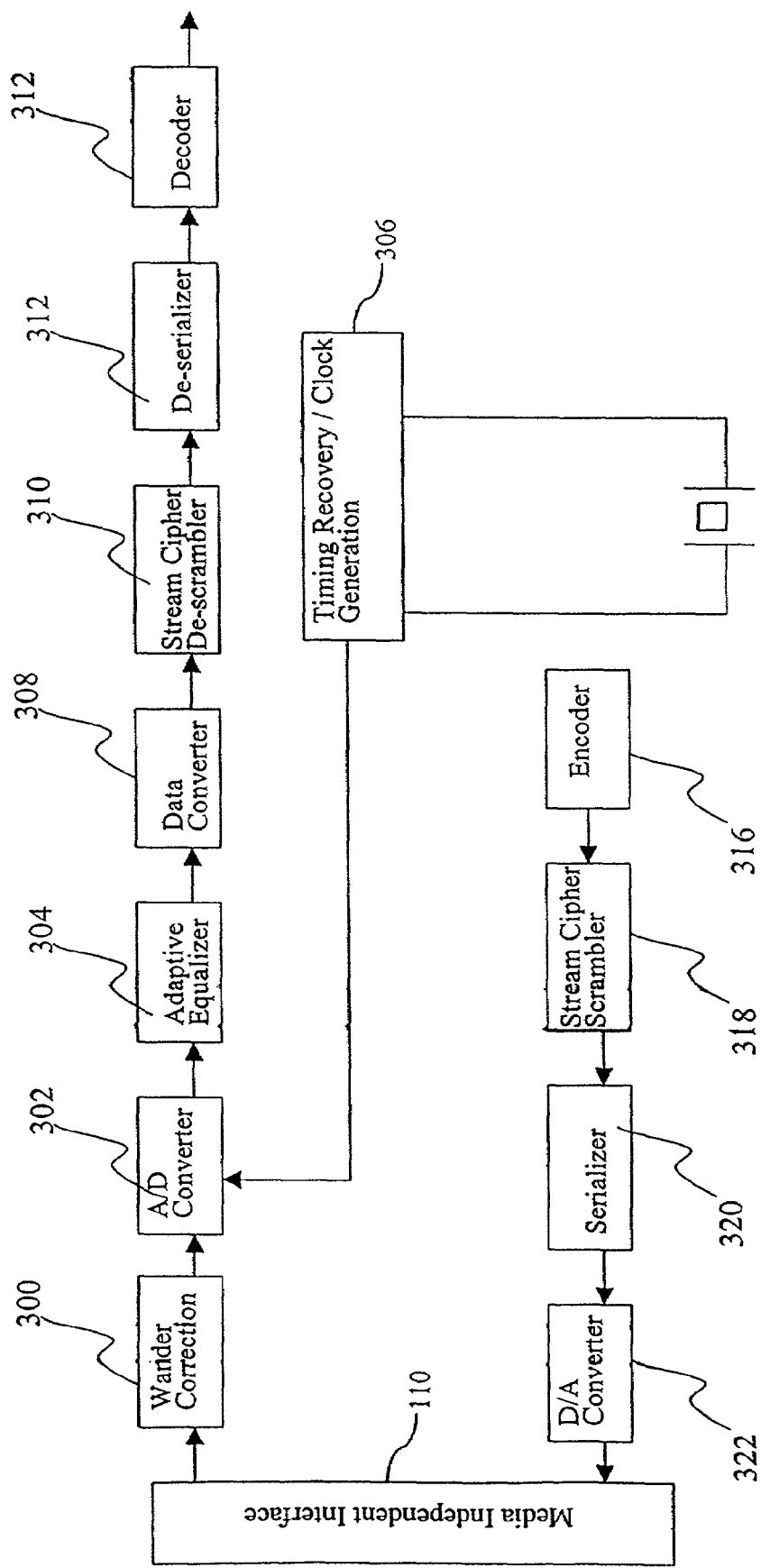
FIG. 8 is a system block diagram of an Ethernet transceiver for interfacing the network gateway with Ethernet devices in accordance with a preferred embodiment of the present invention.

FIG. 8 shows the physical interface portion of the Ethernet MAC 122. The Ethernet MAC 122 may perform 4B5B, MLT3, and Manchester encoding and decoding. For 100BASE-TX mode the Ethernet MAC enables a 4B5B encoder 316. The transmit packet is encapsulated by replacing the first two nibbles with a start of stream delimiter and appending an end of stream delimiter to the end of the packet. The transmitter will repeatedly send the idle code group between packets. When the MII transmit enable is asserted, data is inserted into the transmit data stream. The encoded data stream is scrambled by a stream cipher scrambler 318 to reduce radiated emissions on the twisted pair, serialized by serializer 320 and encoded into MLT3 signal levels. A multimode transmit digital to analog converter (DAC) 322 can be used to drive the MLT3 data onto the twisted pair cable. The multi-mode DAC can transmit MLT3-coded symbols in 100Base-TX mode and Manchester coded symbols in 10BASE-TX mode. The DAC can perform programmable edge rate control in transmit mode, which decreases unwanted high frequency signal components. High frequency pre-emphasis is preferably performed in 10BASE-TX mode.

The Ethernet MAC 122 can receive a continuous data stream on twisted pair. A 100BASE-TX data stream is not always DC balanced, because the receive signal must pass through a transformer, and therefore, the DC offset of the differential receive input may wander. Baseline wander may reduce the noise immunity of the receiver. Wander Correction Logic 300 can be used to compensate for baseline wander by removing the DC offset from the input signal, thereby reducing the receive symbol error rate. Each receive channel of the Ethernet MAC 122 can include an analog to digital converter (ADC) 302. Ethernet MAC, exemplary the ADC 302 is a 6-bit, 125 MHz ADC, which samples the incoming analog data on the receive channel and produces a 6-bit output. The ADC output is forwarded to a digital adaptive equalizer 304 which removes interzonal interference created by the transmission channel media. The Ethernet MAC 122 combines feed forward equalization and decision feedback equalization to achieve an optimal signal to noise ratio. The digital design increases tolerances to on chip noise and the filter coefficients preferably self adapt to any quality of cable or cable length. The adaptive equalizer can be bypassed in 10BASE-TX mode which includes transmit pre-equalization capability.

The Ethernet MAC 122 can be include a digital clock recovery/generator system 306 which creates all internal transmit and receive clocks. The transmit clocks cab be synched to a 50 MHz clock input while the receive clocks are locked to the incoming data streams. Clock recovery circuits optimized to MLT3, and Manchester encoding schemes can be included for use with each of three different operating modes. The input data streams are can be sampled by the recovered clock from each port and fed synchronously to the respective digital adaptive equalizer.

Following baseline wander correction, adaptive equalization, and clock recovery a data converter 308 converts the received data stream from MLT3 to NRZ data. The NRZ data is descrambled by a stream cipher de-scrambler 310 and then de-serializer 312 de-serializes and aligns the data into 5-bit code groups. The 5-bit code groups are decoded into 4-bit data nibbles by a decoder 314. The start of stream delimiter is replaced with preamble nibbles and the end of stream delimiter and idle codes are replaced with zeros. When an invalid code group is detected in the data stream, the Ethernet MAC 122 asserts the MII receive error RXER signal which asserts several error conditions which can be used to improperly terminate the data stream. While RXER is asserted, the receive data can be driven with "01" for an invalid data reception and "10" for a false carrier.

Figure 9:
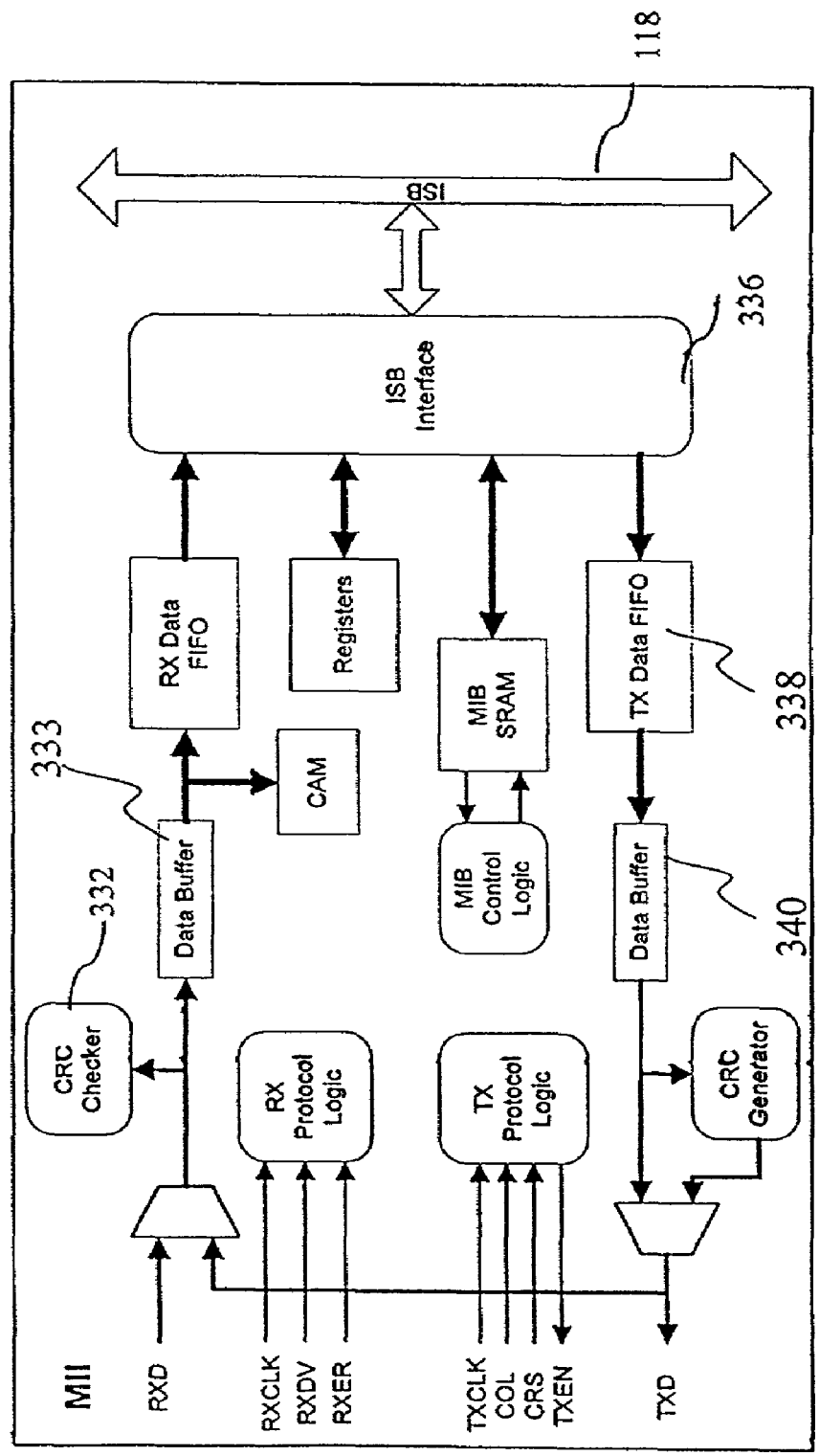
FIG. 9 is a system block diagram of an Ethernet media access controller (MAC) in accordance with a preferred embodiment of the present invention.

FIG. 9, shows controller portion of the Ethernet MAC. The MAC receiver routes nibble wide MII data through Cyclic redundancy checker 332 to a buffer 330 where it can be assembled into 32-bit long words. The data is forwarded to a 256 byte FIFO register 334 which is coupled to the ISB (not shown) by ISB interface 336. Ethernet packet data is moved from the FIFO 334 to system memory by the system DMA controller 150 (not shown). The MAC transmitter contains a 256 byte FIFO register 338 which is coupled to the ISB (not shown) via the ISB interface 336. An Ethernet packet is can be moved from system memory (not shown) into the FIFO 338 by the system DMA controller (not shown). The data can be forwarded through data buffer 340 to the MII (not shown) by a transmit state machine (not shown). The transmit state machine initiates transmission of the packet to the MII (not shown) when a FIFO watermark is reached or an end of packet is received. The transmit state machine also ensures that the correct inter packet gap (IPG) duration has expired before initiating packet transmission to the MII (not shown) from the data buffer 340.

The preamble and start of frame delimiter (SFD) can be initially transmitted over the MII, followed by transmission of actual data. If the packet is less than 64 bytes long, all zero pad bytes can be appended to the frame. CRC generator 342 automatically generates CRC which is appended if the packet is less than 64 bytes long.

5. Universal Serial Bus Transceiver and MAC

The exemplary network gateway preferably includes a USB 1.1 compliant full speed (12 M b/sec) device interface. The USB 1.1 specification defines an industry-standard USB. The specification describes the bus attributes, the protocol definition, types of transactions, bus management, and the programming interface required to design and build systems and peripherals that are compliant with this standard. The USB 1.1 specification is incorporated herein by reference as if set forth in full. The (USB) can provide a ubiquitous link that can be used across a wide range of PC-to-telephone interconnects.

The USB interface, in the described embodiment, supports sixteen configurations, four concurrent interfaces per configuration, four alternative interfaces per interface and six concurrent endpoints. An endpoint is a uniquely identifiable portion of a USB device that is the termination of a data path between the host (e.g. MIP core) and device. Each USB logical device is composed of a collection of independent endpoints. Each logical device has a unique address assigned by the system at device attachment time. Each endpoint on a device is assigned a unique device-determined identifier called the endpoint number. Each endpoint has a device-determined direction of data flow. The combination of the device address, endpoint number, and direction allows each endpoint to be uniquely referenced. Each endpoint is a simplex connection that supports data flow in one direction: either input (from device to host) or output (from host to device). An endpoint has characteristics that determine the type of transfer service required between the endpoint and the client software.

Figure 10:
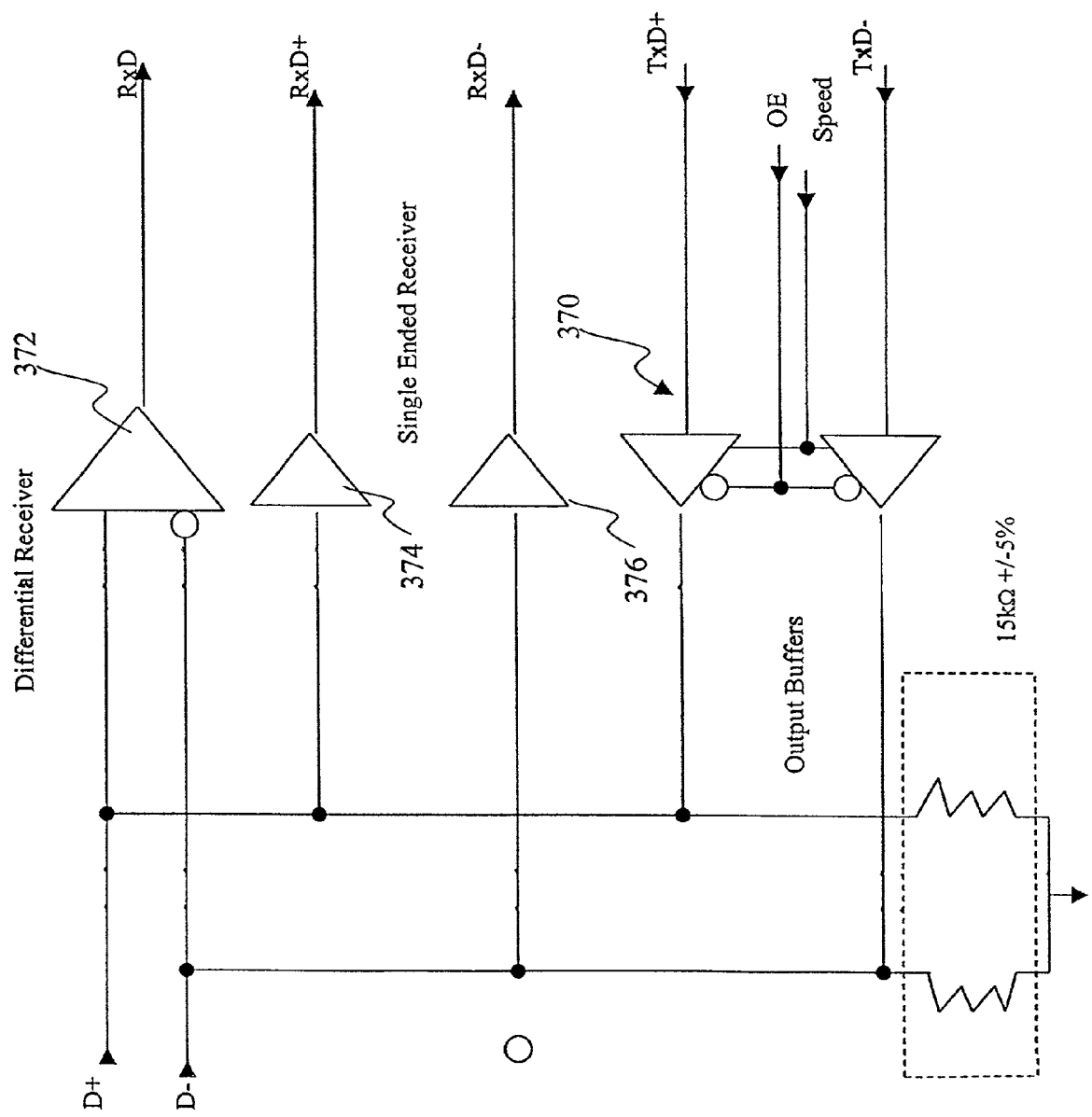
FIG. 10 is a system block a Universal Serial Bus (USB) controller in accordance with a preferred embodiment of the present invention.

FIG. 10 shows the USB transceiver. The USB transceiver uses a differential output driver 370 to drive the USB data signal onto the USB cable in accordance with the USB 1.1 specification. The driver can be a CMOS driver with an impedance that is less than the resistance specified in USB 1.1 specification so that a discrete series resistor may be included to make up the balance as required. A differential input receiver 372 can accept the USB data signal. The receiver sensitivity may comply with the USB 1.1 specification with an input sensitivity (VDI) of at least about 200 mV when both differential data inputs are in the differential common. In addition to the differential receiver, the described exemplary USB transceiver may include a single-ended receiver 374,376 for each of the two data lines. The transceiver can support both full- and low-speed data rates such that any type of device may be coupled to these ports.

When the transceiver is in full-speed mode it can use full-speed signaling conventions and edge rates. In low-speed it can use low-speed signaling conventions and edge rate. The described exemplary transceiver preferably utilizes two logical levels, J and K data states, to communicate differential data in the system. Differential signaling complies with the crossover voltage requirements of Section 7.1.2 of the USB 1.1 specification.

Figure 10A:
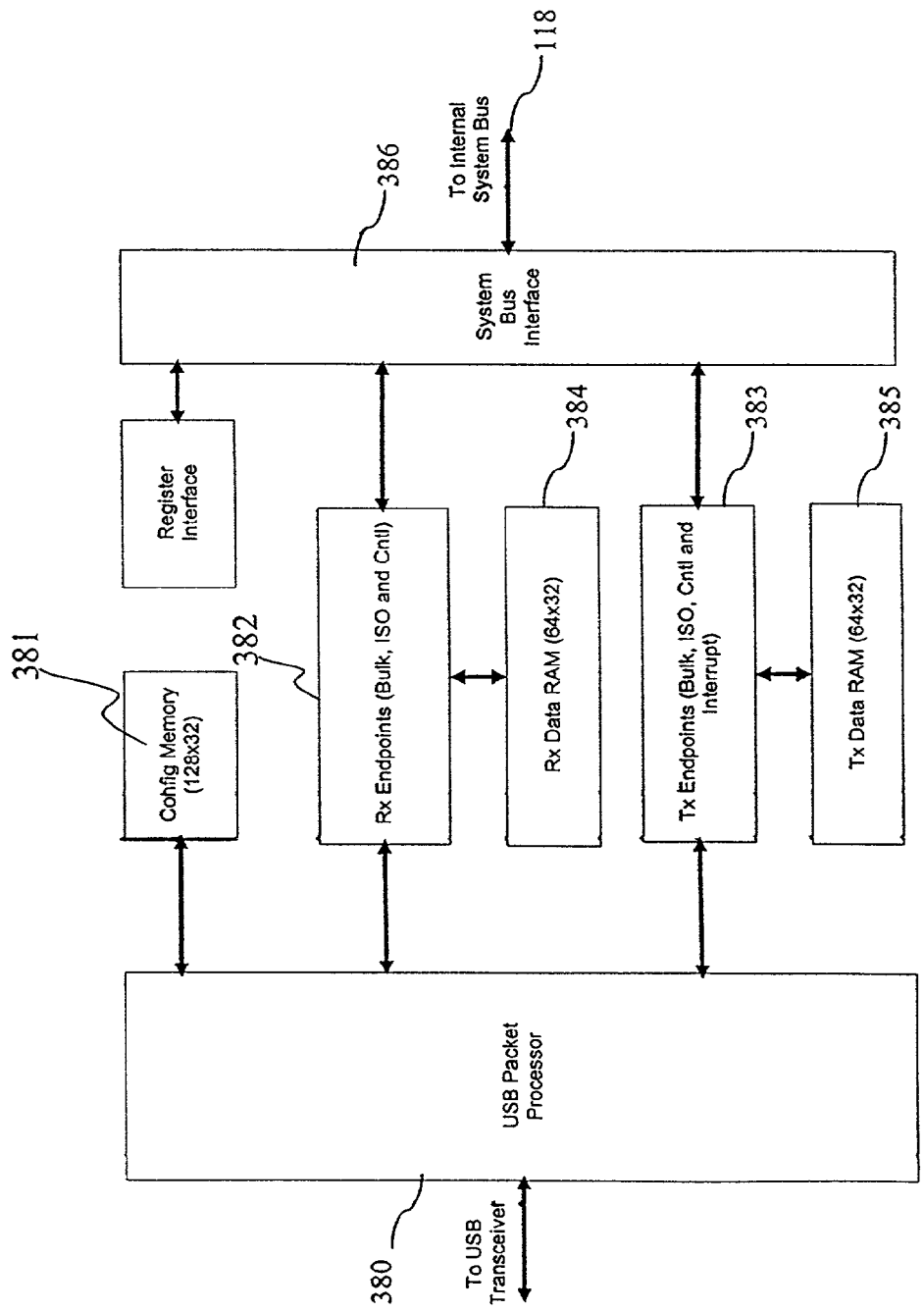
FIG. 10A is a system block a MAC for a USB controller.

FIG. 10A shows the USB MAC. The USB MAC includes a USB packet processor 380 that supports bulk in/out endpoints with packet sizes of eight, sixteen, thirty two or sixty four bytes. The USB packet processor 380 fragments USB packets and reassembles them into higher level packets with automatic detection of zero length USB packets. Internal USB configuration RAM 381 allows flexible configuration of the USB interface. The configuration PAM 381 can provide on the order of at least about 512 bytes of storage space for USB configuration descriptors. At power up of the network gateway, the MIPS core programs the configuration RAM 381 with a USB descriptor sequence. The MIPS core reads the values back from the configuration RAM to verify the accuracy of the descriptors in RAM. The MIPS core enables USB operation.

The USB MAC can support multiple configurations, interfaces, alternative interfaces and endpoints. The size of the configuration RAM will limit on the total length of the descriptor sequence. Therefore, the size of the configuration RAM may be optimized for integration into various applications which may require more than the described 512 bytes of storage space. There are five descriptors, the device descriptor, configuration descriptor, string descriptor, as well as interface and endpoint descriptors. A descriptor sequence contains one device descriptor and one or more configurations, interface and endpoint descriptors. The length of a device/configuration interface descriptor is nine bytes and the length of an endpoint descriptor is seven bytes. String descriptors are not stored in the configuration RAM.

The USB MAC processes all required USB standard device requests in hardware, including the clear_feature, get_configuration, get_descriptor, get_interface, get_status, set address, set_configuration, set_feature, and set_interface commands. The USB MAC extracts optional and class/vendor commands such as, for example, set_descriptor, synch_frame, and get_string_descriptor and forwards those commands to the MIPS core for processing. Upon receipt of such device requests the USB MAC preferably issues an interrupt to the MIPS core which then extracts the setup command and processes it.

In the described exemplary embodiment of the network gateway, there are preferably six physical USB endpoints: one bulk RX endpoint, one bulk TX endpoint, one isochronous RX endpoint, one isochronous TX endpoint, and one interrupt RX endpoints. An isochronous transfer can provide guaranteed access to USB bandwidth with bounded latency and guaranteed constant data rate through the pipe as long as data is provided to the pipe The endpoint can be a given configuration specifies the maximum size data payload that it can transmit or receive. The USB uses this information during configuration to ensure that there is sufficient bus time to accommodate this maximum data payload in each frame. If there insufficient bus time for the maximum data payload, the configuration is established; if not, the configuration is not established. The interrupt transfer type supports those devices that send or receive small amounts of data infrequently, but with bounded service periods. An interrupt transfer preferably provides a guaranteed maximum service period for the pipe as well as an attempt to re-transfer the data at the next period, in the case of occasional delivery failure due to error on the bus. The endpoint description identifies whether a given interrupt pipe's communication flow is into or out of the host.

Bulk transfers can support the exchange of relatively large amounts of data at highly variable times where the transfer can use any available bandwidth. Bulk transfers preferably provide access to the USB on a bandwidth-available basis, with guaranteed delivery of data, but no guarantee of bandwidth or latency. In addition bulk transfers preferably attempts to re-transmit in the case of delivery failure. The bulk endpoint specifies the maximum data payload size that the endpoint can accept from or transmit to the bus. This maximum applies to the data payloads of the data packets; i.e., the size specified is for the data field of the packet not including other protocol-required information. The bulk endpoint is designed to support a maximum data payload size. The bulk endpoint preferably reports in its configuration information the value for its maximum data payload size. The USB does not require that data payloads transmitted be exactly the maximum size i.e., if a data payload is less than the maximum, it does not need to be padded to the maximum size. In the described exemplary embodiment, of the USB both RX/TX bulk endpoints can support a maximum USB packet size of eight, sixteen, thirty two, or sixty four bytes. Both RX/TX isochronous endpoints 382, 383 can support a maximum USB packet size of eight, sixteen, thirty two, sixty four, one hundred and twenty eight, two hundred and fifty six or five hundred and twelve bytes. The control endpoints can support a maximum packet size of thirty two bytes and the interrupt RX interrupt endpoint can support a maximum USB packet size of eight bytes.

Both the bulk and isochronous endpoints 382, 383 can support in hardware the fragmentation of higher layer packets (such as Ethernet packets) into USB packets in the transmit direction and the reassembly of higher layer packets from USB packets in the receive direction. An end of packet flag can be used to signal when a USB packet is shorter than the maximum packet size defined by the endpoint. In the case that the length of the higher layer packet is exactly an integer multiple of the maximum USB packet size, a zero length packet can be inserted to signal the end of packet. The USB MAC supports the generation of zero length packets in the transmit direction and the detection of zero length packets in the receive direction.

The USB MAC may include internal RX and TX RAM 384, 385 for temporary data buffering among the bulk, isochronous and control endpoints. The endpoints are then forwarded to system memory. The USB preferably includes four direct memory access (DMA) channels for fast access to and from system memory through a system bus interface 386 coupled to the ISB. Preferably, two DMA channels are used for bulk RX/TX endpoints and two are used for isochronous RX/TX endpoints.

6. Audio Processor

The audio processor module provides an interface between the voice processor and external subscriber line circuits (SLICs). Referring to FIG. 3, the audio processor includes an analog front end 172 which provides bi-directional exchange of signals over the voice bandwidth, including voice or fax/modem data signals modulated with a voice band carrier. The analog front end 172 can support four separate voice channels with an analog front end 172 having four pairs of 14-bit analog to digital converters (ADCs) and digital to analog converters (DACs).

Figure 11:
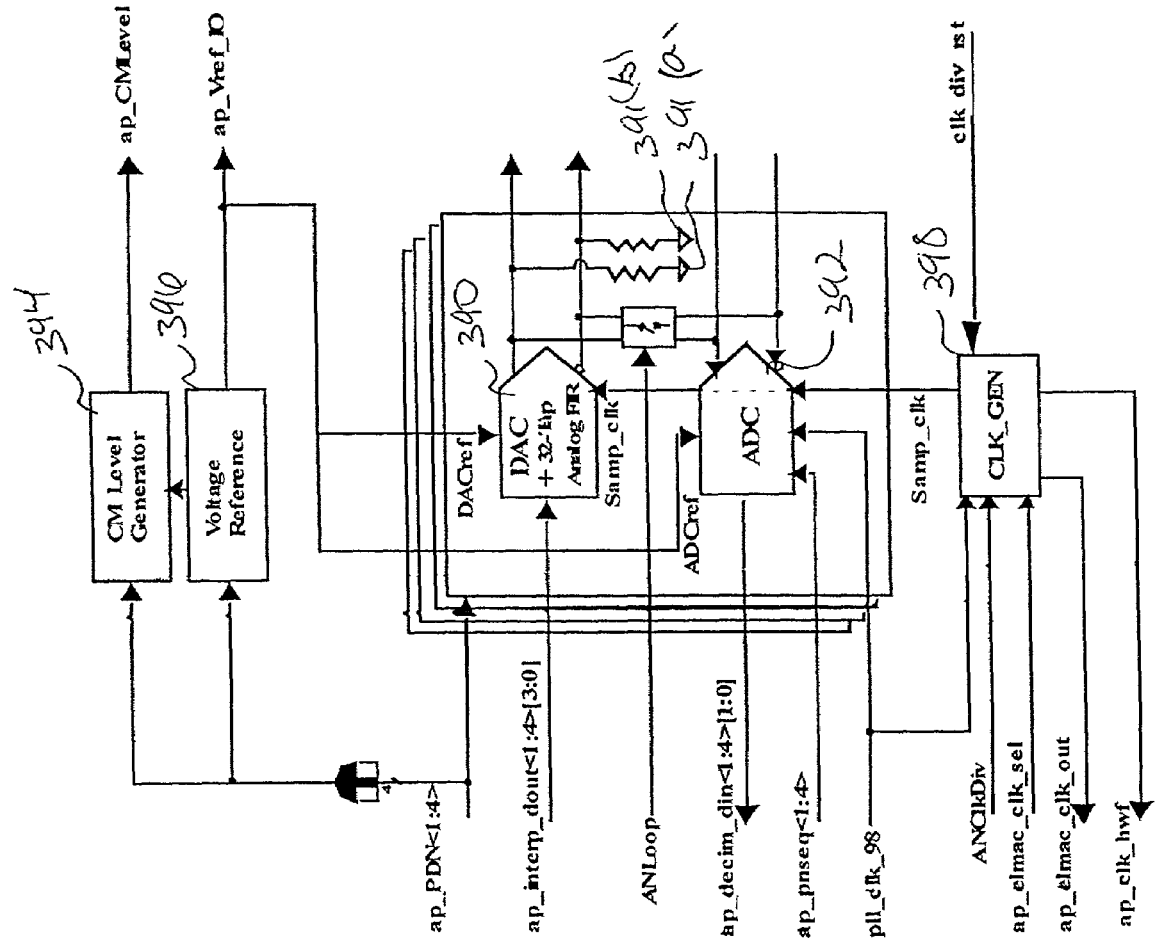
FIG. 11 is a block diagram of the analog front end for interfacing the analog processor with an external subscriber line interface circuit (SLIC) in accordance with a preferred embodiment of the present invention.

FIG. 11 shows a block diagram of the analog front end of the audio processor. The digital input/output data of the DAC/ADC can be interpolated/decimated in the codec DSP logic block to provide 14-bit, 8 kHz input/output data for the audio processor 170. A pair of resistors 391*a*, 391*b* at the output of each DAC 390 converts the current output signal to a voltage. A pair of switches 393 can be provided between the output of the DAC and the input of the ADC to provide analog loopback test capability.

The analog front end may include a common mode voltage level generator 394 which provides an external common mode voltage level. Passive external circuitry coupled with the CM level generator 394 can be used to establish the DC level of the AC coupled input signals for the ADCs 392. A voltage reference 396 can be used to provide signals and bias currents for each of the ADC/DAC pairs and provide a bias current for the CM level generator 394. The reference may be overdriven with an external reference or may be left disconnected externally, allowing the internal bandgap to set the reference voltage. A clock generator 398 can be used to divide the 98.304 MHz PLL clock down to 49.152 MHz, 24.576 MHz and 12.288 MHz. The clock generator 398 provides a sample clock for the ADC 390 and DAC 392.

Figure 11A:
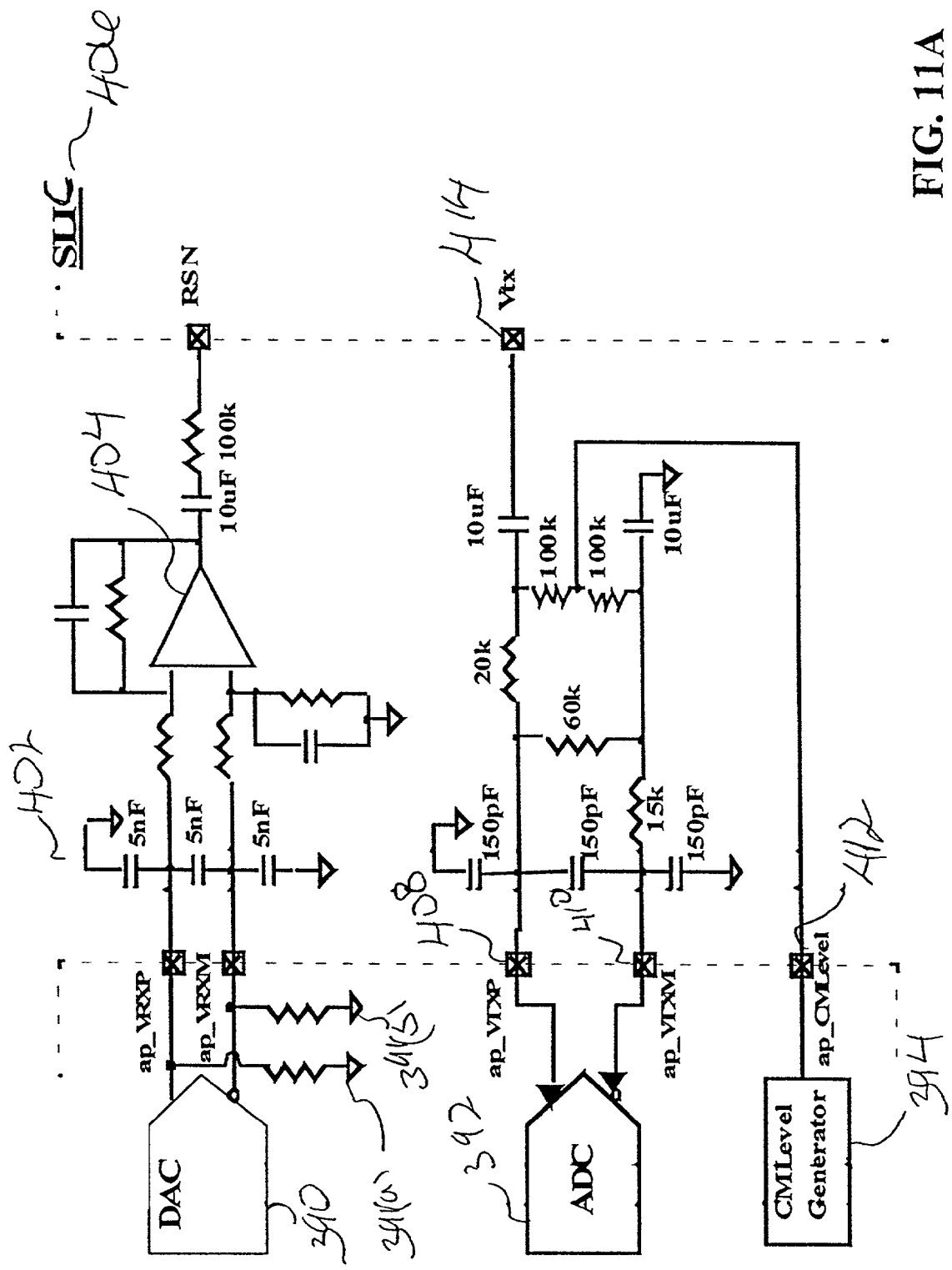
FIG. 11A is a block diagram of an external interface between the analog front end and the subscriber line interface circuit (SLIC) in accordance with a preferred embodiment of the present invention.

The external analog interface between each channel of the audio analog front end and an external SLIC is shown in FIG. 11A. In the described exemplary embodiment, of the analog front end resistors 391*a* and 391*b* convert the current output signal of DAC 390 to a voltage signal. Capacitors 402*a*, 402*b* and 402*c* provide low pass smoothing and anti-alias filtering of the attenuated signal. Op-amp 404 provides signal ended differential conversion and amplification of the DAC output which can then be forwarded to the SLIC 406. In the transmit direction, an RC network at the input of the ADC 392 provides balanced impedances at both ADC input pin and provide attenuation of the transmit signal at the positive input. The balanced impedance interface ensures that power supply and digital substrate noise affect both ADC inputs equally. The ADC 392 samples the difference between the voltages at the inputs 408, 410 so that common noise can be rejected. The passive components fix the ADC input 410 at a constant DC level equal to the common mode level 412 output by the CM generator 394. The ADC input 408 varies in direct proportion to the transmit signal 414 from the SLIC 406.

Figure 12:
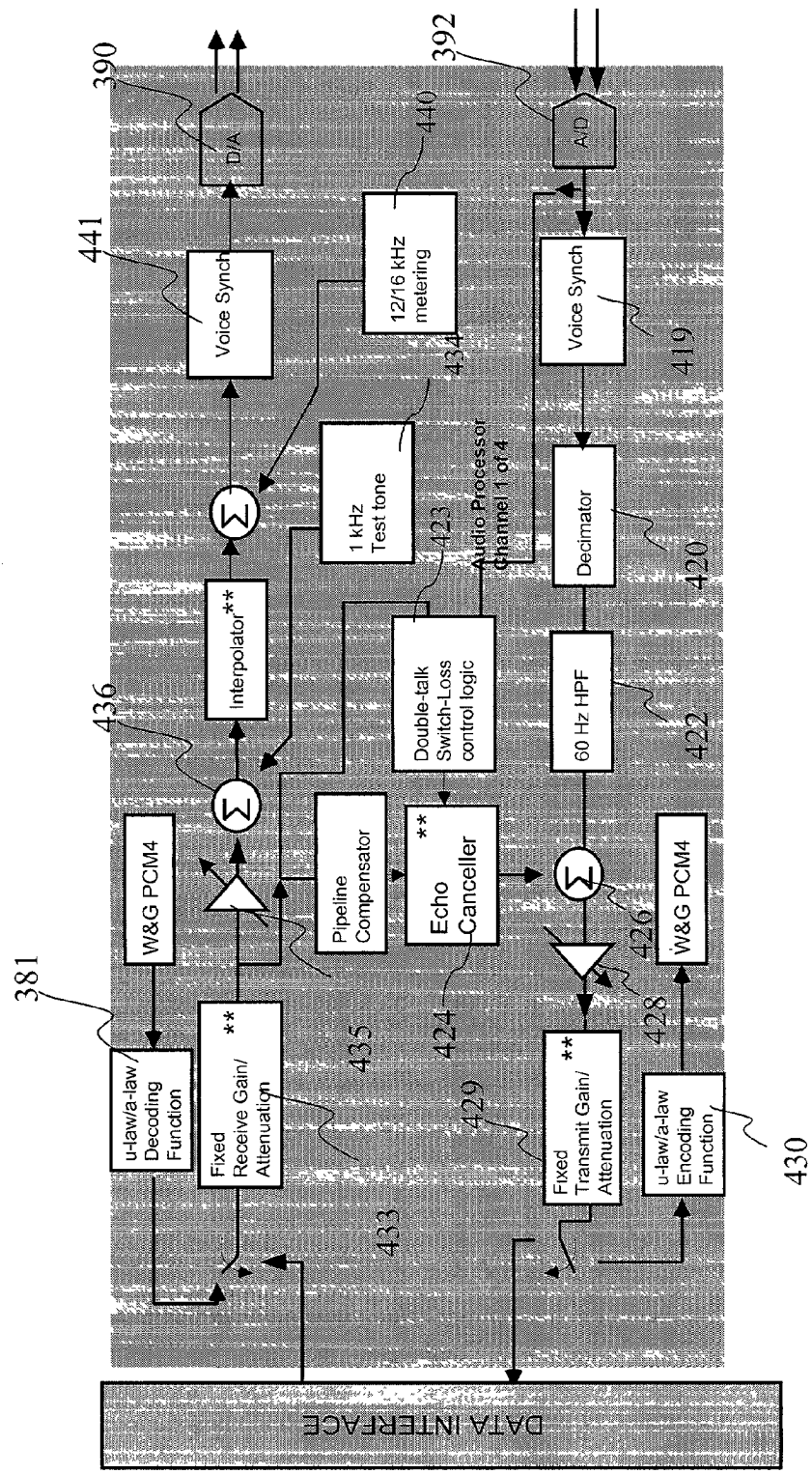
FIG. 12 is a block diagram of the audio processor that interfaces the voice and data processor with external subscriber line circuits (SLICs) via the analog front end in accordance with a preferred embodiment of the present invention.

Referring to FIG. 12 a voice synchronizer 419 synchronizes the near end voice samples received by the ADC 392 to the average timing regeneration circuit clock to ensure voice exchange between the network gateway and CMTS does not introduce jitter due to data underflow or overflow. A decimator 420 downsamples the synchronized output of the voice synchronizer 419 from 96 kHz to a 8 kHz rate. The decimator 420 can be implemented with a FIR filter which may be either minimum phase or linear phase. A minimum phase filter is preferred for application such as voice which need low group delay but may tolerate group delay distortion introduced by the minimum phase filter. The linear phase filter is preferred for fax and data modem applications. The decimator can be used to attenuate signals which can not be represented by the lower sampling rate, and then drop eleven out of every twelve samples. If a sample is not used at the output, there is no need to calculate its value. Therefore the FIR realization of the decimator can be set up to so that only the one sample out of twelve that is needed is calculated, and then the data set is advanced by twelve samples and the next output is calculated, thereby forgoing the intervening eleven samples.

The decimated signal can be filtered by a 60 Hz high pass filter 422. The filter 422 reduces the 60 Hz interference induced on the transmit line due to proximity to power lines. The filter provides on the order of about 20 dB attenuation at 60 Hz relative to the transmission path loss at 1004 Hz. The filtered signal can be conditioned by a network echo canceller 424. The network echo canceller may interface with ITU-T G711, G726, G728 and G729 encoders. Double talk logic 423 can provide control functions including voice detection, automatic signal level control, transmit/receive gain switching balance, noise level estimation and double talk detection. The adaptive cancellation processes the receive side signal samples through an adaptive model of the hybrid coupling and subtracts the result from the transmit side in difference operator 426. A high pass filter 425 is coupled to the echo canceller input to match the echo path impulse response.

Programmable gain adjuster 428 applies a fixed gain or attenuation to output 426(*a*) of the difference operator 426. Gain adjuster 428 can provide programmable gain/attenuation adjustments of +/−20 dB with step size of 1 dB. A fixed gain of attenuation 429 is applied to the gain adjusted signal. A multiplexer 427 coupled to the output of the fixed gain 429 allows the signal to be routed to a A-law/μ-law (G.711 compatible) encoder 430 which is coupled to an external PCM port which allows for external testing of the audio processor module. Multiplexer 429 also forwards the gain adjusted output signal to the voice processor 160 via the DSP interface 168 (see FIG. 3).

The described exemplary embodiment of the audio processor includes multiplexer 431 coupled to the data interface in the receive mode. Multiplexer 431 may couple decoded samples to a A-law/μ-law decoder 432 which is also coupled to an external PCM port to allow for external testing of the audio processor module. The multiplexer 431 may also forward decoded samples from the data interface to a gain adjuster 435 which applies a fixed gain or attenuation to the decoded signal 433. Gain adjuster 435 compensates for system level gain adjustments and may provide programmable gain/attenuation adjustments on the order of about +/−20 dB with a step size of 1 dB. A 1 kHz test tone generator 434 that provides a digital representation of a 1004 Hz test tone at a level of 0 dBm. The test tone may be optionally injected into the data stream by summer 436 to debug and verify the audio processor. The test tone may be configurable in both frequency and amplitude, although it is preferably limited by the 8 kHz sample rate such that only 0–4 kHz may be allowed.

An interpolater 438 modifies the sample rate from 8 to 96 kHz. The interpolator 438 can be implemented with a FIR filter which may be either minimum phase or linear phase. A minimum phase filter is preferred for voice applications which require low group delay but may tolerate group delay distortion which may be introduced by the minimum phase filter. A linear phase filter is preferred for fax and or modem applications. In addition, a metering pulse generator 440 can be used to generate 12/16 kHz metering pulses that are summed with the interpolated signal by summer 442. The metering pulses allow a user to monitor the cost of the call as it progresses. The rate at which the metering pulse generator 440 transmits the metering pulses varies depending on the rate per minute of the call. The minimum gap between pulses is, by way of example, on the order of about 100 msec but may be much greater for inexpensive local calls. The amplitude of the metered pulses can be adjustable to accommodate impedance changes during the on hook, off hook and ringing states. The interpolated signals are forwarded to the DAC 390 for communication to a telephony device via the SLIC (not shown)

Power efficiency is often important for telephony applications. Therefore, the described exemplary embodiment of the audio processor includes the capability to enter a power saving/sleep mode wherein only those functions that are required for wake up are active. All circuits should be capable of reaching active steady state within about a 10 msec activation period.

Figure 13:
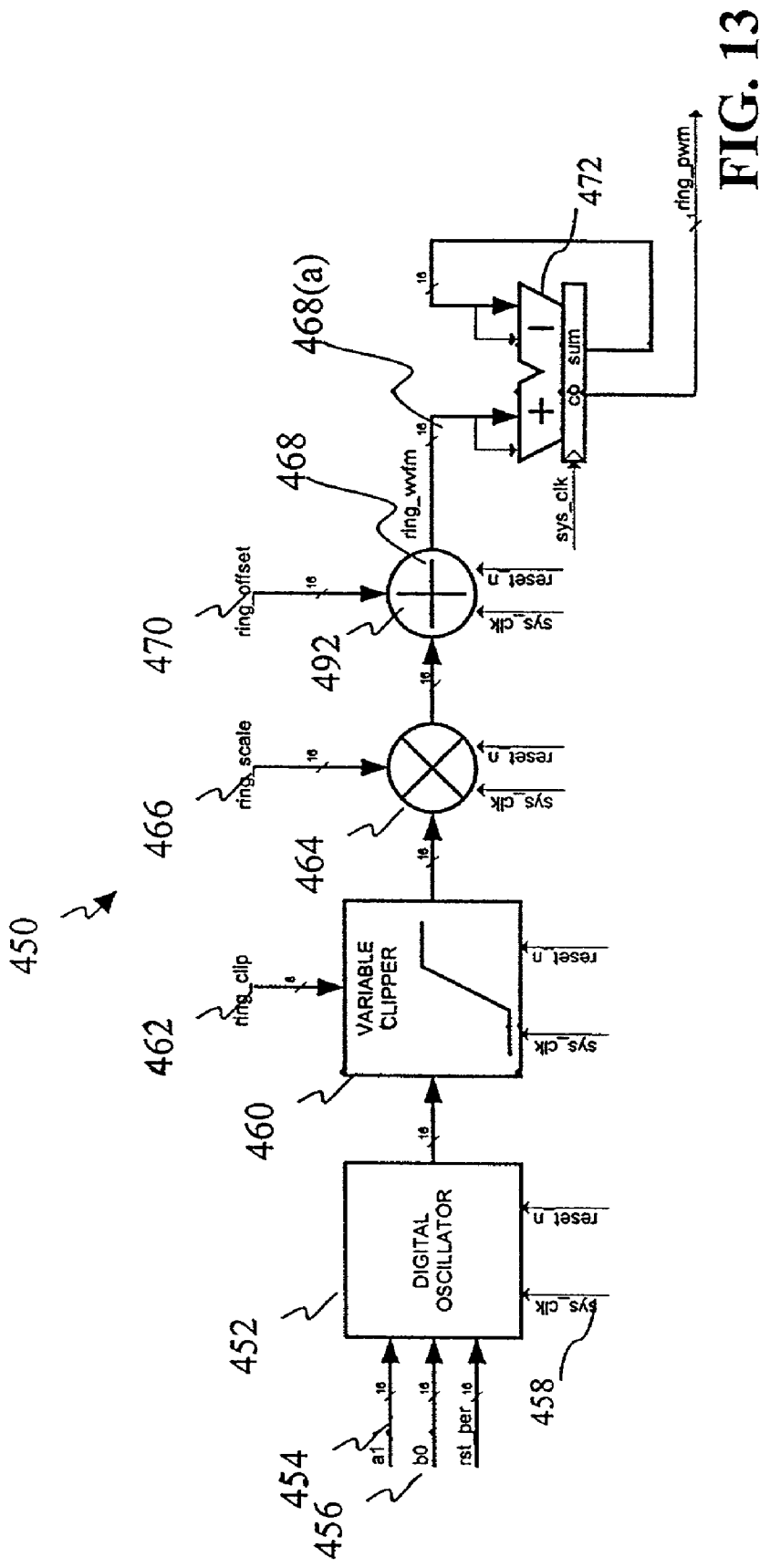
FIG. 13 is a block diagram of a ring generator that synthesizes a reference waveform that is utilized by external SLICs to ring telephony devices in accordance with a preferred embodiment of the present invention.

The described exemplary embodiment of the preferred audio processor 170 further includes a ring generator which synthesizes reference waveforms which are forwarded to the SLIC to ring telephony devices. The ring generator can be used to support sinusoidal, trapezoidal and square waves. In addition the ring generator frequency, amplitude and DC offset can be configurable. A block diagram of a preferred ring generator 450 is shown in FIG. 13. The ring generator 450 includes a digital oscillator 452 which generates a sinusoid of a given frequency and amplitude determined by instructions 454, 456 from the DSP core of the voice processor 160 via the DSP/PB interface 168 (see FIG. 3). The sample rate of the sinusoid can be, by way of example, on the order of about 1000 Hz, divided down from the 24.576 MHz system clock input 458. A variable clipper 460 symmetrically clips the sinusoid about zero such that the sinusoid may be converted into either a trapezoid or into a square wave. The DSP core of the voice processor 160 (see FIG. 3) can be used to define the thresholds 462 with which the sinusoidal waveform is clipped. The clipped waveform can be scaled by multiplier 464, which applies a signal attenuation 466 defined by the voice processor 160. Summer 468 provides a configurable DC offset by adding a DC bias 470 as established by the voice processor. The offset may vary from negative full scale to positive full scale. A converter 472 can be used to convert the ring waveform 468(a) into a single bit representation. A single pole analog filter may be included on the output of the converter to reduce the quantization noise generated by the converter 472. The filtered signal is then forwarded the analog front end 172 for communication to a telephony device via the SLIC. In the described exemplary embodiment, of the audio processor each audio channel may be routed to a PCM port to allow for system level PCM testing. The PCM system tests, by way of example, can require compliance with ITU G.711 for A-law and µ-law encoding/decoding.

A. Voice Synchronization

Digitizing and transmitting voice data via packets in a network system is a common telephony problem. Customarily Pulse Code Modulation (PCM) techniques digitize a voice signal by sampling an analog voice signal and converting each sample into a digital code which is communicated between compatible receiving and transmitting systems on the near and far ends of the network. In addition, in a voice band data mode, the exemplary network gateway may transparently exchange data without modification (other than packetization) between a near end telephony device (or circuit switched network) and the packet based network. This is typically used for the exchange of fax and modem data when bandwidth concerns are minimal. The problem that arises is that the receiving system's clock may not be correlated with the transmitter's clock. This difference, even if minute, may cause the sample buffer in the receiving unit to underflow or overflow. In the case of data underflow, samples are extracted from a sample buffer faster than samples are written to the buffer so that the system may collapse from data starvation. During data overflow, voice signals transmitted from one communication port enter the sample buffer in the receiving unit faster than they are extracted. The resulting overflow of data signals may result in artifacts in a voice call or data in voiceband data mode.

To prevent data signal overflow and underflow, it is, therefore, desirable to synchronize the receiving clock to the incoming data rate. A voice synchronizer may be used for this purpose. Although the the voice synchronizer is described in the context of an audio processor system within a network gateway, those skilled in the art will appreciate that the voice synchronizer is likewise suitable for various other telephony and telecommunications application.

Figure 14:
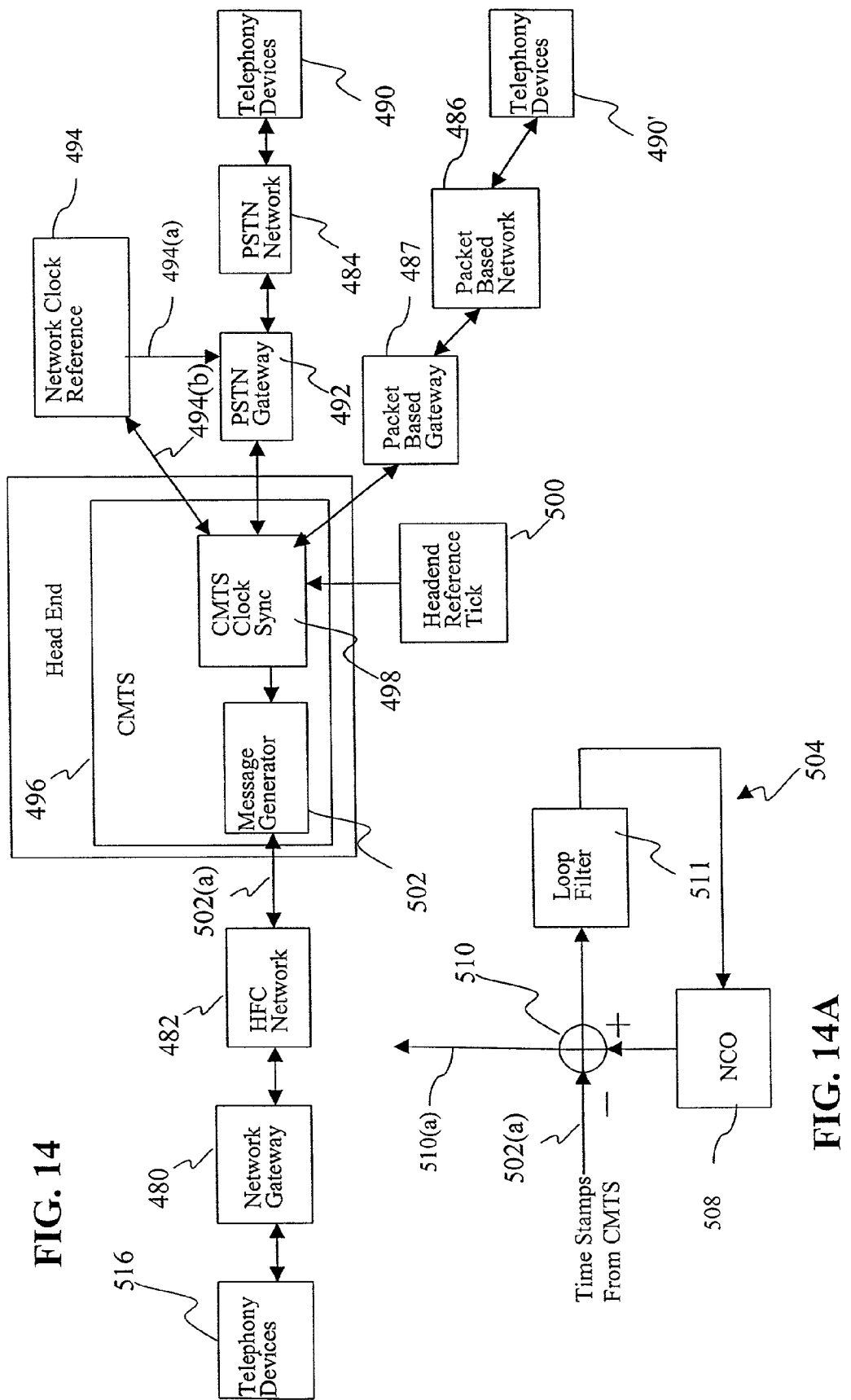
FIG. 14 is a system block diagram of a network gateway for interfacing between a hybrid fiber coaxial (HFC) network and a switched circuit network and a packet based network in accordance with a preferred embodiment of the present invention.

Referring to FIG. 14, network gateway 480 supports the exchange of voice between a hybrid fiber coaxial (HFC) network 482 and a traditional circuit switched 484 or a packet based network 486. In an exemplary embodiment, telephony device 490 is connected to the PSTN over PSTN telephone gateway 492. The PSTN telephone gateway 492 may be clocked by a telephony network clock signal 494(a) from network clock reference 494 which is also coupled to CMTS 496 such that the PSTN telephone gateway 492 may be synchronized with the CMTS clock for the transfer of PCM voice packets 492(a) between the CMTS 496 and the PSTN telephone gateway 492. The telephony network clock is preferably a conventional Building Integrated Timing Supply (BITS) clock. The equipment requirements for interfacing to this clock are known to those skilled in the art and are described in Bellcore document TR-NWT-001244 the content of which is incorporated herein by reference as if set forth in full. The CMTS clock is synchronized with the telephony network clock signal 494(b) via CMTS clock synchronizer 498 which utilizes headend reference tick clock 500, as described in U.S. patent application Ser. No. 09/501,850, the contents of which is incorporated herein by reference as if set forth in full.

A timebase message generator 502 generates time messages or stamps which provide the network gateway 480 an absolute time reference which is representative of the frequency of the crystal oscillator timing reference (not shown) of the CMTS 496, which is in turn synchronized to the telephone network clock 494.

Referring to FIG. 14A, the network gateway 480 preferably includes a digital tracking loop 504 that provides a substantially stable clock output 510(a). A difference between the time stamps forwarded by the CMTS and the output of a local time reference, that is derived from a numerically controlled oscillator 508, is formed by differencing circuit 510. This difference defines a frequency error value. This frequency error value is filtered by loop averaging filter 511 which prevents undesirable deviations in the frequency error value from affecting the numerically controlled oscillator 508 in a manner which would decrease the stability thereof or cause the numerically controlled oscillator 508 to operate at other than the desired frequency. The loop filter 511 can be configured so as to facilitate the rapid acquisition of the frequency error value, despite the frequency error value being large, and then to reject comparatively large frequency error values as the digital tracking loop 504 converges, i.e., as the output of the local timing reference becomes nearly equal to the absolute time reference, thereby causing the frequency error value to approach zero.

Figure 15:
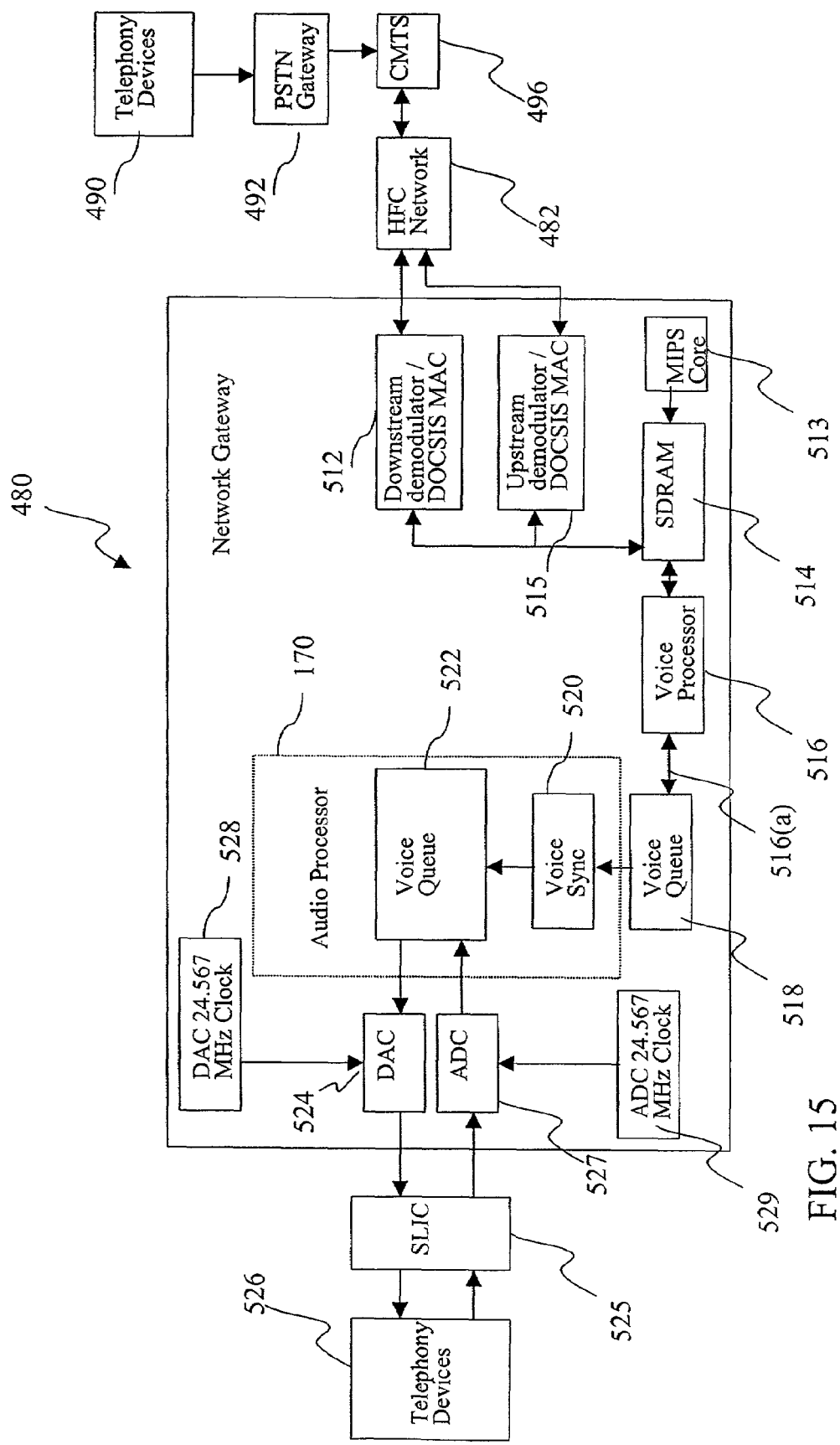
FIG. 15 is a block diagram of a network gateway including a voice synchronizer for synchronizing voice data signals between telephony devices on the near and far ends of a HFC network in accordance with a preferred embodiment of the present invention.

Referring to FIG. 15, in the downstream direction, voice or voiceband data packets are received by the network gateway 480, demodulated and re-formatted by the downstream demodulator/DOCSIS MAC 512 and forwarded to system memory 514. In this and other embodiments, common reference numerals may be used to represent like components. The voice data is forwarded to a decoder system (not shown) within the voice processor 516. The decoder system preferably provides delay compensation, voice decoding, DTMF generation, call progress tone generation, comfort noise generation and lost frame recovery. Processed voice sample are then forwarded to a first voice queue 518. A voice synchronizer 520 is coupled to the output of the first voice queue 518. The voice synchronizer 520 re-samples the voice frames stored in the first voice queue 518 in accordance with an error signal and forwards re-sampled voice signals to a second voice queue 522 so that the rate at which samples are removed from the second voice queue 522 by a DAC 524 matches the rate at which they are inserted into the second voice queue 522 by the voice synchronizer 520.

In operation, each time the clock of the DAC 524 decrements to zero, a sample can be removed from the second voice queue 522 and transmitted to the near end telephony device 526 via a subscriber line interface circuit 525. In the described exemplary embodiment, the DAC 524 is preferably driven by sampled DAC clock 528. In a jitter-free system, the DAC 524 removes frames from the second voice queue 522 at the exact same rate at which frames are inserted into the first voice queue 518 by the voice processor 516. However, when jitter or other impairments are present voice synchronization is needed because the DAC clock of the receive unit within the network gateway may not be correlated to the far end sample clock that generated the received data. In a data underflow condition in the downstream direction, the DAC clock 528 in the network gateway 480 leads the far end sample clock so that if left uncorrected samples would be removed from the second voice queue 522 faster than they are being inserted in the first voice queue 516, so that the system may collapse from data starvation. During a data overflow condition in the downstream direction, the DAC clock 528 in the network gateway lags the far end sample clock so that samples are inserted into the voice queue faster than they are removed. The resulting overflow may result in artifacts in a voice call or data in voiceband data mode.

In the described exemplary network gateway, in the downstream direction a lost frame recovery engine in the voice and data processor is implemented whereby missing voice is filled with synthesized voice during data underflow conditions using the linear predictive coding model of speech. The voice is modelled using the pitch and spectral information from digital voice samples received prior to the lost packets. Similarly, during data overflow the voice and data processor preferably performs frame deletions to substantially eliminate the overflow condition. However, in voiceband data mode lost data may not be readily tolerated or recreated. Therefore, in voiceband data mode, the described exemplary voice synchronizer fractionally decimates the received voice signal 516(*a*) stored in the first voice queue 518 during data overflow and fractionally interpolates the voice samples during data underflow. Although voice synchronization is described in the context of an audio processor for voice and voice band data exchange over cable modem, those skilled in the art will appreciate that the techniques described for signal synchronization are likewise suitable for various applications requiring the synchronization of a signal in a system having two uncorrelated clocks. Accordingly, the described exemplary embodiment for voice and voiceband data synchronization in a signal processing system is by way of example only and not by way of limitation.

Figure 16:
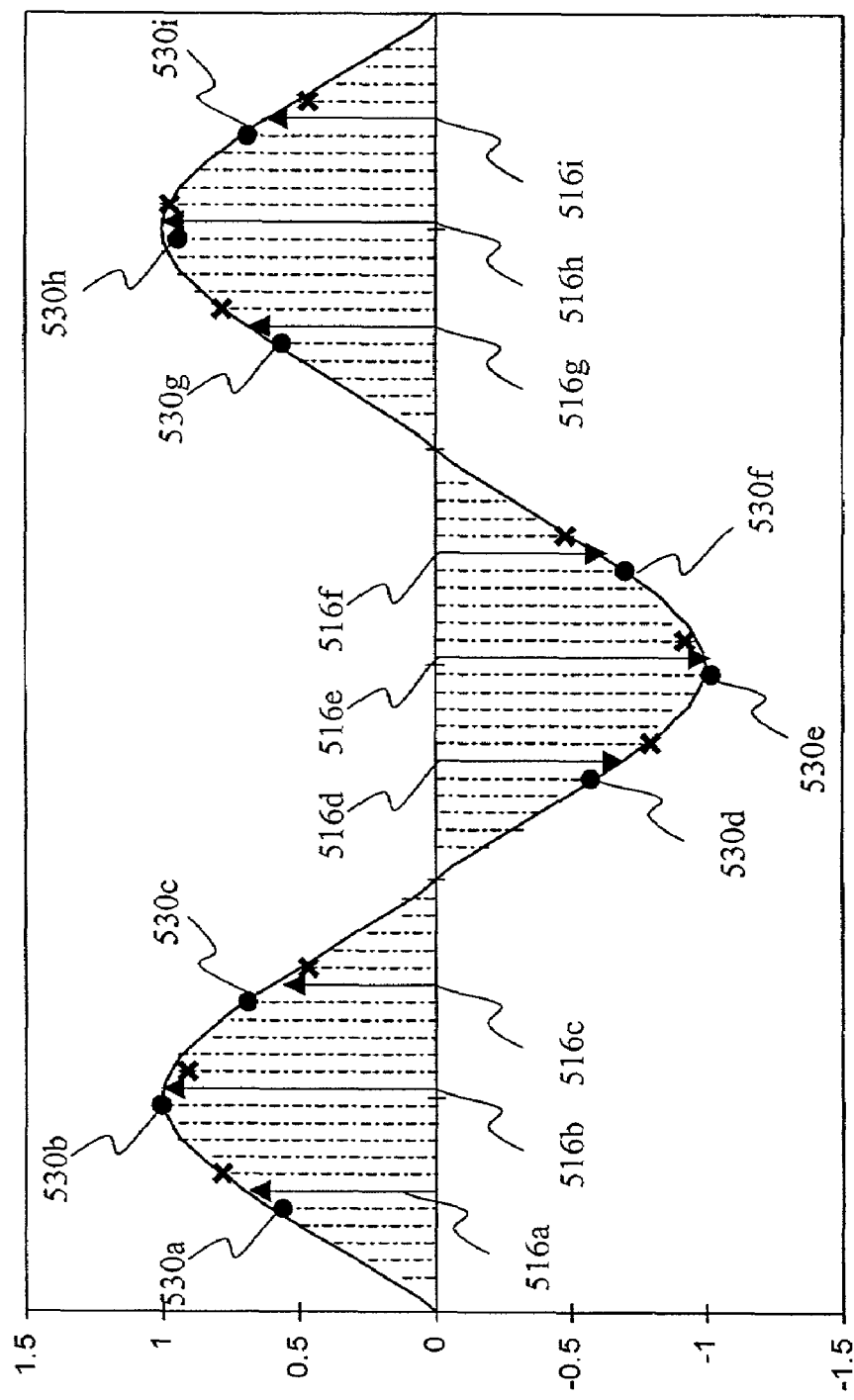
FIG. 16 is a graphical depiction of fractional interpolation and decimation of a digitized analog voice signal in accordance with a preferred embodiment of the present invention.

For example, referring to FIG. 16 a given input voice signal 516(*a*) may be represented by a series of samples 516(*a–i*) shown with arrow terminations. In the described exemplary embodiment, samples 516(*a–i*) satisfy Nyquist sampling criteria so that input voice signal 516 may be completely reconstructed from the series of samples 516(*a–i*). Therefore, the input voice signal may be over sampled as represented by the dashed lines. For the data underflow case where the receive clock leads the transmit clock the input voice signal 516(*a–i*) may be sampled at a slightly higher frequency 530(*a–i*) shown with circles, so as to substantially eliminate the data underflow condition, by generating additional samples as a function of time.

Similarly, for the data overflow condition, the input voice signal may be downsampled with a slightly lower frequency, shown with "x" terminations, so as to substantially eliminate the data overflow condition by generating fewer samples as a function of time. For example if the DAC clock 528 were 96.0000152587890625 kHz, and the far end transmit clock as represented by the rate at which samples are written into the first voice queue 518 is 96.0 kHz, then the voice synchronizer 520 would preferably generate an additional data sample every 1/(0.0000152587890625)=65536 samples. Therefore, the incoming signal would have to be resampled at the rate of (65536) (96 kHz) or 6.291456 GHz. Advantageously, the described exemplary embodiment generates an error signal as a function of the ratio between the rate at which frames arrive or are placed into the first voice queue 518 and the rate at which frames are removed from the second voice queue 522 so that only those samples that are required to fractionally decimate or interpolate the input voice signal should be computed.

Referring back to FIG. 15, in the upstream direction, the near end telephony device 526 transmits an analog voice signal to the network gateway 480 via the SLIC 525. An analog to digital converter 527 converts the incoming analog signal to digital samples with an ADC sample clock 529. If the TRC clock and the ADC clock are correlated, the ADC output is forwarded to the audio processor 170 for decimation, echo cancellation and other processing as previously described, prior to being forwarded to the encoder system of the voice processor 516. The voice processor encoder system can be provide, among other things, DTMF and call progress tone detection, voice activity detection, voice compression, and comfort noise estimation. Encoded voice sample are then forwarded to system memory 514 for transmission to the far end telephony device 490 by the upstream modulator and MAC 515. However, if the ADC clock 529 and the TRC clock are uncorrelated, voice synchronizer 520 should synchronize the digital voice samples to the TRC clock.

Figure 17:
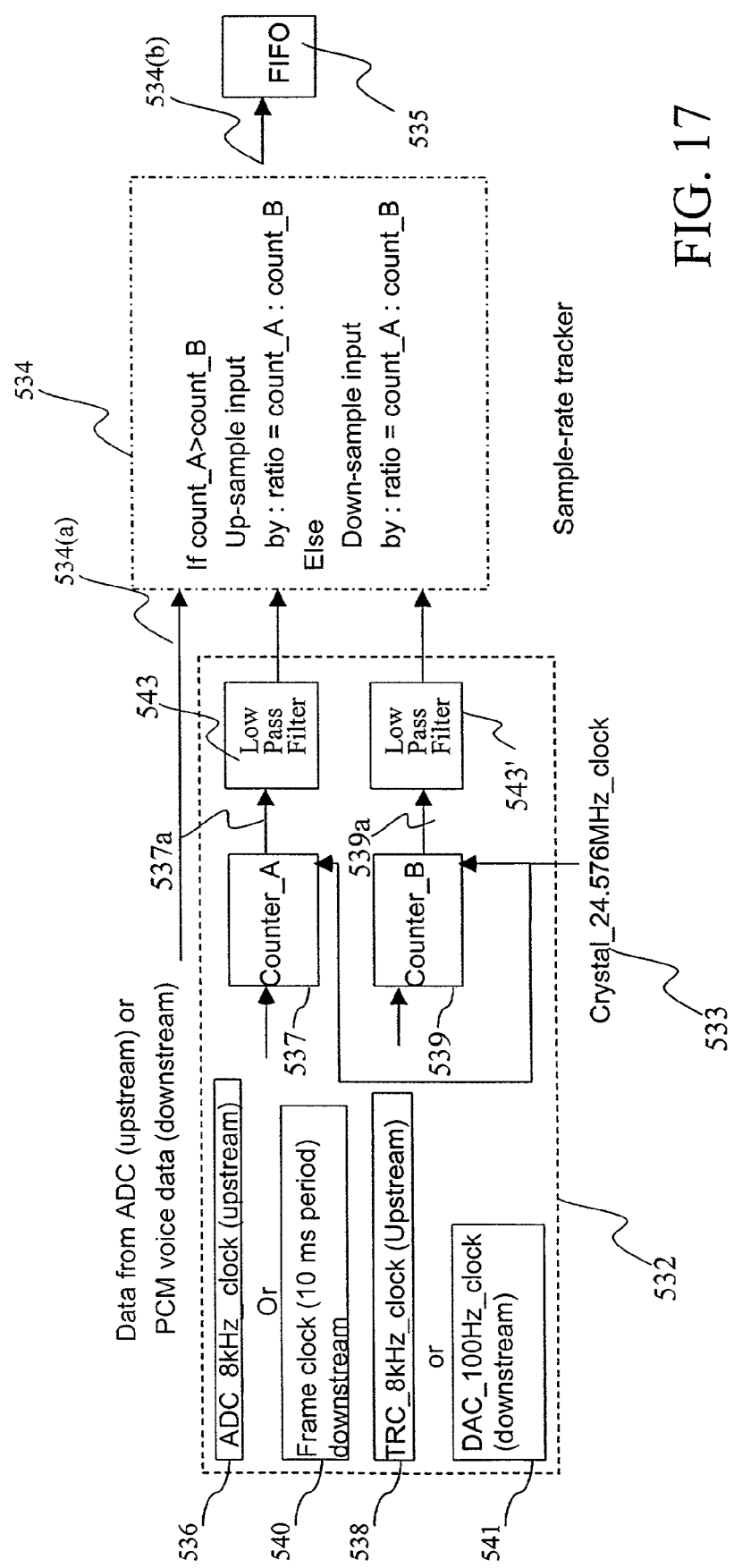
FIG. 17 is a general block diagram of a voice synchronizer that generates an error signal which is used to polyphase resample the input voice signal so as to synchronize the near end signal with the far end signal in accordance with a preferred embodiment of the present invention.

A general block diagram of an exemplary voice synchronizer is shown in FIG. 17. The voice synchronizer preferably includes an error generation unit 532, a sampling rate tracker 534 and a voice queue or FIFO 535. The error generation unit 532 includes two counters each of which may be clocked by a locally generated reference at 24.576 MHz 533. In the upstream direction the ADC forwards digital samples to the sample rate tracker 534. With the assumption that the ADC clock and the TRC clock are uncorrelated, an ADC 8 kHz clock 536 drives a first counter 537 and a TRC 8 kHz clock 538 drives a second counter 539. Counter outputs 537(*a*) and 539(*a*) are forwarded to low pass filters 543, 543' that average the output count (see FIG. 18A). The sample rate tracker 534 preferably fractionally decimates or interpolates the incoming signal 534(*a*) in accordance with the ratio of count A to count B. Thus if count A is larger than count B the sample rate tracker up-samples the incoming signal 534(*a*) by the ratio count A to count B. Otherwise the sample rate tracker 534 downsamples the incoming signal 534(*a*) by the ratio count A to count B. The sample rate tracker 534 forwards the resampled signal 534(*b*) to the FIFO 535 wherein the samples are assembled into a frame. The assembled frame is then forwarded to an encoder system of the voice and data processor (not shown) for voice compression, such as for example G.729.

Referring to FIG. 17B, the operation of an exemplary sample rate tracker may be best demonstrated by an example. In FIG. 17B it is assumed that the input sample count, shown as samples 1, 2, 3, and 4, is 65537 and the output sample count, shown as samples A, B, C and D, is 65536 thereby creating a slight overflow condition. The distance between for example, sample 2 and B is equal to 1/65536 of one input sample period. Therefore, an incoming 8 kHz signal would have to be resampled at the rate of (65536) (8 kHz) or 524.288 MHz to generate the additional samples required to eliminate the overflow condition. Referring to FIG. 17C, in the extreme 65535 zeros would be placed between each individual data sample of the input signal stored in a data buffer. In a typical application eighteen data points would be used to compute the resampling. The number of data points represents a trade between the quality of the conversion and computational complexity. Low pass filter coefficients (Coef-1 through Coef-1179648) would be computed which, when applied to the samples stored in the buffer yield the resampled signal.

Advantageously, the generation of the error signal, defined as the output count divided by the input count, facilitates the regeneration of the desired resampled output with a reduced number of filter coefficients. For example, referring to FIG. 17D, to compute output B we shift 655357 inputs with 65535 zeros, so that sample 65536 is not equal to zero and sample number 65537 is equal to zero. Therefore, only eighteen filter coefficients multiply non zero data and only those eighteen coefficients need be calculated for each sample. They are 2, 2+65536, 2+(2*65536), . . . 2+(17*65536). The process would then be repeated to compute output sample C. The first 65534 samples are zeros, sample number 65536 is non zero and sample 65537 is equal to zero.

Figure 17A:
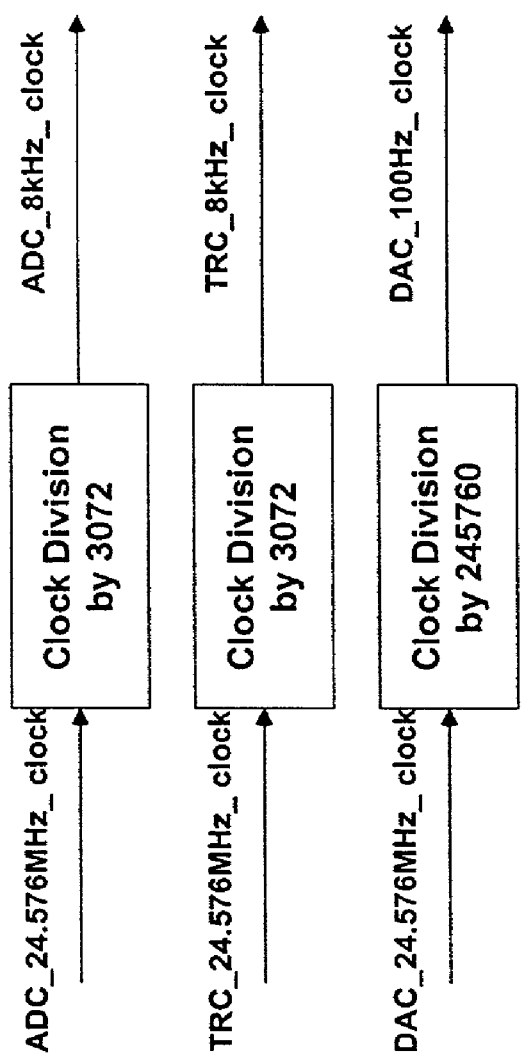
FIG. 17A is a block diagram of clock divider circuits for generating various clocks for use within the network gateway in accordance with a preferred embodiment of the present invention.

In the downstream direction incoming PCM voice data is forwarded to the sample rate tracker 534. The voice data may not be synchronized to the local DAC sample clock that converts the received voice samples to an analog format prior to transmission to the near end telephony device. In the downstream direction the first counter 537 is driven by an adjustable frame clock 540. The speed of the frame clock is negotiated between the network gateway and the CMTS and is assumed to be 10 msec. The frame clock 540 may be generated by the MIPS core, or the DSP of the voice processor as a function of frame arrival time. The second counter 539 is preferably driven by a 100 Hz DAC clock 541 that is generated by a clock division counter as shown in FIG. 17A. The sample rate tracker 534 preferably fractionally decimates or interpolates the incoming signal 534(*a*) in accordance with the ratio of count A to count B. Thus if count A is larger than count B the sample rate tracker up-samples the incoming signal 534(*a*) by the ratio count A to count B. Otherwise the sample rate tracker 534 downsamples the incoming signal 534(*a*) by the ratio count A to count B. The sample rate tracker 534 forwards the resampled signal 534(*b*) to the FIFO 535 (second voice queue 522 of FIG. 15). The resampled signal is then converted to an analog signal via a DAC that may use 24.576 MHz DAC clock.

Figures 18, 18A:
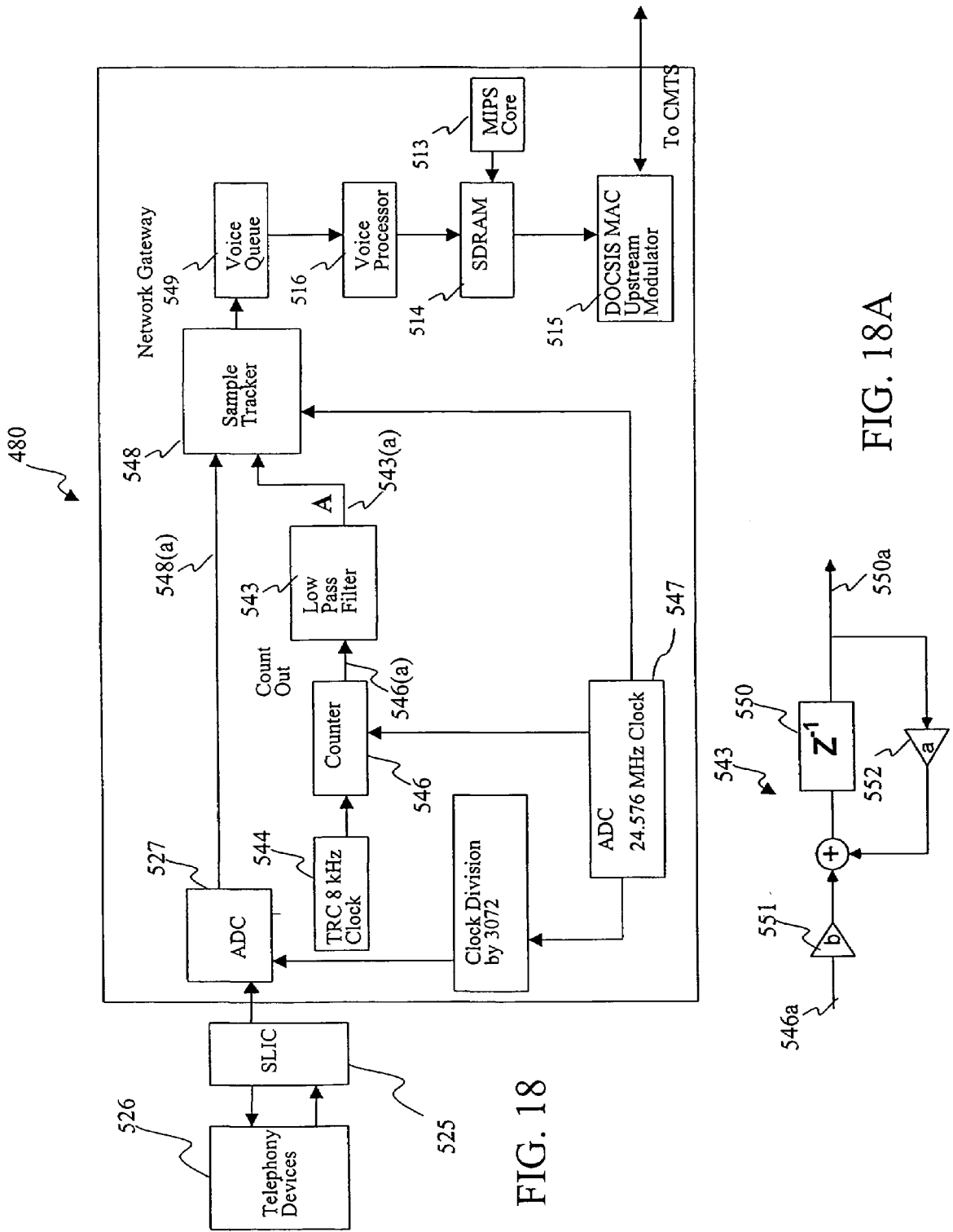
FIG. 18 is a voice synchronizer for the upstream direction wherein the TRC clock drives a counter which is clocked by a high frequency ADC clock and the incoming voice signal is re-sampled in accordance with the ratio of the counter output divided by the ratio of the high frequency ADC clock and the TRC clock in accordance with a preferred embodiment of the present invention.
FIG. 18A is a block diagram of a single pole low pass filter used to smooth or average the differences between sampling rates in accordance with a preferred embodiment of the present invention.

FIG. 18 shows an alternative approach to voice synchronization. In the upstream direction the ADC 527 again digitizes analog voice data received from the near end telephony device 526 via the SLIC 525. The ADC 527 then forwards the digital samples to a sample rate tracker 548. In this instance the error generation unit utilizes a single counter to derive the offset between the ADC and TRC clocks. With this approach, the TRC 8 kHz clock 544 drives a counter 546 that utilizes an ADC 24.576 MHz clock 547 as a reference to count the number of periods within one 8 kHz TRC cycle. The counter forwards this count 546(*a*) to the low pass filter 543. The low pass filter as shown in FIG. 18A is preferably a single pole 550 filter that smooths the transitions between different sampling rates. A first scale factor (b) 551 applies a fixed gain to the count out signal and a second scale factor (a) 552 is the time constant of the filter. Preferably the scale factors are interrelated according to the following: b=1−a. The duration of the time constant represents a tradeoff between tracking accuracy and jitter and is preferably in the range of about 1–20 msec.

In this embodiment, the sample rate tracker 548 fractionally decimates or interpolates the incoming signal 548(*a*) in accordance with the filtered counter output 543(*a*) as compared to 3072. In the case where the TRC clock and the ADC clock are perfectly correlated the counter would output 3072 and the incoming signal 548(*a*) would not be resampled. However, for the case where the filtered counter output 543(*a*) is greater than 3072, the incoming signal is upsampled by the filtered counter output 543(*a*) divided by 3072 (A/3072). Similarly, when filtered counter output 543(*a*) is less than 3072, the incoming signal is down-sampled by the filtered counter output 543(*a*) divided by 3072 (A/3072).

Figure 18B:
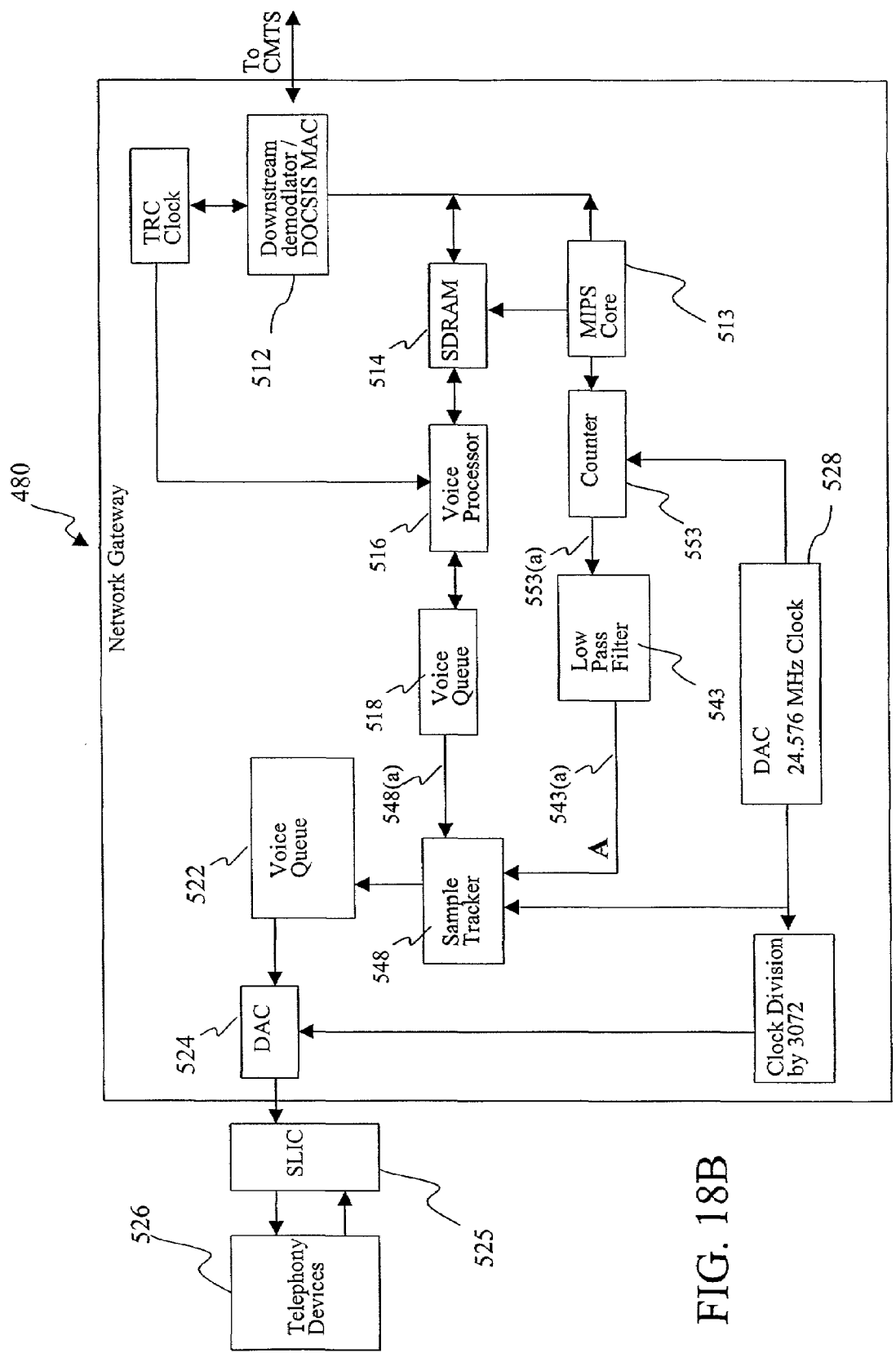
FIG. 18B is a voice synchronizer for the downstream direction wherein a frame arrival clock drives a counter that is clocked by a high frequency DAC clock so that the incoming voice signal is re-sampled in accordance with the ratio of the counter output divided by the ratio of the high frequency DAC clock and the frame arrival in accordance with a preferred embodiment of the present invention.

Referring to FIG. 18B, in an alternate voice synchronizer in the downstream direction, the MIPS core 513 increments a counter 553 when the network gateway 480 receives a new voice frame from the CMTS (not shown). The counter 553 preferably utilizes the DAC 24.576 MHz clock 528 as a reference. The counter output 553(*a*) provides the difference between the frame clock and the DAC clock. A low pass filter 543' again smooths or averages the difference in various frame arrival rates as previously described. The sample rate tracker 548 fractionally decimates or interpolates the incoming signal 548(*a*) in accordance with the output of filtered counter count 543(*a*) as compared to 24576. In the case where the frame arrival clock and the DAC clock are perfectly correlated the counter 553 would output 24576 and the incoming signal would not be resampled. However, for the case where the filtered counter output 543(*a*) is greater than 24576 the sample tracker 548 upsamples the incoming signal by the output 543(*a*) of the low pass filter divided by 24576 (i.e. A/24576). Similarly, when the filtered counter output 543(*a*) is less than 24576, the sample rate tracker 548 down-samples the incoming signal by the output 543(*a*) of the low pass filter divided by 24576 (A/24576).

Figure 18C:
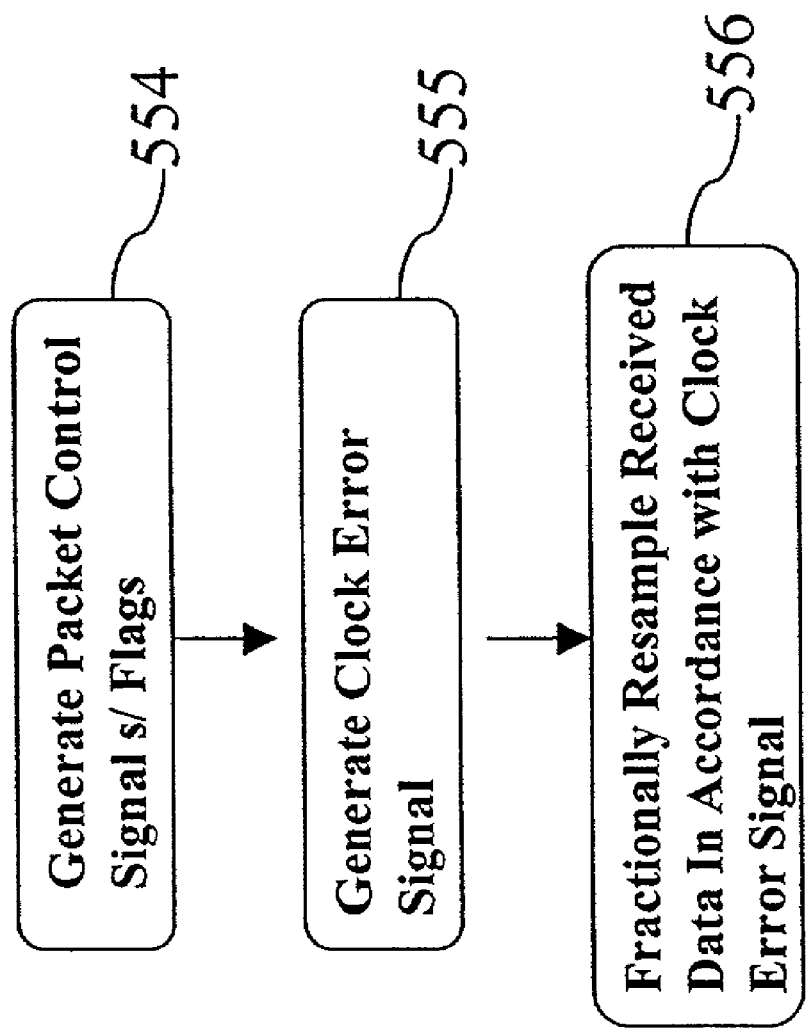
FIG. 18C is a flow diagram illustrating the operation of an alternate voice synchronizer in accordance with a preferred embodiment of the present invention.

Referring to FIG. 18C, an alternate error generation unit utilizes packet control information 554 to generate a far end clock error signal 555 representing the difference between the far end sampling rate and the near end voice playout sampling rate. The clock error signal may then be used to fractionally resample the received data packets 556. In operation the DSP of the voice processor module may read from and write to data packet control registers within local memory of the DSP to monitor and control the flow of downstream data. For example, referring back to FIG. 15, the DSP may write a packet arrive indication to the packet control register when a downstream packet has arrived and been placed in a jitter buffer. The jitter buffer may be part of the voice processor's local memory or may be external memory accessed via the internal system bus and DSP/ISB interface. The voice processor then processes voice samples and forwards the processed samples to the first voice queue 518. In operation the voice queue 518 writes a packet buffer ready indication to the packet control registers, that produces a maskable interrupt that is transmitted to the DSP of the voice processor module. In addition, the DSP may write a packet complete indication to the packet control registers indicating that the next packet has been delivered and clearing the packet buffer ready status. The period of the packet complete indication is negotiated between the network gateway and the CMTS and may be for example 10 msec. The packet complete indication is generated by the DSP of the voice processor in accordance with the reference clock locally generated at the cable modem.

In this embodiment the average far end sampling rate may be obtained from the packet arrival control signal and the near end voice playout sampling rate may be obtained from the packet complete control signal. One of skill in the art will appreciate that the present invention may utilize other control signals to obtain the average far end sampling rate and the near end playout rate. In addition, the control signals may be generated by for example the MIPS core of the cable modem.

Figure 18D:
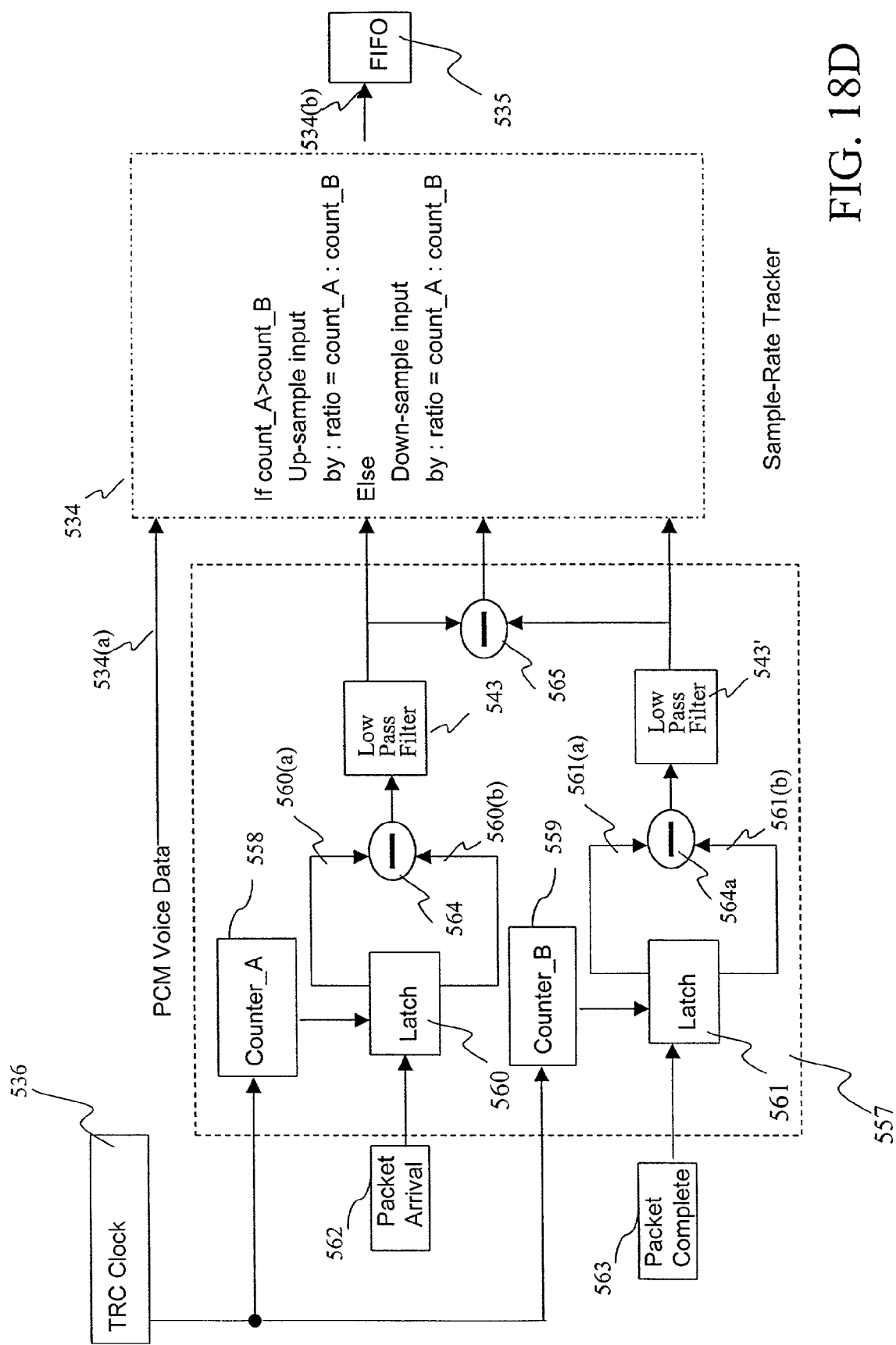
FIG. 18D is a voice synchronizer for the downstream direction wherein the TRC clock drives two counters, one of which latched in accordance with a packet arrival flag, the other of which is latched in accordance with a packet complete control flag, is and the incoming voice signal is re-sampled in accordance with the ratio of the packet arrival counter output divided by the packet complete counter output in accordance with a preferred embodiment of the present invention.

A general block diagram of the alternate downstream voice synchronizer is shown in FIG. 18D. In this and other embodiments, common reference numerals may be used to represent like components. The voice synchronizer preferably includes an error generation unit 557, the sampling rate tracker 534 and the voice queue or FIFO 535. The error generation unit 557 includes two counters 558, 559 each of which may be driven by the locally generated TRC clock 536. The TRC clock may range in frequency from about 8 kHz to 24.576 MHz. However, one of skill in the art will appreciate that increasing the frequency of the TRC clock 536 will provide increasingly accurate error estimates. The first and second latches 560, 561 coupled to counters 558, 559 respectively are responsive to packet arrival control signals 562 and packet complete control signals 563 respectively. Latch 560 therefore outputs the count value between successive packet arrival control signals, i.e. last count 560(a) and current count 560(b) and latch 561 outputs the count value between successive packet complete control signals, i.e. last count 561(a) and current count 561(b). Difference operator 564 is coupled to latch 560 and outputs the difference between the current and the last packet arrival counts, i.e. the count between successive packet arrival control signals output by latch 560. Similarly, difference operator 564a is coupled to latch 561 and outputs the difference between the current and the last packet complete counts, i.e. the count between successive packet complete control signals output by latch 561. Low pass filters 543 and 543' are coupled to difference operators 564, 564a respectively. The low pass filters 543 and 543' as previously described may be single pole filters that smooth the transitions between different sampling rates.

A difference operator 565 is coupled to the output of low pass filters 543 and 543' and forwards an estimate of the difference between the packet arrival period and packet complete period to the sample rate tracker 534. The sample rate tracker also receives the incoming PCM voice data. The sample rate tracker 534 fractionally decimates or interpolates the incoming signal 534(a) in accordance with the ratio of the packet arrival count and the packet complete count. Thus if in operation the packet arrival count is larger than the packet complete count, the sample rate tracker up-samples the incoming signal 534(a) by the ratio of the packet arrival count to the packet complete count. Otherwise the sample rate tracker 534 downsamples the incoming signal 534(a) by the ratio of the packet arrival count to the packet complete count. The sampling rate tracker 534 forwards the resampled signal 534(b) to the FIFO 535. The resampled signal is then converted to an analog signal via a DAC that may use the 24.576 MHz DAC clock.

One of skill in the art will appreciate that the voice synchronizer is not limited to DOCSIS compatible VOIP cable modem systems. Rather the present invention may be utilized to synchronize VOIP data in for example digital subscriber line (DSL) or other packet based networks. Therefore, the disclosed cable modem embodiment is by way of example only and not by way of limitation.

B. Echo Cancellation

Figure 19:
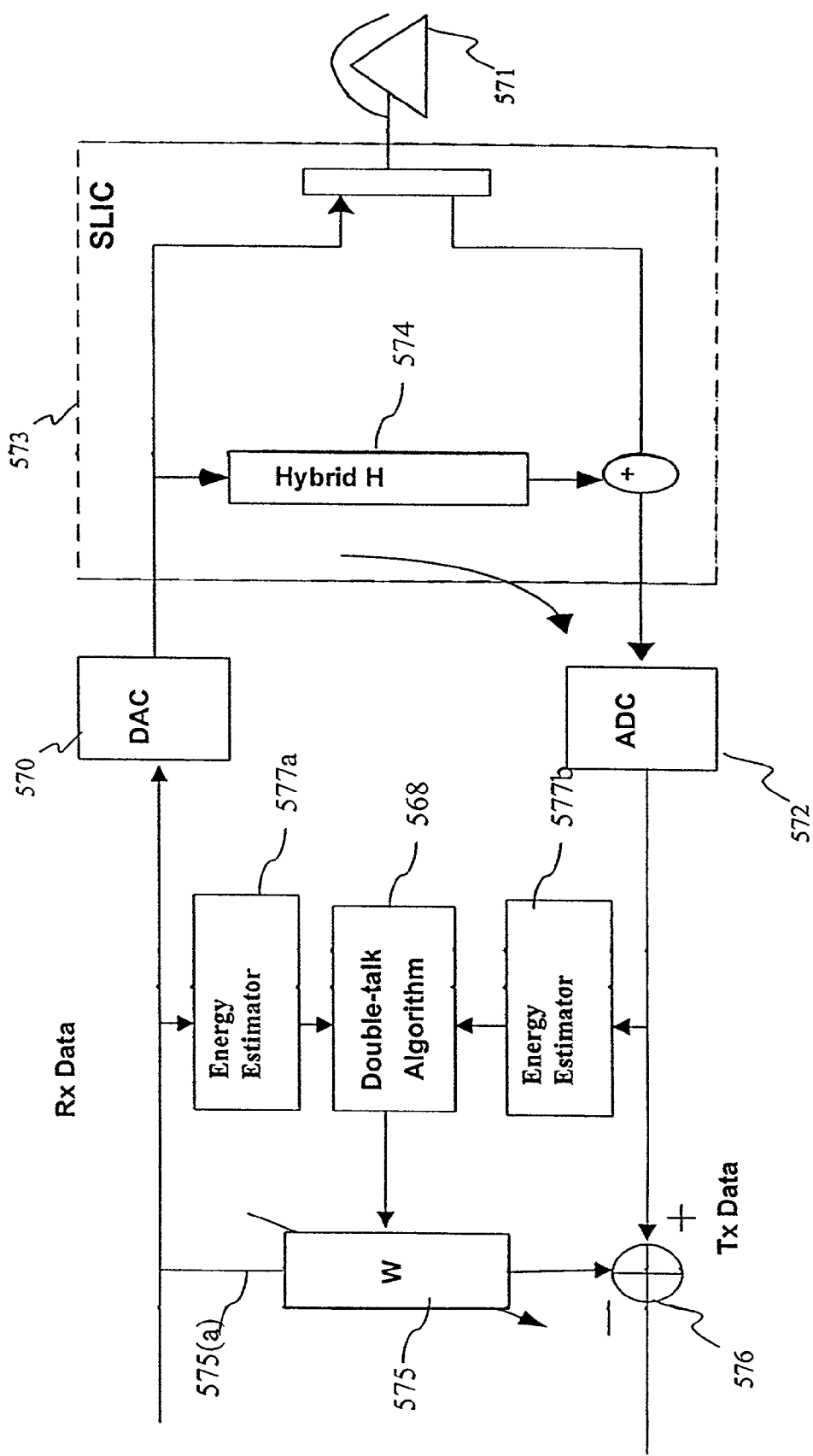
FIG. 19 is a block diagram of an echo canceller which utilizes energy estimates to detect near end speech in the presence of far end speech to control the adaptation of a adaptive filer in accordance with a preferred embodiment of the present invention.

Referring to FIG. 19, in the analog front end of the audio processor, a DAC 570 forwards decoded voice signals to a local telephony device 571 and a ADC 572 receives signals from a local telephony device via a SLIC 573. The SLIC 573 contains a hybrid 574 which converts from two-four wires. Ideally the hybrid gain would be zero to eliminate coupling between the far end and near end transmission paths. However, the operation of the hybrid 574 typically results in a frequency dependent gain of less than about one-half. Hybrid gain commonly results in a telephony problem known as line echos, such as the reflection of the talker's voice at the mismatch created by the two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user. Therefore echo cancellers are typically used to remove far end echo.

Conventionally, a reference signal 575(a) is input into an adaptive filter 575 that models the transfer characteristics of the dialed telephone line (i.e. the hybrid plus the tail circuit which is the telephone line from DAC to ADC) so that the unwanted echo may preferably be canceled by subtracting filtered reference signal 575(b) from the near end digital input signal 572(a) in a difference operator 576. Typically, the adaptive filter 575 converges or adapts only in the absence of near end speech. Therefore, near end speech and/or noise present on the near end digital input signal 572(a), typically referred to as the double talk condition, may cause the adaptive filter 575 to diverge. Traditionally, echo cancellers utilize energy estimators 577a, 577b to estimate the energy ($E_{near}$) of the near end signal 572(a) and the energy ($E_{far}$) of the far end 575(a) signal. A typical double algorithm 576 then declares near end speech active, disabling adaptation of the adaptive filter 575, when the energy of the near end signal is greater than the energy of the far end signal times the hybrid gain (H), ($E_{near} > H^* E_{far}$).

A primary disadvantage of conventional approaches which utilize energy estimates is the delay introduced into the detection of near end speech by the energy estimators (typically low pass filters) which may significantly corrupt the output of difference operator 576, which is typically used as a the feedback error for filter adaptation. The described exemplary echo canceller includes a double talk algorithm that provides rapid detection of near end speech in the presence of far end speech along with a look ahead capability so that the adaptive filter may halt adaptation (i.e. freeze the filter taps or coefficients) before the near end speech reaches the difference operator.

Although echo cancellation is described in the context of an audio processor for voice exchange via a network gateway, those skilled in the art will appreciate that the techniques described for echo cancellation are likewise suitable for various applications requiring the cancellation of reflections, or other undesirable signals, from a transmission line. Accordingly, the described exemplary embodiment for echo cancellation in a signal processing system is by way of example only and not by way of limitation.

Figure 20:
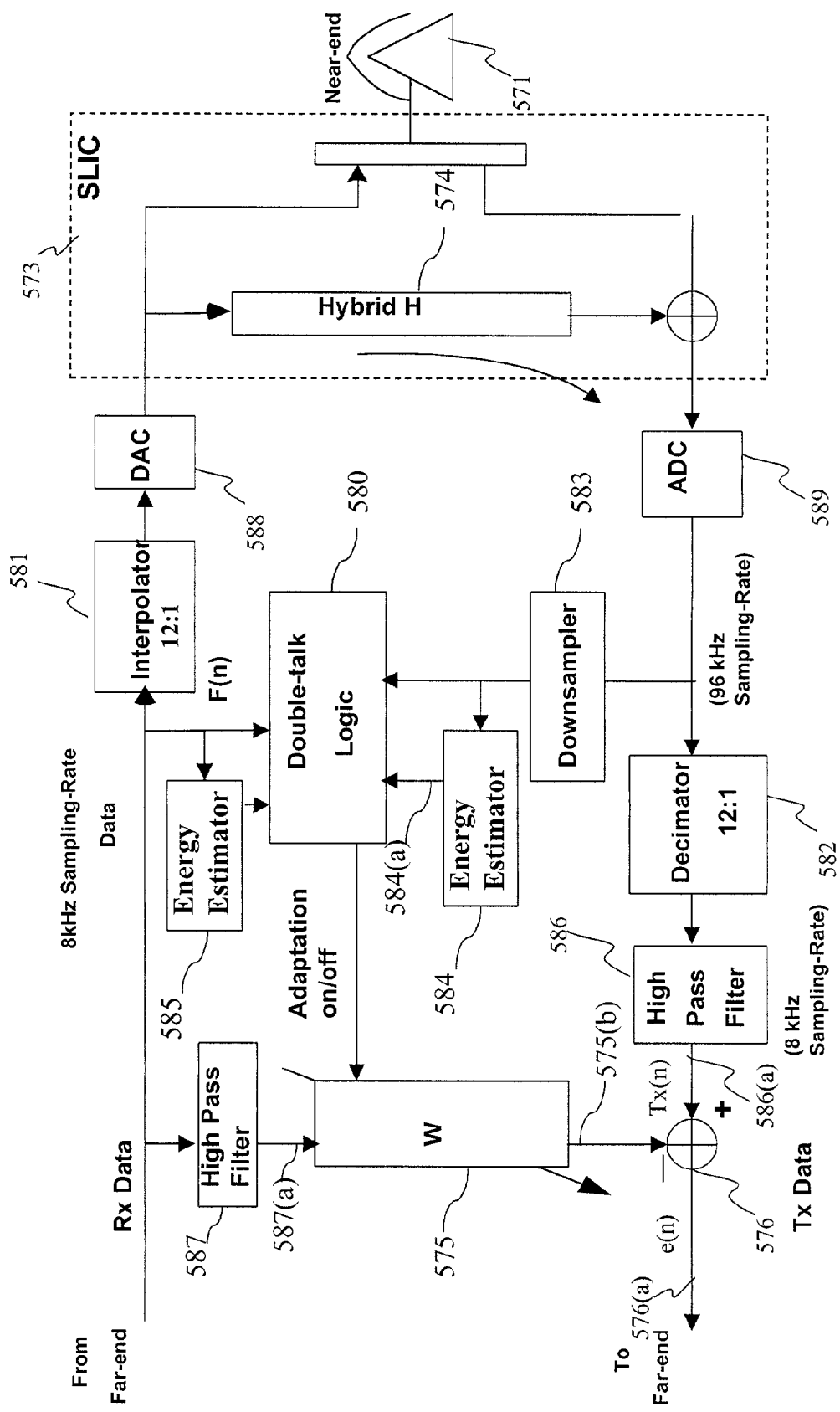
FIG. 20 is a block diagram of a echo canceller which avoids delays in the detection of near end speech that are typically associated with conventional echo cancellers and utilizes the delay associated with a decimator and high pass filter to provide a look ahead capability so that filter adaptation may be disabled in advance of the arrival of near end speech in accordance with a preferred embodiment of the present invention.
Figure 20A:
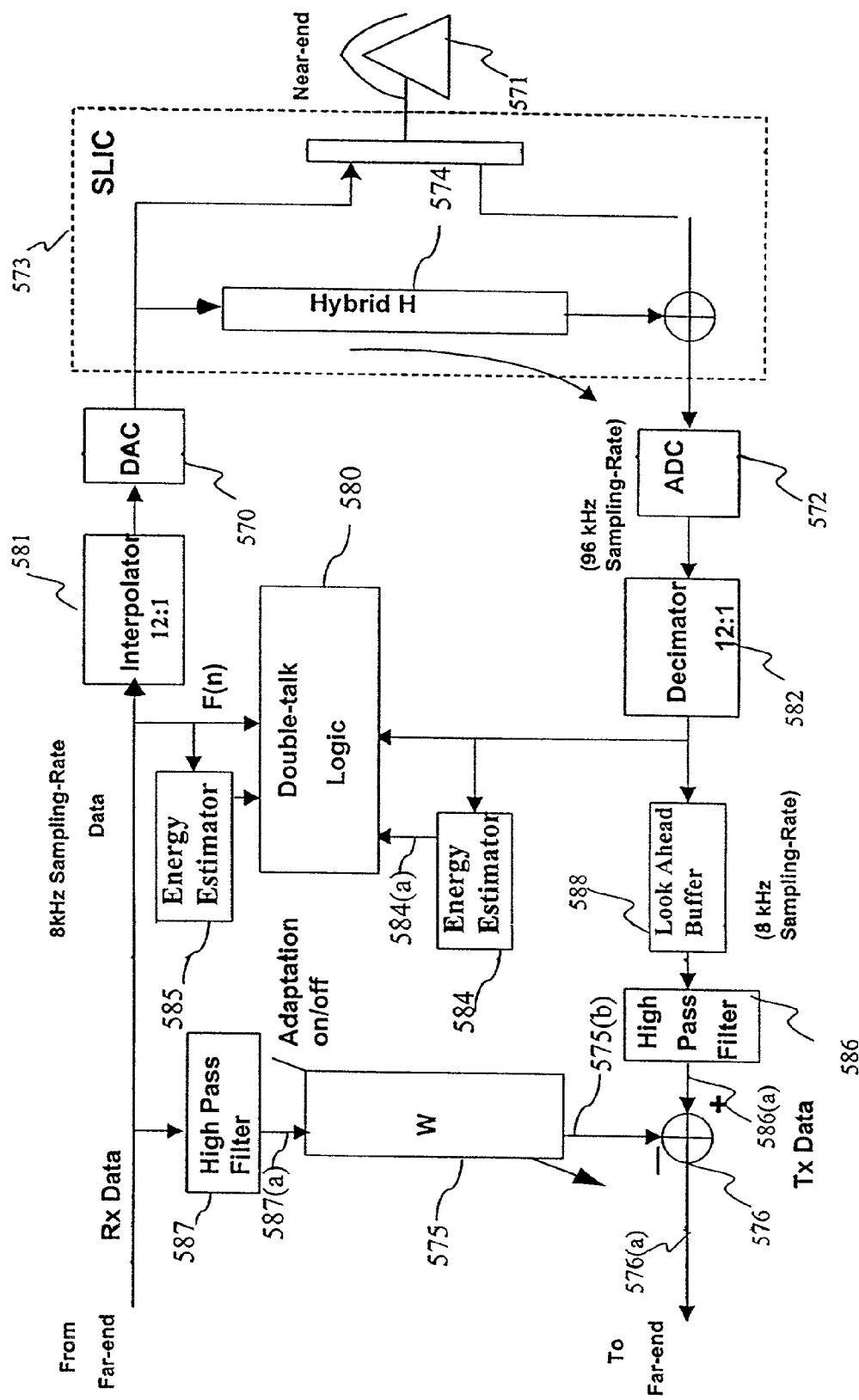
FIG. 20A is a block diagram of an echo canceller that utilizes a delay buffer to provide a look ahead capability so that filter adaptation may be disabled in advance of the arrival of near end speech in accordance with a preferred embodiment of the present invention.

Referring to FIG. 20, a high pass filter 587 receives a reference signal 587(*a*). The high pass filter 587 matches the echo path impulse response of the Rx data line. The output of the high pass filter 587 is input into the adaptive filter 575 that models the transfer characteristics of the dialed telephone line circuit. The adaptive filter 575 may be a linear transversal filter or other suitable finite impulse response filter. In addition, Rx data from the far end 581(*a*) is coupled to double talk logic 580 before the interpolator 581 of the audio processor (not shown) and the DAC 588 of the analog front end (not shown). The double talk logic 580 therefore receives a far end reference signal F(n) 580(*a*) with an 8 kHz sampling rate. In addition, the double talk logic 580 is preferably coupled between the ADC 589 of the analog front end and the decimator 582 of the audio processor (not shown). A downsampler 583 performs 12:1 sample decimation of the 96 kHz near end Tx data 572(*a*) and forwards the decimated near end data samples 583(*a*) to the double talk logic at an 8 kHz sample rate. To minimize delay, the downsampler does not low pass filter the near end samples 572(*a*) prior to decimation. Aliasing components which may be created are insignificant in that the output of the downsampler 583(*a*) simply drives the double talk detection logic 580 and is not transmitted to the far end. An energy estimator 584 estimates the background noise level of the decimated near end signal 583(*a*) and forwards the estimated level to the double talk logic 580. The energy estimator 584 is preferably a low pass filter with a long time constant, on the order of about 10 seconds. With a long time constant the energy estimator tends to track the minimum energy level of the decimated near end signal 583(*a*). Energy estimator 585 estimates the short term energy of the far end TX data F(n).

The adaptive filter 575 can be based upon a normalized least mean square algorithm (NLMS) as described in S. Haykin, Adaptive Filter Theory, and T. Parsons, Voice and Speech Processing, the contents of which are incorporated herein by reference as if set forth in full. An error signal 576(*a*) at the output of the difference operator 576 for the filter adaptation may be characterized as follows:

$$e(n) = Tx(n) - \sum_{j=0}^{L-1} w(j)F(n-j)$$

where e(n) is the error signal at time n, F(n) is the reference signal 587(*a*) at time n and Tx(n) is the Tx data signal 586(*a*) input into the difference operator 576 at time n, and w(j) are the coefficients of the transversal filter where the dimension of the transversal filter is the worst case echo path length (i.e. the length of the tail circuit L) and W(j), for j=0 to L−1, is given by:

$$w(j)=w(j)+\mu^*e(n)^*F(n-j)$$

wherein w(j) is preferably initialized to a reasonable value such as for example zero.

Assuming a block size of four msec (or 32 samples at a sampling rate of 8 kHz), the short term average energy of the reference signal $E_{ref}$ is the sum of the last 32 reference samples so that the convergence gain may be given by:

$$\mu = \frac{\alpha}{E_{ref(n)}}$$

where α is the adaptation step size and $E_{ref}$ is the energy estimate of the far end data sample F(n). In the described exemplary embodiment α, is set to zero when near end voice is detected so that the convergence gain μ is equal to zero and the filter coefficients are not updated. Otherwise α is set to a constant of less than one and preferably in the range of 0.8–0.95. One of skill in the art will appreciate that the adaptive filter may be implemented in a variety of ways, including fixed point rather than the described floating point realization. Accordingly, the described exemplary adaptation logic is by way of example only and not by way of limitation.

The 96 kHz near end Tx data samples 572(*a*) are also decimated by a second 12:1 decimator 582. However, decimator 582 does include a low pass filter capability to prevent aliasing of the decimated signal. The decimated output 582(*a*) is forwarded to a 60 Hz high pass filter 586 which reduces the 60 Hz interference induced on the transmit line due to proximity to power lines. Filtered output 586(*a*) is input to the difference operator 576 that preferably cancels unwanted echo by subtracting filtered reference signal 575 (*b*) from the filter output signal 586(*a*).

In the described exemplary embodiment, the adaptive filter 575 models the transfer characteristics of the hybrid and the tail circuit of the telephone circuit. The tail length supported should preferably be at least 8 msec. The adaptive filter 575 may be a linear transversal filter or other suitable finite impulse response filter. The echo canceller preferably converges or adapts only in the absence of near end speech. Therefore, near end speech and/or noise present on the input signal 572(*a*) may cause the adaptive filter 575 to diverge. To avoid divergence, the adaptive filter 575 can be selectively enabled by the double talk logic 580. The double talk logic 580 utilizes a sample based algorithm to detect the presence of near end speech without incurring the delays associated with conventional systems in accordance with the following equation:

$$|Near|>H^*Peak\{|F(n)|\}+Background\_Noise(n)$$

The double talk logic 580 is used to declare near end speech active when the absolute value of the decimated near end signal 583(*a*) is greater than the product of the hybrid gain (H) and a peak statistic of the far end data samples 581(*a*) summed with the estimated background noise of the transmit data samples. The hybrid gain is generally a constant preferably less than about one-half. The background noise for a typical voice channel is on the order of about −70 dBm which is far less than average active speech levels, which are typically in the order of about −25 dBm. The background noise estimate is therefore initialized to a value of about −70 dBm and thereafter periodically updated 584(a) by the energy estimator 584. The peak statistic of the far end data samples is defined by the following logic:

If max{A*[|F(n)|, . . . ,|F(n−L−1)|]}>Peak(n−1) then

Peak(n)=max{A[|F(n)|, . . . ,*|F(n−L−1)|]} else

Peak(n)=d*Peak(n−1);

where A is a weighting function that is greater than zero and less than or equal to one. The parameter L is the number samples over which the maximum is determined, typically in the range of zero to one hundred and twenty eight samples and preferably on the order of about 64 samples. The parameter d is preferably a constant that is also greater than zero and less than or equal to one and preferably on the order of about 0.99. Therefore, to determined the peak statistic of the far end, the double talk logic applies a weighting factor A to the absolute value of the current sample (F(n)) and previous L samples (F(n−L)). If the maximum product is greater than the previous peak statistic Peak(n−1) then the current peak statistic Peak(n) is set at the maximum of the product of the weighting factor and far end samples. Otherwise the current peak statistic Peak(n) is set equal to d times the value of the previous peak statistic Peak(n−1).

In the described exemplary embodiment, A, L and d are empirically determined to optimize performance and computational load for a given application. For example, double logic 580 can more accurately detect near end speech if the maximum is determined over a larger number of samples L. However, computational intensity also increases with increasing number of samples L. A and d can be inversely related to the number of sample L, so that A and d are smaller for larger number of samples and vice versa.

In the described exemplary embodiment, there is a delay associated with the high-pass filter 586 and the decimator 582. The double talk logic 580, which has negligible delays, can receive and process near end data samples prior to their arrival at the difference operator 576. Thus, the delay associated with the high-pass filter 586 and the second decimator 582 provide a look-ahead of M samples allowing the double talk logic 580 to preferably disable adaptation of the adaptive filter 575 M samples before the near-end signal reaches the difference operator 56. The look ahead capability M is the sum of the equivalent delays associated with the high pass filter 586 and the second decimator 582 and is typically two-three 8 kHz samples for a ITU-T G712 compliant system.

FIG. 20 A shows another approach for echo cancellation where the near end digital signal after decimation to an 8 kHz signal 582(a) is input to the double talk logic 580. This approach can be utilized in systems where the echo canceller and codec are not integrated so that the near end data samples have previously been decimated. In this instance, a look ahead buffer 588 receives, buffers, and forwards decimated near end signals 582(a) to the difference operator 576, providing a look ahead capability of M samples where M may be optimized for a given application to balance performance, computational intensity and delay.

Figure 21:
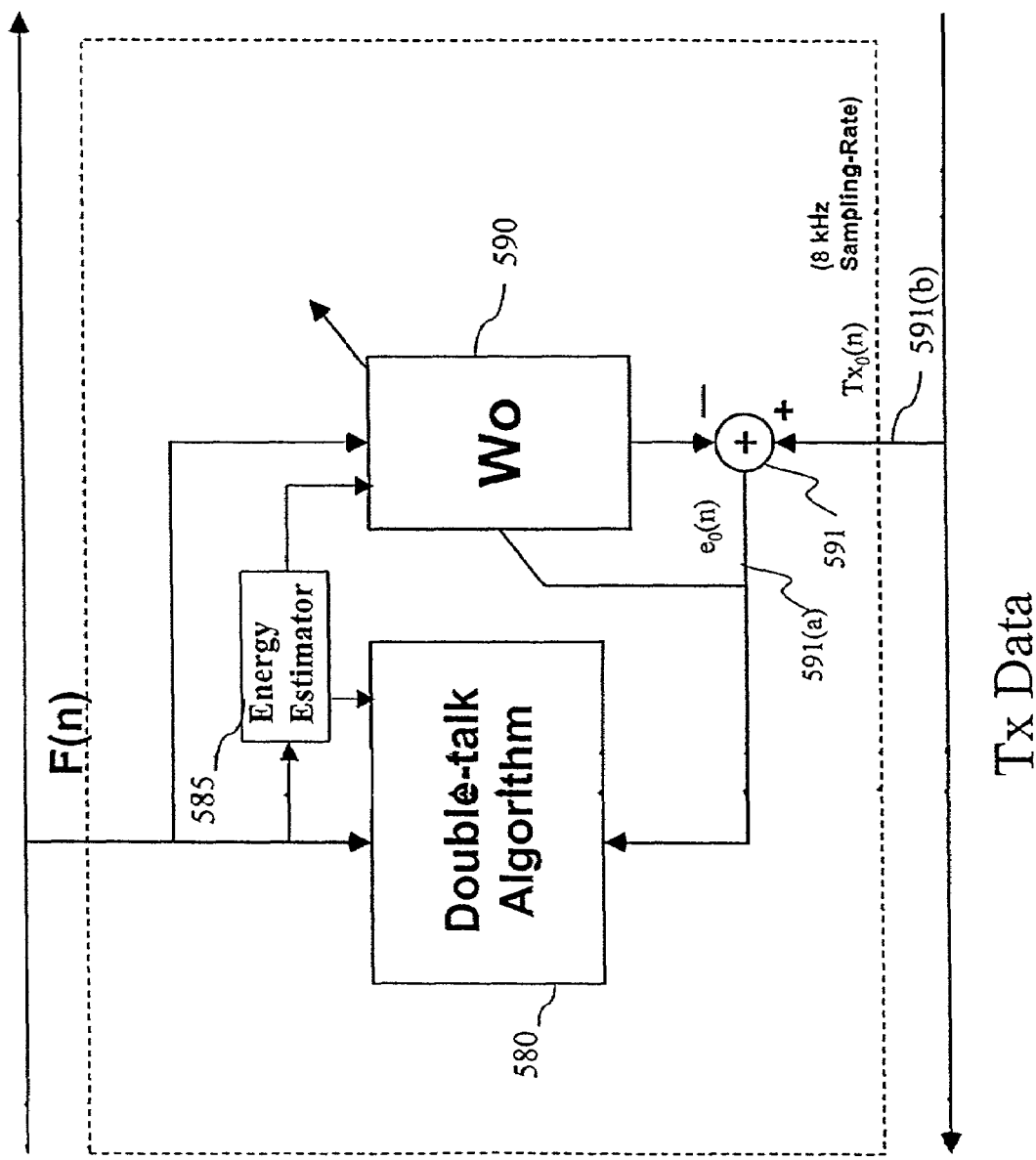
FIG. 21 is a block diagram of method for reducing the amplitude level of near end speech prior to double talk detection in accordance with a preferred embodiment of the present invention.

The relative strength of the near end signal compared to the echo coupled through the hybrid increases with decreasing hybrid gain (H) so that in the described exemplary embodiment, the accuracy of near end voice detection increases with decreasing hybrid gain(H). Referring to FIG. 21, in another aspect of the present invention, a short adaptive filter 590 is integrated into the preferred double talk detection algorithm. The adaptive filter 590 models the transfer characteristics of the dialed telephone line circuit. The adaptive filter 590 may be a linear transversal filter or other suitable finite impulse response filter. An error signal 591(a) at the output of the difference operator 591 for filter adaptation may be characterized as follows:

$$e_0(n) = Tx_0(n) - \sum_{j=0}^{K-1} w_0(j)F(n-j)$$

where $e_0(n)$ is the error signal at time n 591(a), F(n) is the reference signal 580(a) at time n and $T_{x0}$(n) is the Tx data signal 591(b) input into difference operator 591 at time n, and $wW_0(j)$ are the coefficients of the transversal filter where the dimension of the transversal filter is preferably the worst case echo path length (i.e. the length of the tail circuit K) and $W_0(j)$, for j=0 to K−1, is given by:

w0(j)w0(j)+μ*e0(n)*F(n−j)

wherein $W_0(j)$ is preferably initialized to a reasonable value such as for example zero.

Assuming a block size of one msec (or 8 samples at a sampling rate of 8 kHz), the short term average energy of the reference signal $E_{ref}$ is the sum of the last eight samples so that the convergence gain may be given by:

$$\mu = \frac{\alpha}{E_{ref(n)}}$$

where α is the adaptation step size and $E_{ref}$ is the energy estimate of the far end data sample F(n). In the described exemplary embodiment, the double talk logic 580 does not selectively enable/disable adaptation of the filter 590 in accordance with the detection of near end speech so that filter 590 continuously adapts. Therefore, to reduce the computational burden placed upon the system and to prevent the filter from diverging the adaptive filter 590 can be figured to adapt very slowly so that α is preferably in the range of about 0.01–0.0001.

The adaptive filter 590 again filters the far end reference signal 581(a) so that the echo level is can be reduced by subtracting filtered reference signal 590(b) from the Tx data samples 591(b) in a difference operator 591. The adaptive filter 590 can be reduce line echos about 6–12 dB so as to improve the performance of the double talk logic. In the described exemplary embodiment, the output 591(a) of the difference operator 591, (i.e. Tx data samples with reduced echo) is then forwarded to double talk logic 580 which then detects near end speech and selectively enables/disables adaptation of the adaptive filter 575 (see FIG. 20).

7. Voice Processor

The Internet is a loose association of thousands of networks and millions of computers across the world that are interconnected through communication links. The emergence of Internet Protocol (IP) as the standard transport protocol for packet based networks has enabled an on-line revolution in communications service and applications. Traditional dial-up modems provide online access through the public telephone network at up to 56 Kbps (equal to 56,000 bits per second). A cable modem, on the other hand, provides users with high-speed Internet access through a cable television network at data rates as high as 56 Mbps. However, traditional cable modem service has been limited to data applications so that the realization of diverse communications services at increased data rates requires the development of a common broadband cable access network with integrated voice and data services. Cable Television Laboratories, Inc. (CableLabs®) a membership organization consisting of cable television system operators developed PacketCable 1.0 which defines interface specifications for interoperable equipment capable of providing packet-based voice, video and other high-speed multimedia services over hybrid fiber coax (HFC) cable systems utilizing the DOCSIS protocol.

Figure 22:
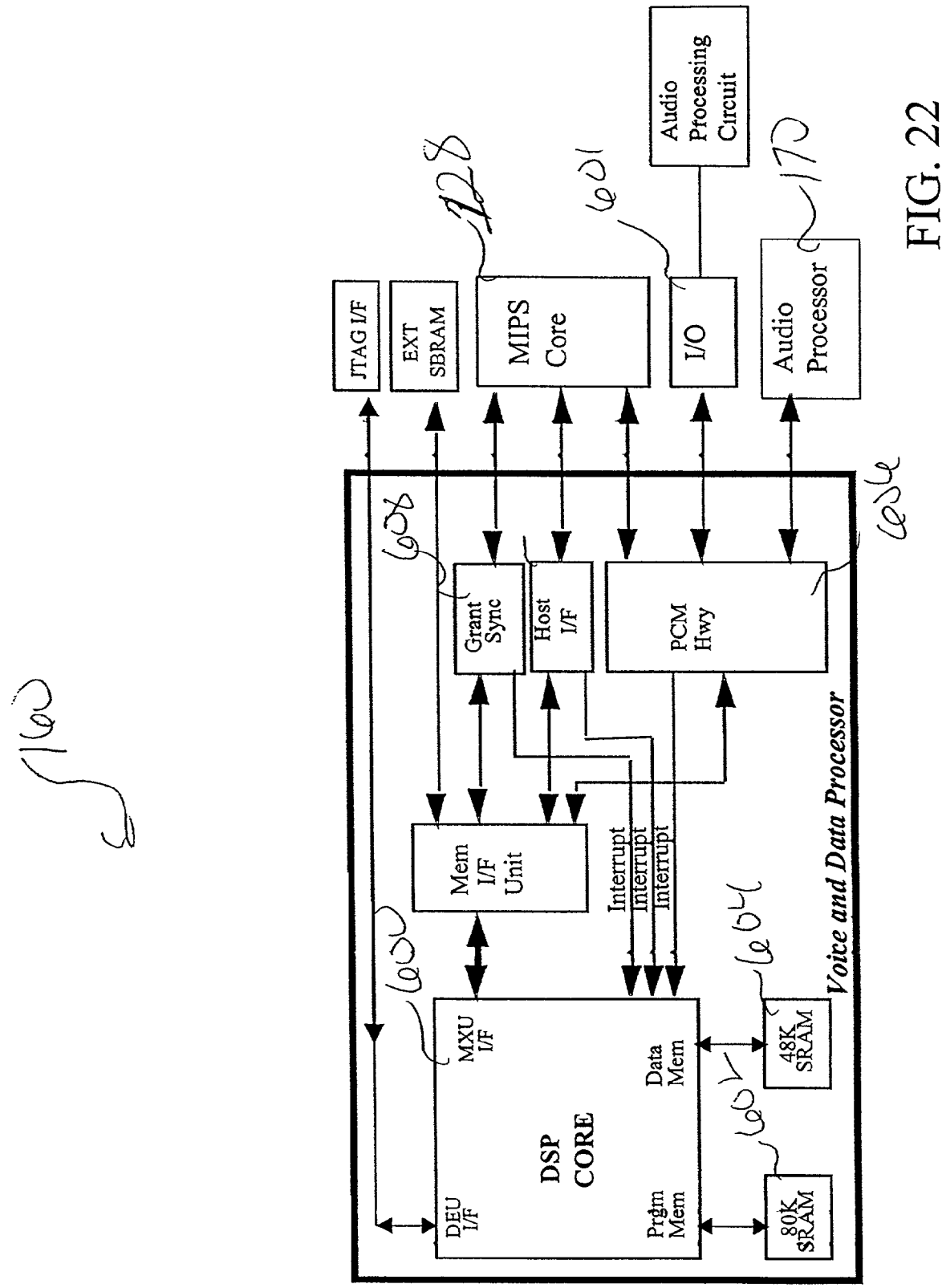
FIG. 22 is a block diagram of a signal processing system implemented with a programmable digital signal processor (DSP) software architecture for interfacing telephony devices with packet based networks in accordance with a preferred embodiment of the present invention.

The described exemplary network gateway includes a voice and data processor that supports the exchange of voice and data between a traditional circuit switched and a packet based network via a DOCSIS HFC network. The exemplary voice and data processor may be implemented with a programmable DSP software architecture as shown in FIG. 22. This architecture includes a high speed DSP 600 with program memory 602, preferably on the order of about a 80 k word SRAM, and data memory 604 preferably on the order of about a 48 k word SRAM. A PCM highway 606 provides the voice and data processor 160 access to the audio processor and optional external audio processing circuits. A grant synchronizer 608 insures delivery of samples to the network gateway for upstream transmission. The grant synchronizer signals the DSP 600 that a pending grant is about to arrive at the network gateway so as to allow the DSP 600 to synchronize itself to scheduled grants at the network gateway. A host interface 610 transfers data, control and status messages between the DSP 600 and the MIPS core 128.

Figure 23:
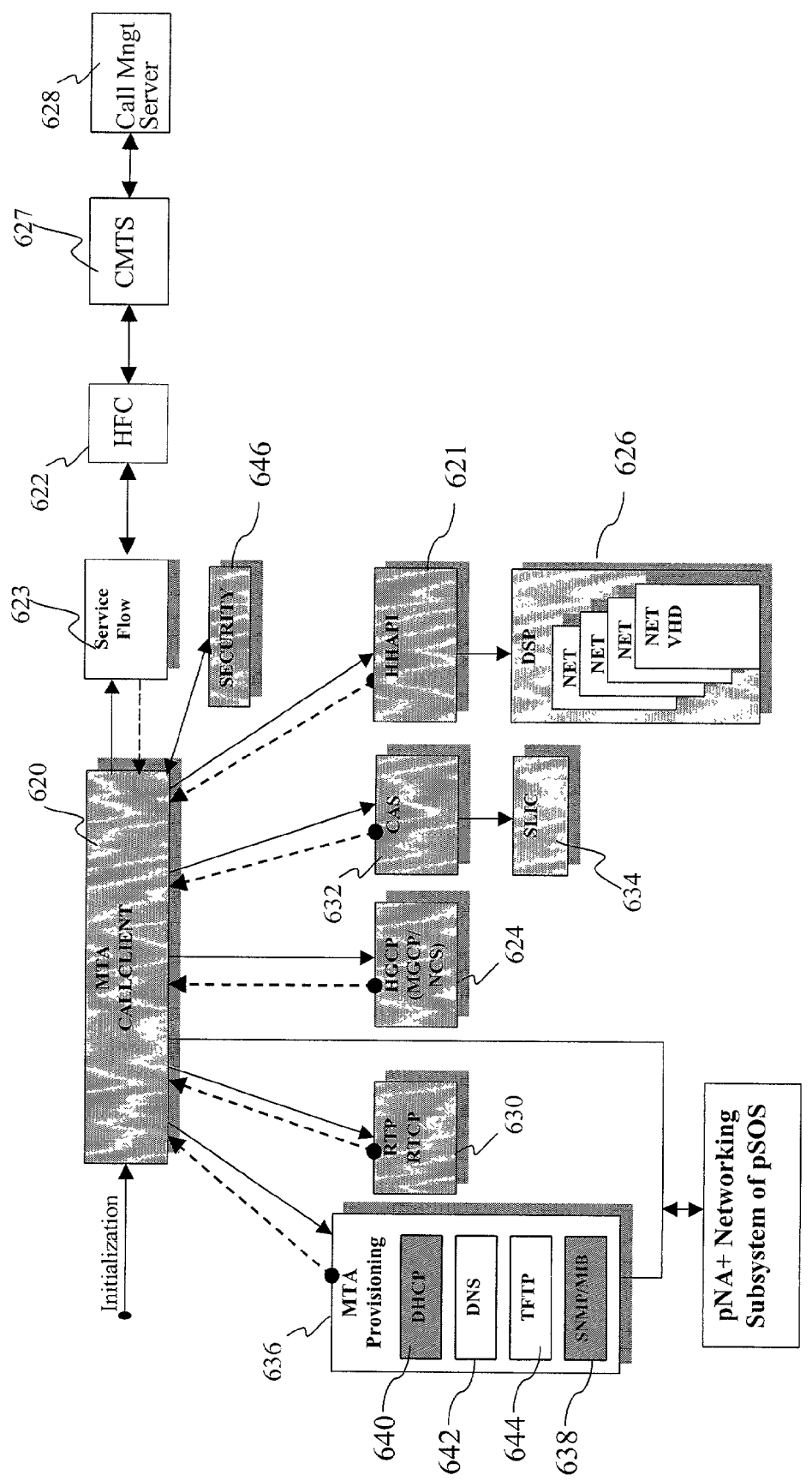
FIG. 23 is a block diagram of the MTA architecture for interfacing the voice processor DSP with the MIPS core processor of the network gateway in accordance with a preferred embodiment of the present invention.

The described exemplary embodiment preferably provides embedded media terminal adapter (MTA) capability in compliance with PacketCable 1.0. The exemplary embedded MTA may be implemented with the programmable DSP software architecture to provide a subscriber side interface to the subscriber's telephony device via the voice and data processor, as well as a network side interface to the DOCSIS cable modem. Referring to FIG. 23 the preferred embedded MTA 620 includes a host application programming interface (HAPI) 621 that provides a software messaging interface between the MIPS host and the voice and data processor DSP. The HAPI 621 facilitates the issuing of commands from the MIPS host to the voice and data processor DSP as well the sending of events from the DSP to the MIPS core host.

In addition, the MTA 620 can provide all signaling and encapsulation elements required to provide telephony service over a DOCSIS HFC network 622 including media transport and call signaling via quality service logic 623. For example, gateway control protocol (GCP) logic 624 receives and mediates call-signaling information between the PacketCable network and the PSTN. The GCP logic 624 maintains and controls the overall call state for calls requiring PSTN interconnection. The GCP logic 624 controls the voice and data processor 626, via the MTA 620 and HAPI interface 621, by instructing it to create, modify, and delete connections that support the media stream over the IP network. The GCP logic 624 also instructs the voice and data processor to detect and generate events and signals. The GCP logic 624 also exercise attribute control over the voice and data processor 626 providing instructions as to which attributes to apply to a connection, such as, for example, encoding method, use of echo cancellation, security parameters, etc.

The GCP logic 624 also interfaces with an external control element called a call agent or call management server (CMS) 628 to terminate and generate the call signaling from and to the PacketCable side of the network in accordance with the network-based call signaling (NCS) protocol specification. The PacketCable 1.0 NCS architecture places call state and feature implementation in the centralized CMS 628, and places telephony device controls in the MTA 620. The MTA 620 passes device events to the CMS 628, and responds to commands issued from the CMS. The CMS, is responsible for setting up and tearing down calls, providing advanced services such as custom calling features, performing call authorization, and generating billing event records, etc. For example, the CMS 628 instructs the MTA 620 to inform the CMS 628 when the phone goes off hook, and seven dual tone multi frequency (DTMF) digits have been entered. The CMS 628 instructs the MTA 620 to create a connection, reserve quality of service (QoS) resources through the access network for the pending voice connection, and to play a locally generated ringback tone. The CMS in turn communicates with a remote CMS (or MGC) to setup the call. When the CMS detects answer from the far end, it instructs the MTA to stop the ringback tone, activate the media connection between the MTA and the far-end MTA, and begin sending and receiving media stream packets.

When a voice channel is successfully established, real time transport protocol (RTP) is used to transport all media streams in a PacketCable compliant network to guarantee interoperability. Real time transport protocol (RTP) provides end-to-end delivery services for data with real time characteristics, such as interactive audio and video. Those services include payload type identification, sequence numbering, timestamping and delivery monitoring of the quality of service (QoS) and conveys to participants statistics such as for example packet and byte counts for the session. RTP resides right above the transport layer. The described exemplary embedded MTA 620 preferably includes RTP logic 630 that converts RTP packets (headers) to a protocol independent format utilized by the voice and data processor 626 and vice versa.

The described exemplary embedded MTA preferably includes channel associated signaling (CAS) logic 632 resident on the MIPS core that interfaces with the subscriber line interface circuits 634 via the GPIO interface 184 (see FIG. 3) to provide ring generation, hookswitch detection, and battery voltage control. The CAS logic 632 preferably supports custom calling features such as for exam distinctive ringing.

The described exemplary embedded MTA 620 preferably includes MTA device provisioning logic 636 which enables the embedded MTA 620 to register and provide subscriber services over the HFC network 622. Provisioning logic 636 provides initialization, authentication, and registration functions. The Provisioning logic 636 also provides attribute definitions required in the MTA configuration file. The provisioning logic 636 includes a SNMP logic 638 that exchanges device information and endpoint information between the MTA 620 and an external control element called a provisioning server (not shown). The MTA also sends notification to the provisioning server that provisioning has been completed along with a pass/fail status using the SNMP protocol.

The Provisioning logic 636 also includes DHCP logic 640 which interfaces with an external dynamic host configuration protocol (DHCP) server to assign an IP address to the MTA. The DHCP server (not shown) is a back office network element used during the MTA device provisioning process to dynamically allocate IP addresses and other client configuration information. Further provisioning logic preferably includes domain name server (DNS) logic 642 which interfaces with an external DNS server(not shown) to obtain the IP address of a PacketCable server given its fully\qualified domain name.

The MTA configuration file is downloaded to the MTA from an external trivial file transfer protocol (TFTP) server (not shown) through TFTP logic 644. The TFTP server is a back office network element used during the MTA device provisioning process to download configuration files to the MTA. An HTTP Server may be used instead of a TFTP server to download configuration files to the MTA.

Each of PacketCable's protocol interfaces is subject to threats that could pose security risks to both the subscriber and service provider. The PacketCable architecture addresses these threats by specifying, for each defined protocol interface, the underlying security mechanisms (such as IPSec) that provide the protocol interface with the security services it requires, e.g., authentication, integrity, confidentiality. Security logic 646 is PacketCable compliant and provides for voice and provides end-to-end encryption of RTP media streams and signaling messages, to reduce the threat of unauthorized interception of communications. The security logic 646 preferably provides additional security services such as, for example, authentication, access control, integrity, confidentiality and non-repudiation.

DOCSIS service logic 648 preferably provides the primary interface between the MTA 620 and the DOCSIS cable modem (i.e. DOCSIS MAC and modulator/demodulator) of the network gateway. The DOCIS service logic 648 provides multiple sub-interfaces such as for example a control sub-interface which manages DOCSIS service-flows and associated QoS traffic parameters and classification rules as well as a synchronization interface which is used to synchronize packet and scheduling prioritization for minimization of latency and jitter with guaranteed minimum constant bit rate scheduling. In addition, the DOCSIS service logic is used to request bandwidth and QoS resources related to the bandwidth. The DOCIS cable modem features of the network gateway then negotiate reserve bandwidth, guaranteed minimum bit rate etc, utilizing DOSCIS 1.1 quality of service feature. Similarly, DOCSIS service logic 648 preferably includes a transport interface which is used to process packets in the media stream and perform appropriate per-packet QoS processing.

The exemplary embedded MTA may best be illustrated in the is context of a typical voice communication across the DOCSIS HFC network. The user initiates a communication by going off hook. The CAS detects the off hook condition from the SLIC and sends an off hook event to the MTA call client. The MTA call client then instructs the GCP logic to generate a off hook signal. The GCP logic generates an of hook signal which is forwarded to the MTA call client and transmitted out the QoS service logic to the call management server via the DOCSIS MAC and upstream modulator of the network gateway and the CMTS. The call management server typically would transmit a return signal via the CMTS, DOCSIS MAC and downstream demodulator of the network gateway to the MTA call client via the QoS service logic. The MTA call client preferably forwards that signal to the GCP logic which decodes the signal, typically play dial tone. The GCP logic would then signal the MTA call client to play dial tone. The MTA call client then sends a command to the voice and data processor via the HAPI interface to play dial tone. The user then hears a dial tone.

Upon hearing a dial tone a user will then typically dial a number. The voice and data processor includes a DTMF detector which detects the dialed digits and forwards the detected digits to the MTA call client as events via the HAPI interface. The MTA call client forwards the event to the GCP logic which encodes the dialed digits into a signaling message which is returned to the MTA call client. The MTA call client transmits the signaling message out the QoS service logic to the call management server via the DOCSIS MAC and upstream modulator of the network gateway and the CMTS. The call management server would then instruct a called party MTA to generate a ring to the called number. If the called number answers by going off hook, the CAS of the called MTA would detect an off hook condition and signal the call management server. The call management server then instructs the MTA call client via the CMTS, and downstream demodulator, DOCSIS MAC and QoS service logic of the network gateway to establish a voice connection with a given set of features, i.e. use echo cancellation, and silence suppression, use given coder etc. In addition, the MTA call client is given the IP address of the called party, to which the RTP voice packets should be sent. The MTA call client forwards the received message to the GCP logic which decodes the received message. The GCP logic generates attribute instructions for the voice and data processor such as, for example, encoding method, use of echo cancellation, security parameters, etc. which are communicated to the voice and data processor via the MTA call client and the HAPI interface.

Voice packets are then exchanged. For example, if the calling party speaks, the voice and data processor would processor the voice and forward voice packets the MTA call client via the HAPI interface. The MTA call client would then forward those voice packet the RTP logic which would convert the packet from a protocol independent packet format to the RTP format. The RTP voice packets are then returned to the MTA which transmits the RTP voice packet to the CMTS via the QoS service logic and the DOCSIS MAC and upstream demodulator of the network gateway. The voice packets are then routed to the called party. Similarly, voice packets from the called party are communicated to the MTA of the call client via the QoS service logic. The MTA call client forwards the RTP voice packets to the RTP logic which converts the packet from the RTP format to the protocol independent packet format. The protocol independent voice packets are returned to the MTA call client which forwards them to the voice and data processor via the HAPI interface. The voice and data processor decodes the packets and communicates a digital stream to the called party. Voice exchange would continue in a similar manner until an on hook condition is detected by either the calling or called party CAS which would forwarded a on hook detection event to its respective MTA. The MTA would instructs the GCP logic to generate a hook detection signaling message which is returned to the MTA and forwarded to the call management server. The call management server would generate a request to play (dial tone, silence or receiver off hook) which is forwarded to the opposite MTA. The MTA would forward the request to the GCP logic which would then instruct the voice and data processor to play dial tone via the MTA and HAPI interface.

Telephony calls in the other direction are similarly processed. For example, the call management server instructs the MTA called client to ring a dialed number. The MTA called client instructs the GCP logic to generates an command to ring the dialed number. The command is then forwarded to the CAS via the MTA called client. The CAS generates a ring signal and forwards that signal to the SLIC which then rings the called telephony device. The MTA called client may also instruct the GCP logic to present call ID which preferably generates a command for the voice and data processor to present caller ID. If the user picks up the phone the CAS would detect an off hook condition and signal an off hook event back to the MTA. The MTA called client would then instruct the GCP logic to create an off hook detection signaling message, which when created is returned to the MTA and forwarded to the external call management server via the QoS service logic, DOCSIS MAC and upstream modulator of the network gateway and the CMTS. A communication channel would again be established with a given set of attributes as previously described.

Figure 24:
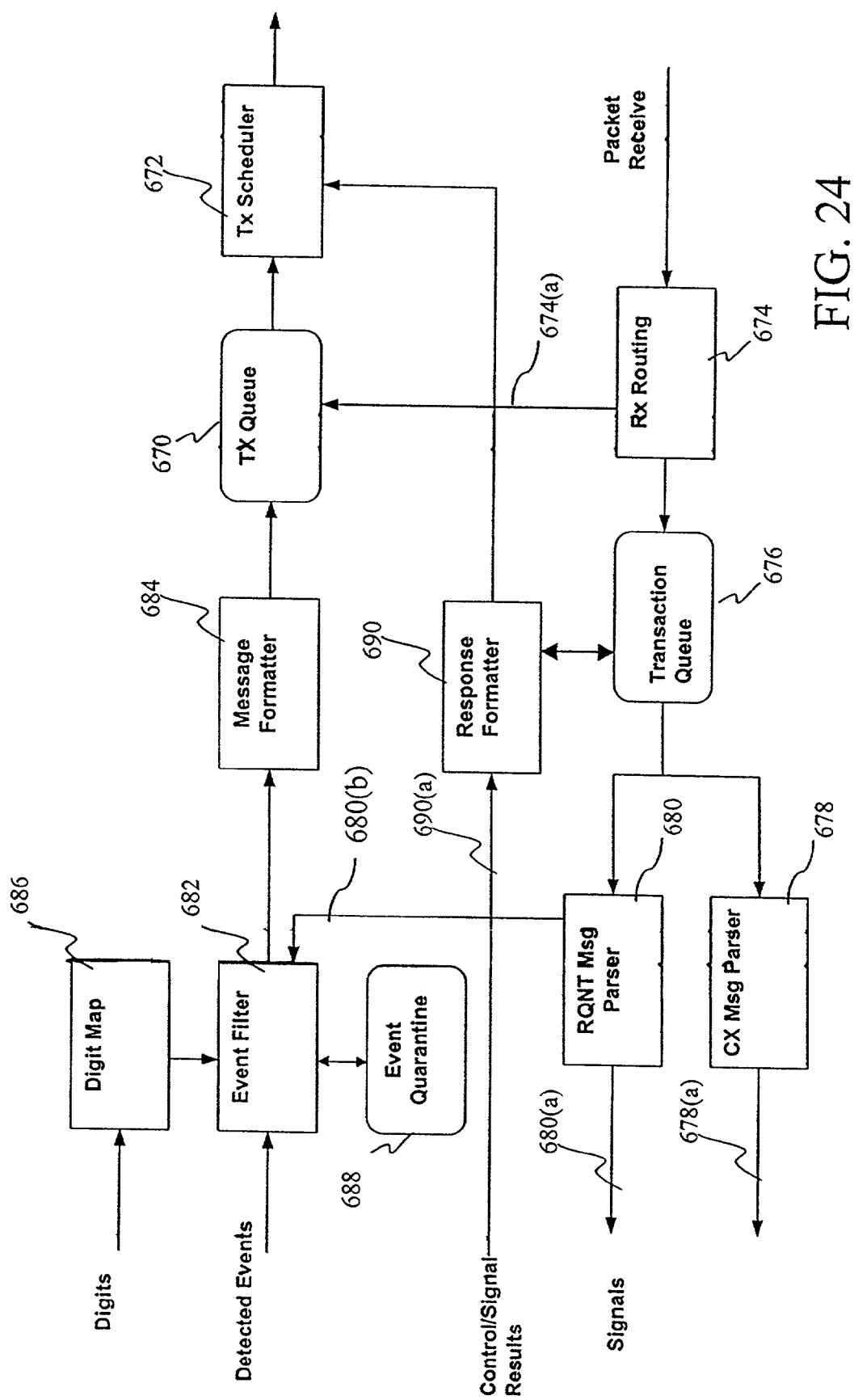
FIG. 24 is a block diagram of the architecture for gateway control protocol logic which interfaces with an external control element, called a call agent or call management server (CMS), to terminate and generate call signaling from and to the voice and data processor in compliance with the network-based call signaling (NCS) protocol specification, in accordance with a preferred embodiment of the present invention.

Referring to FIG. 24, the GCP logic implements the NCS features of the PacketCable 1.0 specification including protocol transaction management, parsing, verification and formatting of protocol data units (PDUs) and other utility functions. The PacketCable protocol typically requires an acknowledgment that a request has been received. Therefore, the GCP logic includes transmitter queue 674 which registers all requests sent from the GCP logic to the call management server via a transmitter scheduler 672 and the MTA. A receive router 674 then analyzes packets received from the call management server via the MTA call client to determine if the received message is an acknowledgment or a new request. The receiver router 674 forwards new requests to a transaction queue 676. If the received packet is an acknowledgment of a request previously sent from the GCP logic to the call management server, the receiver router 674 clears that request that request by forwarding the acknowledgment 674(a) to the transmitter queue 670. The transmitter queue 670 periodically retransmits buffered requests until an acknowledgment from the call management server is received.

The transaction queue 676 registers the receipt of a given request from the call management server as well as the transmission of an acknowledgment of that request from the GCP logic to the call management server, so that the transaction queue 676 may preferably detect requests retransmitted from the call management server for which an acknowledgment has already been sent. In addition, the transaction queue 676 parses the incoming requests according to the type of requests. The transaction queue 676 routes connection messages to a connection message parser 678. Connections messages are used to create or terminate a connection. The connection message parser generates and forwards connection controls (including connection attributes) 678(a) to the MTA which are then communicated to the voice and data processor via the HAPI interface. The transaction queue 676 routes request/notify messages to a request/notify message parser 680. Request/notify messages may be signal requests such as play dial tone, busy tone etc. or requests to detect events such as for example, detect DTMF digits, fax tone, modem tone etc. The request/notify message parser 680 preferably generates and forwards signal requests 680(a) to the voice and data processor via the MTA and HAPI interface. The request/notify message parser 680 flags event detection requests 680(b) to an event filter 682.

Actual events detected by the voice and data processor (such as, for example, fax tone) or the CAS (such as, for example, off hook detected) are forwarded to the event filter via the MTA call client. The event filter 682 filters the events provided by the voice and data processor and CAS via the call client, and only transmits those detected events that the call management server requested, as indicted by flags 680(b) communicated to the event filter by the request/notify message parser 680. The event filter 682 preferably forwards detected events of interest to the call management server to a message formatter 684. The message formatter 684 formats the detected event into the appropriate protocol and forwards the detected event message to transmitter queue 670, which registers the message and will retransmit the message if an acknowledgment is not received in a timely manner via the receiver router 674(a). The transmitter queue 670 forwards the message to the transmitter scheduler 672 which bundles outgoing messages and forwards them to the MTA call client (not shown) for communication to the call management server.

The PacketCable 1.0 specification provides for the use of a digit map which is designed to reduce the number of messages communicated between the call management server and the MTA call agent when a user is dialing a number. For example, the dialing of long distance number involves the use of ten digits (i.e. the area code and number) which would require ten requests and acknowledgments i.e. one per digit. In the alternative the call management server may provide a digit map to the MTA call client which instruct digit map logic 686 to collect detected digits from the voice and data processor according to a specified format, for example ten digits for long distance call. The digit map logic 686 then forwards for example all ten digits to the event filter which filters the digit detection, and forwards events of interest to the message parser 684 for communication to the call management server as previously described through transmitter queue 670 and transmitter scheduler 672.

Event quarantine logic 688 buffers detected events received from the CAS or voice and data processor via the MTA call client for which the event filter has not received a detect event request from the call server manager via the request/notify message parser flag 680(b). Responses or the result 690(a) of a connection or signal requests are forwarded from the MTA call client to a response formatter 690 with the GCP logic which formats the result into the proper protocol and forwards that result to the transmitter scheduler 672 for communication to the call management server via the MTA call client. In addition, the response formatter 690 notifies the transaction queue 676 that an acknowledgment has been sent in response to a given request. The transaction queue 676 may then detect the re-transmission of a request from the call management server should that acknowledgment be lost or otherwise not received by the call management server. The transaction queue 676 preferably instructs the response formatter 690 to retransmit an acknowledgment when the transaction queue 676 detects the re-transmission of a request for which an acknowledgment had been previously sent.

Figure 25:
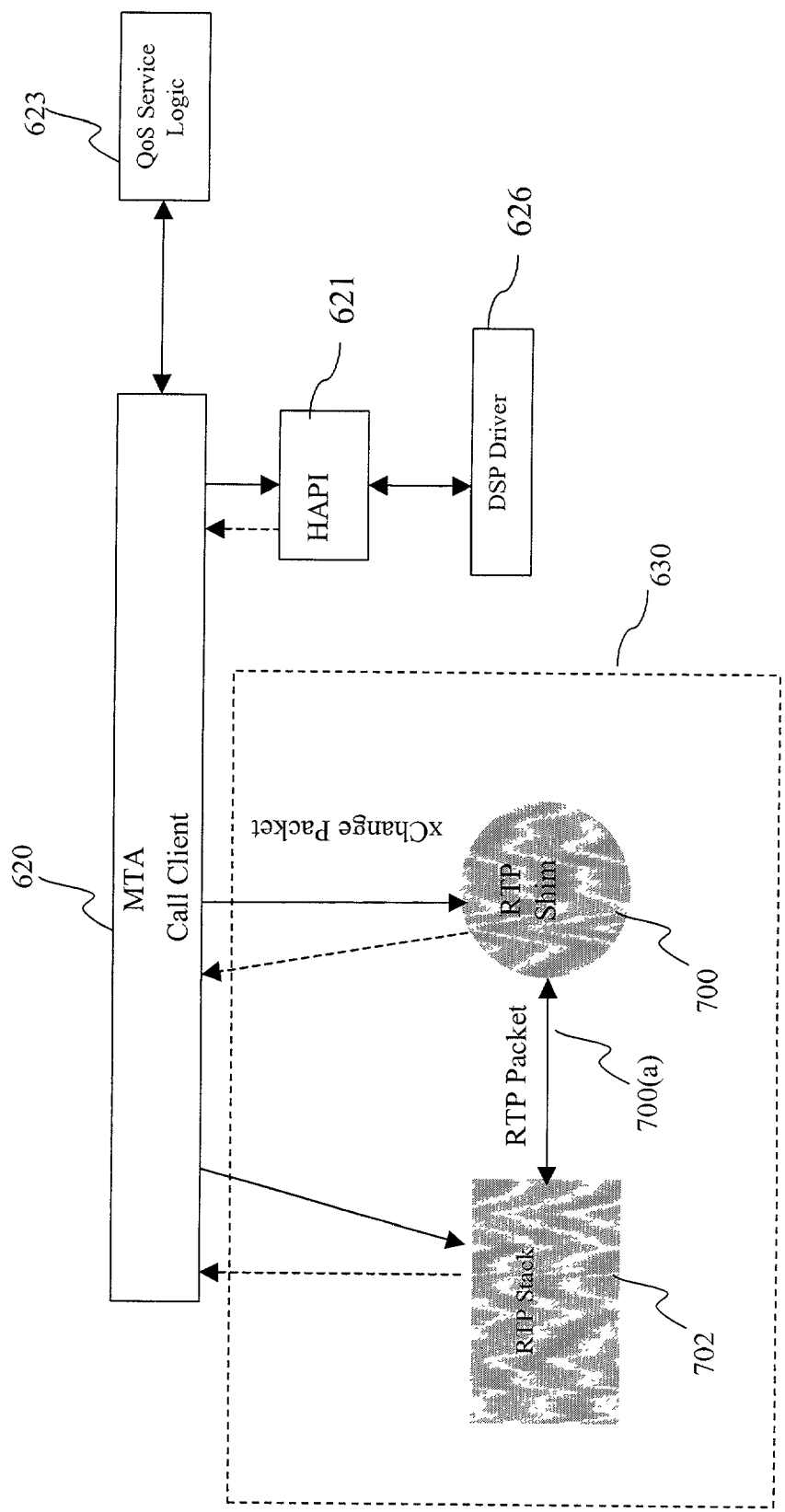
FIG. 25 is a block diagram of method for converting between real time protocol packets required by the Packet-Cable exchange specification and the exchange packet format utilized by the voice and data processor and vice versa in accordance with a preferred embodiment of the present invention.

Referring to FIG. 25, RTP logic 630 preferably converts RTP packets to the protocol independent packet format utilized on the voice and data processor and vice versa. In the described exemplary embodiment, the protocol independent packet payload is preferably identical to the RTP packet payload so that the RTP logic 630 need only convert between RTP and exchange headers. In the described exemplary embodiment a RTP shim 700 provides two way exchange of protocol independent packets with the MTA call client 620. The RTP shim 700 accepts these packets from the MTA call client 620, converts these packet header, to a RTP header and forwards the RTP packet to a RTP stack 702. The RTP stack 702 provides the statistical monitoring function required by the RTP protocol such as, for example, collecting statistics on the number of bytes sent and received, the number of packets lost and how much jitter was present. The RTP stack 702 provides two way exchange of RTP packet between the MTA call client and the RTP logic 630, receiving RTP packets from the RTP shim 700 and forwarding them to the MTA call client 620 and vice versa.

Figure 26:
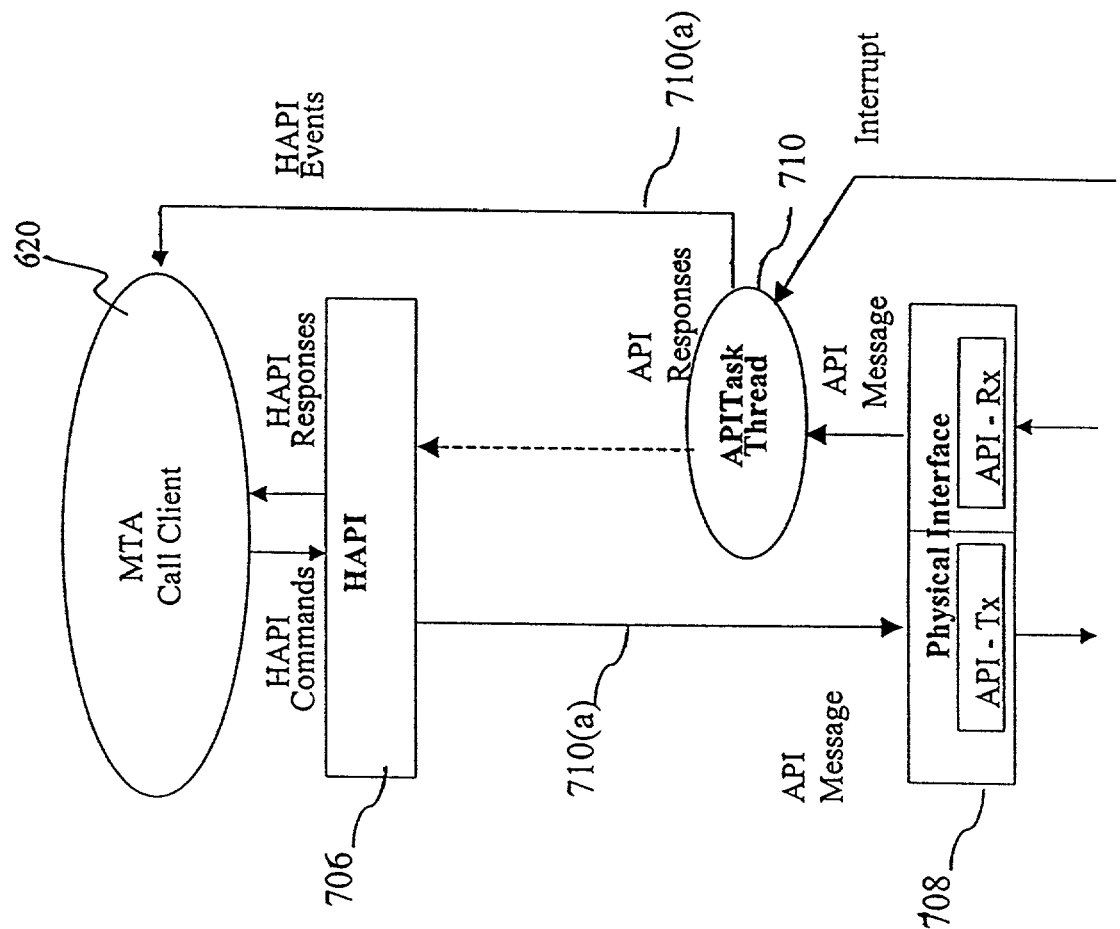
FIG. 26 is a block diagram of software messaging interface between the host DSP and the voice and data processing software in accordance with a preferred embodiment of the present invention.

Referring to FIG. 26 the described exemplary host application programming interface (HAPI) provides a software messaging interface between the MTA call client 620 and the voice and data processor DSP. The HAPI 621 facilitates the issuing of commands from the MIPS core via the MTA call client to the voice and data processor DSP as well the sending of events from the DSP to the MTA call client 620. The HAPI interface 621 can be scalable to support multiple channels as well as multiple DSPs. In addition the HAPI 626 is a thread safe environment, providing multi-threading capability to support multiple channels. Multi-threading provides multiple, simultaneously-executing "threads" within a single application. The benefit of a multi-threaded application is similar to that of a multi-tasked operating system, the application may perform multiple tasks by using separate threads.

In the described exemplary HAPI, an application programming interface (API) 706 receives commands from and issues responses to the MTA call client 620. The API 706 processes incoming packets adding an additional header word to identify the channel which should process the packet as well as other processing parameters such as for example, packet type (i.e. voice or fax), packet length. The API forwards processed API messages 706(a) to a physical interface (firmware layer) 708 that interfaces with the host port of the DSP underlying the voice and data processor so as to isolate the MTA call client software and the signal processing software from the underlying hardware. This methodology allows the software to be ported to various hardware platforms by porting only the hardware interface portions of the HAPI interface 621 to the target hardware. The physical interface 708 formats the message in accordance with the underlying DSP and forwards or transmits the message to the telephony algorithms executing on the DSP.

Similarly, the underlying DSP forwards processed packets, such as, for example, encoded voice packets, to the physical interface 708. The physical interface 708 preferably reformats the response into an API message. When a processed packet is forwarded to the physical interface 708 the underlying DSP also interrupts a APITask Thread 710 that retrieves the processed API messages from the physical interface 708. The APITask Thread 710 determines whether the API message is an event such as, for example, a voice or fax packet or a DTMF detection which are forwarded directly to the MTA call client 710(a), or a response to a command/request from the MTA call client. For example, the MTA call client may command the voice and data processor to turn off the echo canceller. Such a command is preferably processed by the API interface 706 to add the appropriate header word and forwarded to the physical interface 708. The physical interface 708 formats the message in accordance with the underlying DSP and issues the command the underlying voice channel to turn off the echo canceller. When the command has been complied with a response is returned from the underlying DSP to the physical interface 708. The physical interface 708 formats the response into an API message and forwards it to the APITask thread 710 which then forwards it as an API response to the API interface 706. The API interface 706 correlates the API responses received from the APITask thread 710 to the corresponding command/request that prompted the response and forwards a HAPI response to the MTA call client 620.

Figure 27:
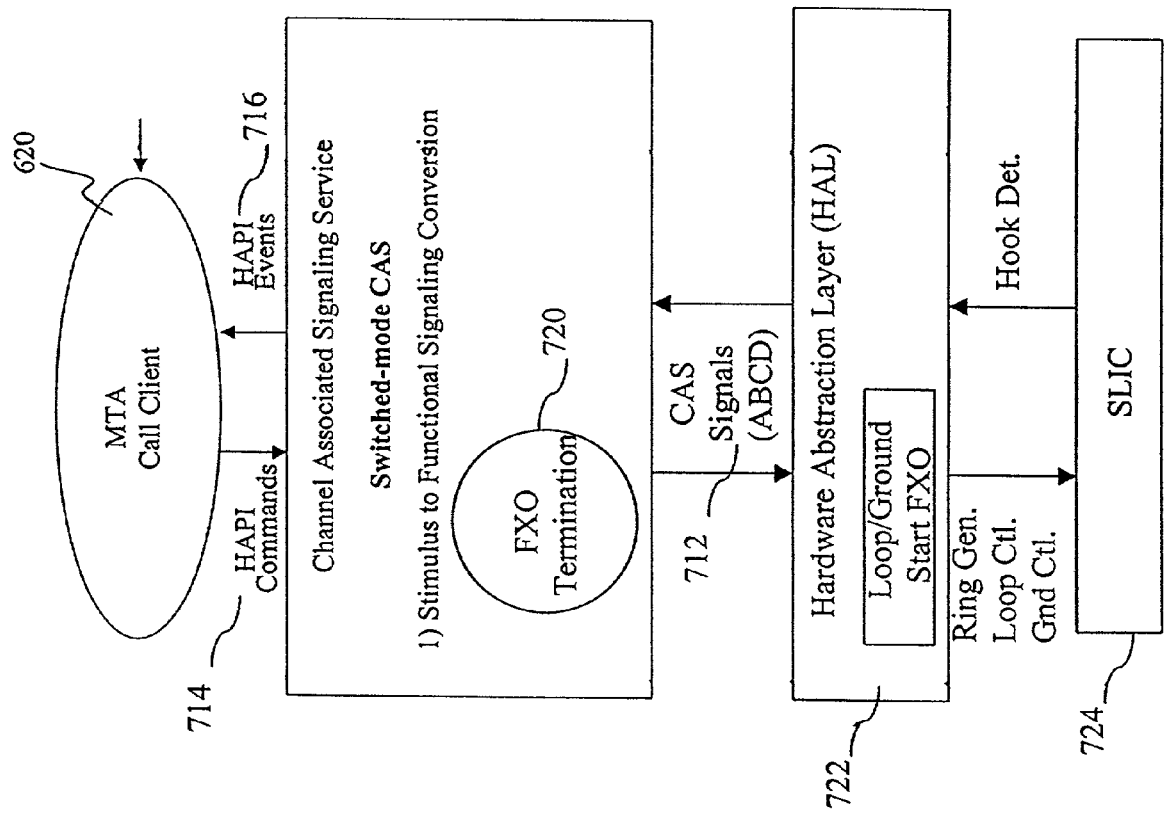
FIG. 27 is a block diagram of channel associated signaling service logic for exchanging commands and events between the host MTA call client and standard commercial analog loop/ground start devices such as for example plain old telephone sets in accordance with a preferred embodiment of the present invention.

Referring to FIG. 27, the described channel associated signaling (CAS) logic 632 utilizes a foreign exchange office (FXO) interface to provide exchange of commands and detection of events between the MTA call client 620 and standard commercial analog loop/ground start devices such as, for example, plain old telephone sets (POTS), group three facsimiles, modems, answering machine or other similar devices. The CAS logic 632 can operate in switch mode, such that ABCD bits 712 are terminated within the CAS logic. The MTA call client interfaces with the CAS logic through high level commands 714 and events 716. For example, if the CAS logic detects a phone going off the hook, a detection event is forwarded to the MTA call client 620 which may then notify the call management server as previously described. The MTA call client is also able to issue high level commands to the CAS logic.

For example, to ring a phone, the MTA call client 620 sends a ring generation profile to the CAS logic, and the command is switched into raw CAS bits by FXO termination logic 720 to control the external interface via a hardware abstraction layer (HAL) 722. Similarly detected events, signaled from the hardware SLIC 724, including on/off hook, flash hook and potentially pulse dial, are returned to the FXO termination logic 720 from the hardware abstraction layer as raw CAS bits. The HAL 722 provides a physical interface to the connected SLIC. The HAL 722 formats message signals in accordance with the underlying SLIC and forwards or transmits the message signal to the connected telephony device via the SLIC 724.

The FXO termination logic 720 preferably verifies the integrity of the detected event and forwards a detected event message to the MTA call client. The FXO termination logic 720 includes a state machine which monitors detected events signaled from the SLIC 724 via the hardware abstraction layer 722. The FXO termination logic 720 qualifies detected events signaled by the SLIC 724 to determine if a valid on/off hook, flash hook or pulse dial has been detected. The FXO termination logic analyzes the period of the received signal to determine valid flash hook or pulse dial conditions. Similarly, the FXO termination logic 720 includes a state machine which associated with the ringing of connected phones. When the MTA call client issues a command to ring a connected phone with a pre-defined cadence and the associated FXO termination state machine will ring the connected phone in accordance with the MTA command.

Figure 28:
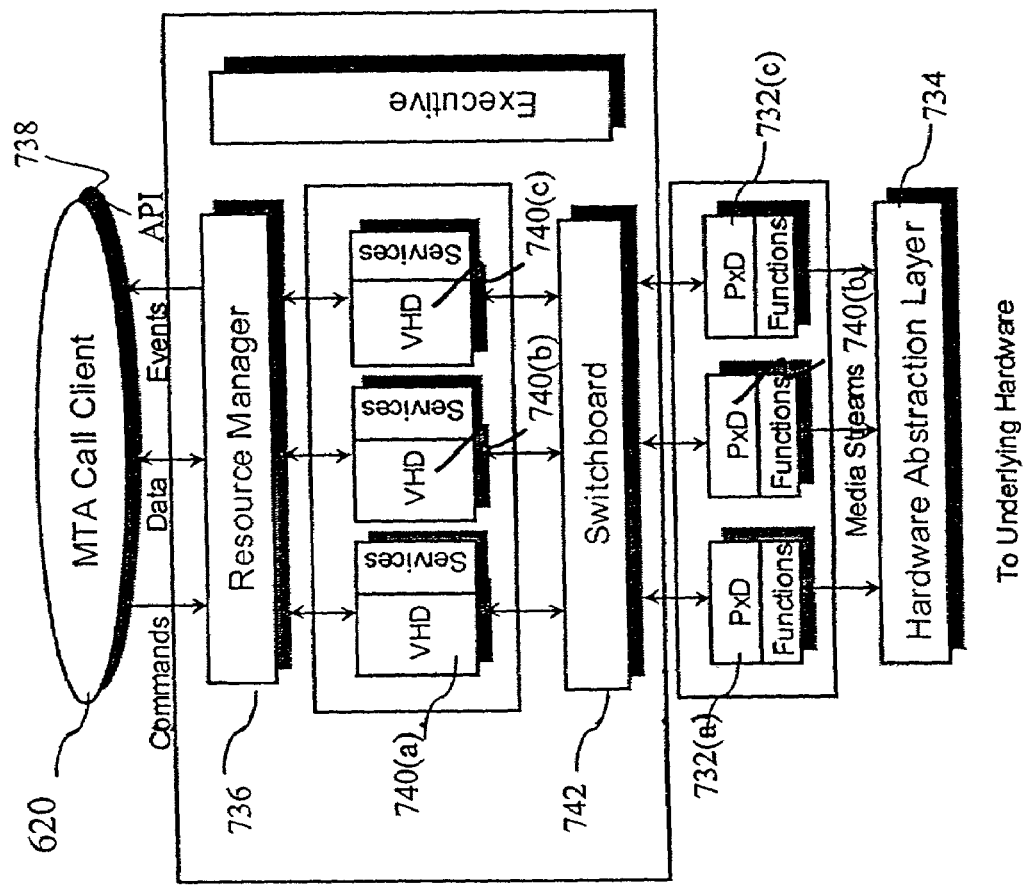
FIG. 28 is a block diagram of the software architecture operating on the DSP platform of FIG. 22 in accordance with a preferred embodiment of the present invention.

The described exemplary voice and data processor is preferably implemented with a programmable DSP software architecture (see FIG. 22). The programmable DSP 600 is effectively hidden within the embedded communications software layer. The software layer binds all core DSP algorithms together, interfaces the DSP hardware to the host, and provides low level services such as the allocation of resources to allow higher level software programs to run. An exemplary multi-layer software architecture loaded into the program memory 602 for execution on the DSP platform is shown in FIG. 28. The MTA call client 620 provides overall executive control and system management, and directly interfaces a DSP server 730 to the host MIPS core (see to FIG. 3). The DSP server 730 provides DSP resource management and telecommunications signal processing. Operating below the DSP server layer are a number of physical devices (PXD) 732a, 732b, 732c. Each PXD provides an interface between the DSP server 730 and an external telephony device (not shown) via a hardware abstraction layer (HAL) 734.

The DSP server 730 includes a resource manager 736 which receives commands from, forwards events to, and exchanges data with the MTA call client 620. The user application layer 736 can either be resident on the DSP 600 or alternatively within the MTA call client. An application programming interface 738 (API) provides a software interface between the user MTA call client 620 and the resource manager 736. The resource manager 736 manages the internal/external program and data memory of the DSP 600. In addition the resource manager dynamically allocates DSP resources, performs command routing as well as other general purpose functions.

The DSP server 730 also includes virtual device drivers (VHDs) 740*a*, 740*b*, 740*c*. The VHDs are a collection of software objects that control the operation of and provide the facility for real time signal processing. Each VHD 740*a*, 740*b*, 740*c* includes an inbound and outbound media queue (not shown) and a library of signal processing services specific to that VHD 740*a*, 740*b*, 740*c*. In the described exemplary embodiment, each VHD 740*a*, 740*b*, 740*c* is a complete self-contained software module for processing a single channel with a number of different telephony devices. Multiple channel capability can be achieved by adding VHDs to the DSP server 730. The resource manager 736 dynamically controls the creation and deletion of VHDs and services.

A switchboard 742 in the DSP server 730 dynamically inter-connects the PXDs 732*a*, 732*b*, 732*c* with the VHDs 740*a*, 740*b*, 740*c*. Each PXD 732*a*, 732*b*, 732*c* is a collection of software objects which provide signal conditioning for one external telephony device. For example, a PXD may provide volume and gain control for signals from a telephony device prior to communication with the switchboard 742. Multiple telephony functionalities can be supported on a single channel by connecting multiple PXDs, one for each telephony device, to a single VHD via the switchboard 742. Connections within the switchboard 742 are managed by the user application layer 738 via a set of API commands to the resource manager 736. The number of PXDs and VHDs is expandable, and limited only by the memory size and the MIPS (millions instructions per second) of the underlying hardware.

A hardware abstraction layer (HAL) 734 interfaces directly with the underlying DSP 600 hardware (see FIG. 22) and exchanges telephony signals between the external telephony devices and the PXDs. The HAL 734 includes basic hardware interface routines, including DSP initialization, target hardware control, codec sampling, and hardware control interface routines. The DSP initialization routine is invoked by the user application layer 738 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 734 is a physical firmware layer that isolates the communications software from the underlying hardware. This methodology allows the communications software to be ported to various hardware platforms by porting only the affected portions of the HAL 734 to the target hardware.

The exemplary software architecture described above can be integrated into numerous telecommunications products. In an exemplary embodiment, the software architecture is designed to support telephony signals between telephony devices (and/or circuit switched networks) and packet based networks. A network VHD (NetVHD) is used to provide a single channel of operation and provide the signal processing services for transparently managing voice, fax, and modem data across a variety of packet based networks. More particularly, the NetVHD encodes and packetizes DTMF, voice, fax, and modem data received from various telephony devices and/or circuit switched networks and transmits the packets to the user application layer. In addition, the NetVHD disassembles DTMF, voice, fax, and modem data from the user application layer, decodes the packets into signals, and transmits the signals to the circuit switched network or device.

Figure 29:
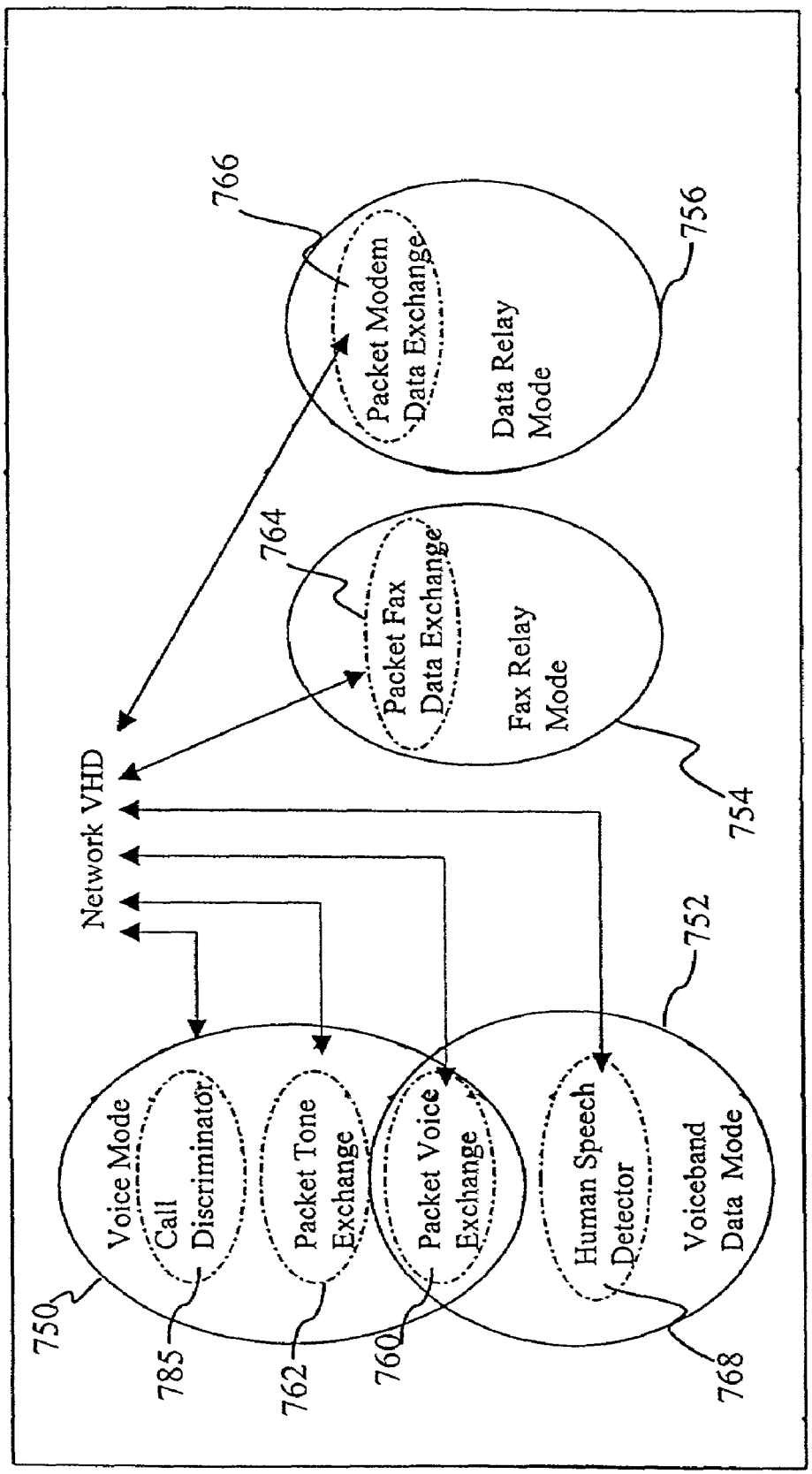
FIG. 29 is state machine diagram of the operational modes of a virtual device driver for packet based network applications in accordance with a preferred embodiment of the present invention.

An exemplary embodiment of the NetVHD operating in the described software architecture is shown in FIG. 29. The NetVHD includes four operational modes, namely voice mode 750, voiceband data mode 752, fax relay mode 754, and data relay mode 756. In each operational mode, the resource manager invokes various services. For example, in the voice mode 750, the resource manager invokes call discrimination 758, packet voice exchange 760, and packet tone exchange 762. The packet voice exchange 760 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP)—Annex A: Reduced complexity 8 kbit/s CS-ACELP speech codec), and G.723 5.3/6.3 kbps (ITU Recommendation G.723.1 (03/96)—Dual rate coder for multimedia communications transmitting at 5.3 and 6.3 kbit/s). The contents of each of the foregoing ITU Recommendations being incorporated herein by reference as if set forth in full.

The packet voice exchange 760 is common to both the voice mode 750 and the voiceband data mode 752. In the voiceband data mode 752, the resource manager invokes the packet voice exchange 760 for exchanging transparently data without modification (other than packetization) between the telephony device (or circuit switched network) and the packet based network. This is typically used for the exchange of fax and modem data when bandwidth concerns are minimal as an alternative to demodulation and remodulation. During the voiceband data mode 752, the human speech detector service 768 is also invoked by the resource manager. The human speech detector 768 monitors the signal from the near end telephony device for speech. In the event that speech is detected by the human speech detector 768, an event is forwarded to the resource manager which, in turn, causes the resource manager to terminate the human speech detector service 768 and invoke the appropriate services for the voice mode 750 (i.e., the call discriminator, the packet tone exchange, and the packet voice exchange).

In the fax relay mode 754, the resource manager invokes a packet fax data exchange 764 service. The packet fax exchange 764 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second. Likewise, the resource manager invokes a packet modem data exchange 766 service in the data relay mode 756. The packet modem data exchange 766 may employ various data pumps including, among others, V.22 bis/V.22 with data rates up to 2400 bits per second, V.32 bis/V.32 which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the user application layer does not need to manage any service directly. The user application layer manages the session using high-level commands directed to the NetVHD, which in turn directly runs the services. However, the user application layer can access more detailed parameters of any service if necessary to change, by way of example, default functions for any particular application.

In operation, the user application layer opens the NetVHD and connects it to the appropriate PXD. The user application then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22 bis, V.32 bis, V.34). The user application layer then loads an appropriate signaling service (not shown) into the NetVHD, configures it and sets the NetVHD to the On-hook state.

In response to events from the signaling service (not shown) via a near end telephony device (hookswitch), or signal packets from the far end, the user application will set the NetVHD to the appropriate off-hook state, typically voice mode. In an exemplary embodiment, if the signaling service event is triggered by the near end telephony device, the packet tone exchange will generate dial tone. Once a DTMF tone is detected, the dial tone is terminated. The DTMF tones are packetized and forwarded to the user application layer for transmission on the packet based network. The packet tone exchange could also play ringing tone back to the near end telephony device (when a far end telephony device is being rung), and a busy tone if the far end telephony device is unavailable. Other tones may also be supported to indicate all circuits are busy, or an invalid sequence of DTMF digits were entered on the near end telephony device.

Once a connection is made between the near end and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode 36 and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

A. The Voice Mode

Voice mode provides signal processing of voice signals. Voice mode enables the transmission of voice over a packet based system such as Voice over IP (VoIP, H.323), Voice over Frame Relay (VoFR, FRF-11), Voice Telephony over ATM (VTOA), or any other proprietary network. The voice mode should also permit voice to be carried over traditional media such as time division multiplex (TDM) networks and voice storage and playback systems.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

Figure 30:
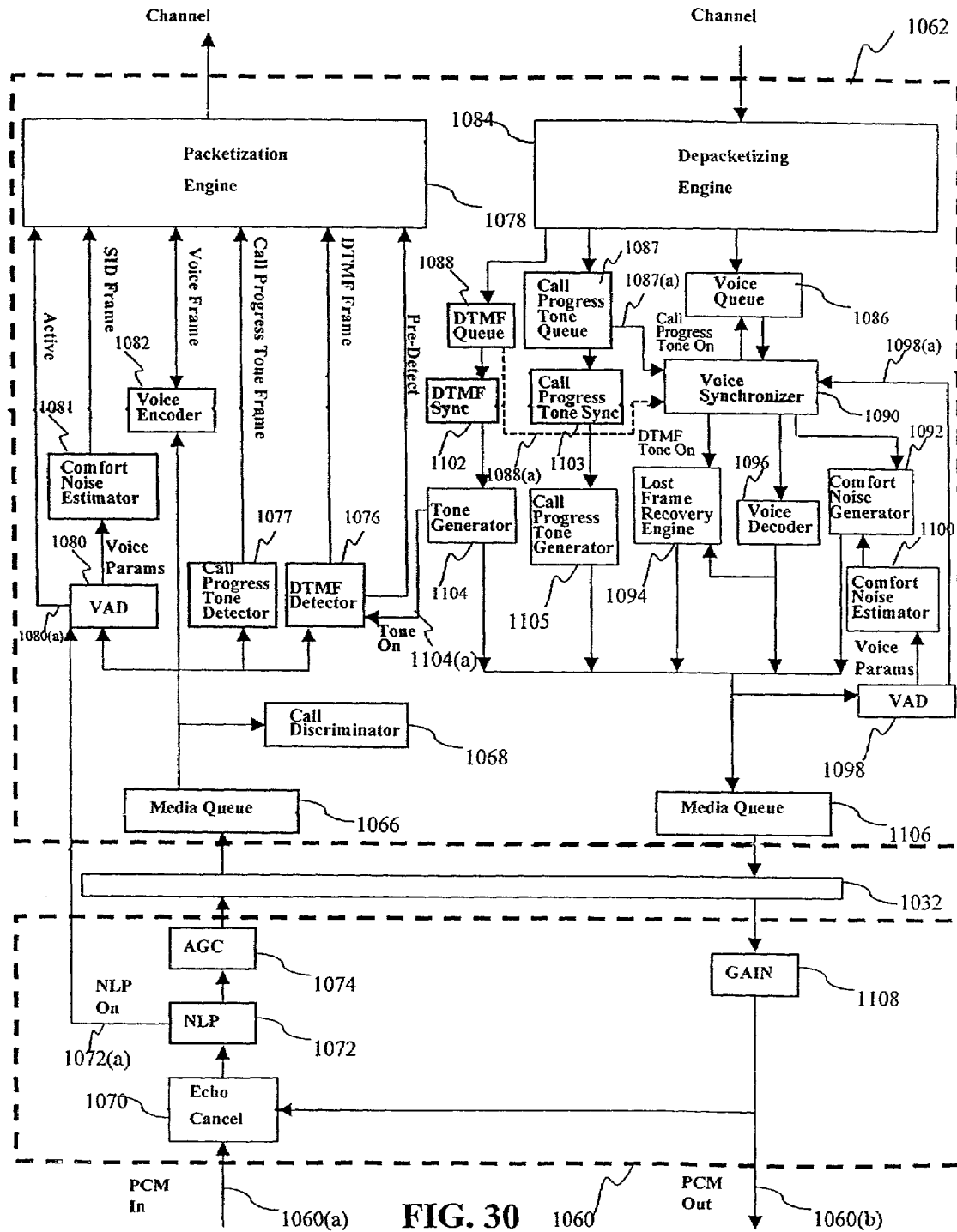
FIG. 30 is a system block diagram of a signal processing system operating in a voice mode in accordance with a preferred embodiment of the present invention.
Figure 31:
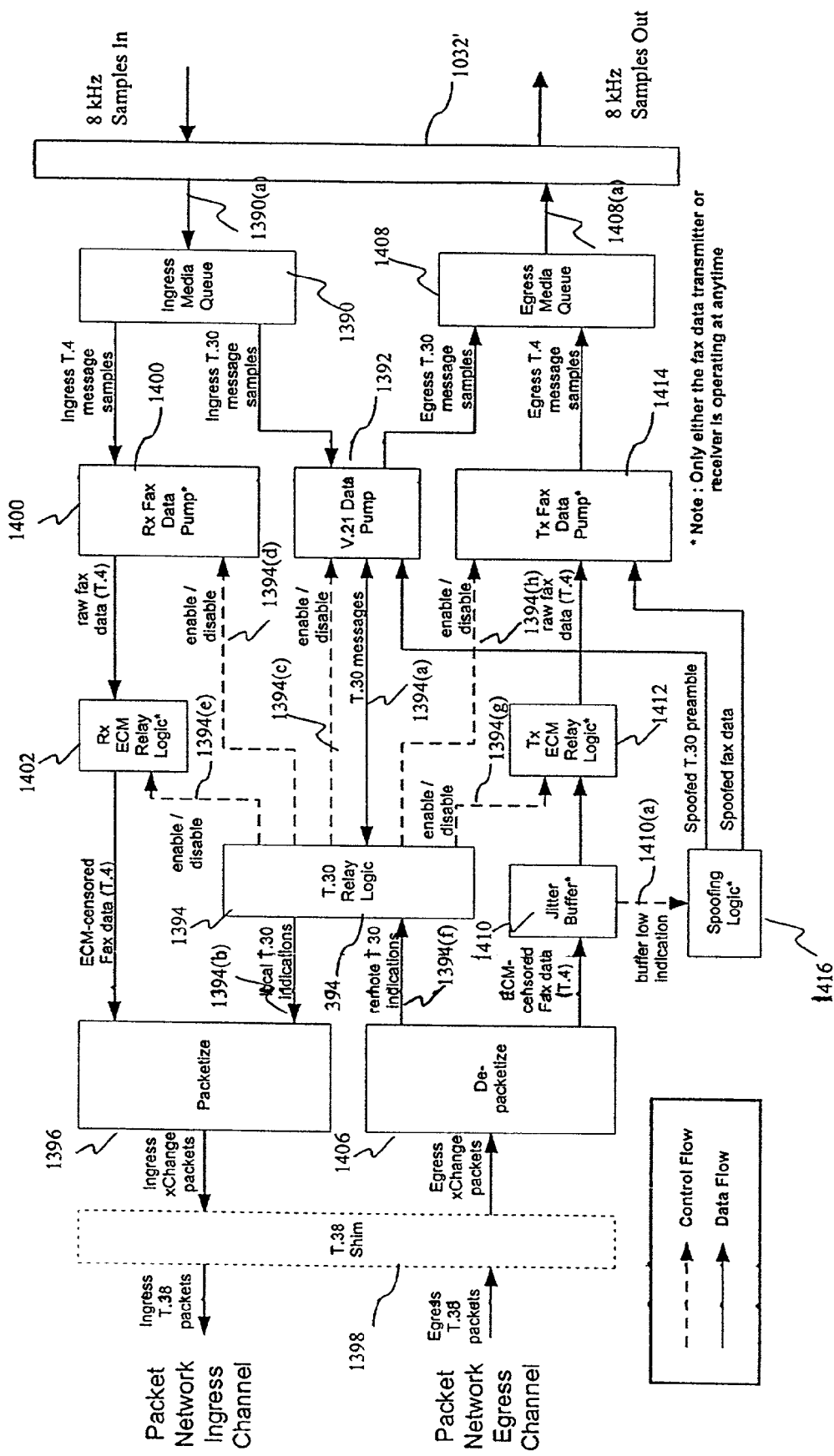
FIG. 31 is a system block diagram of a signal processing system operating in a real time fax relay mode in accordance with a preferred embodiment of the present invention.
Figure 32:
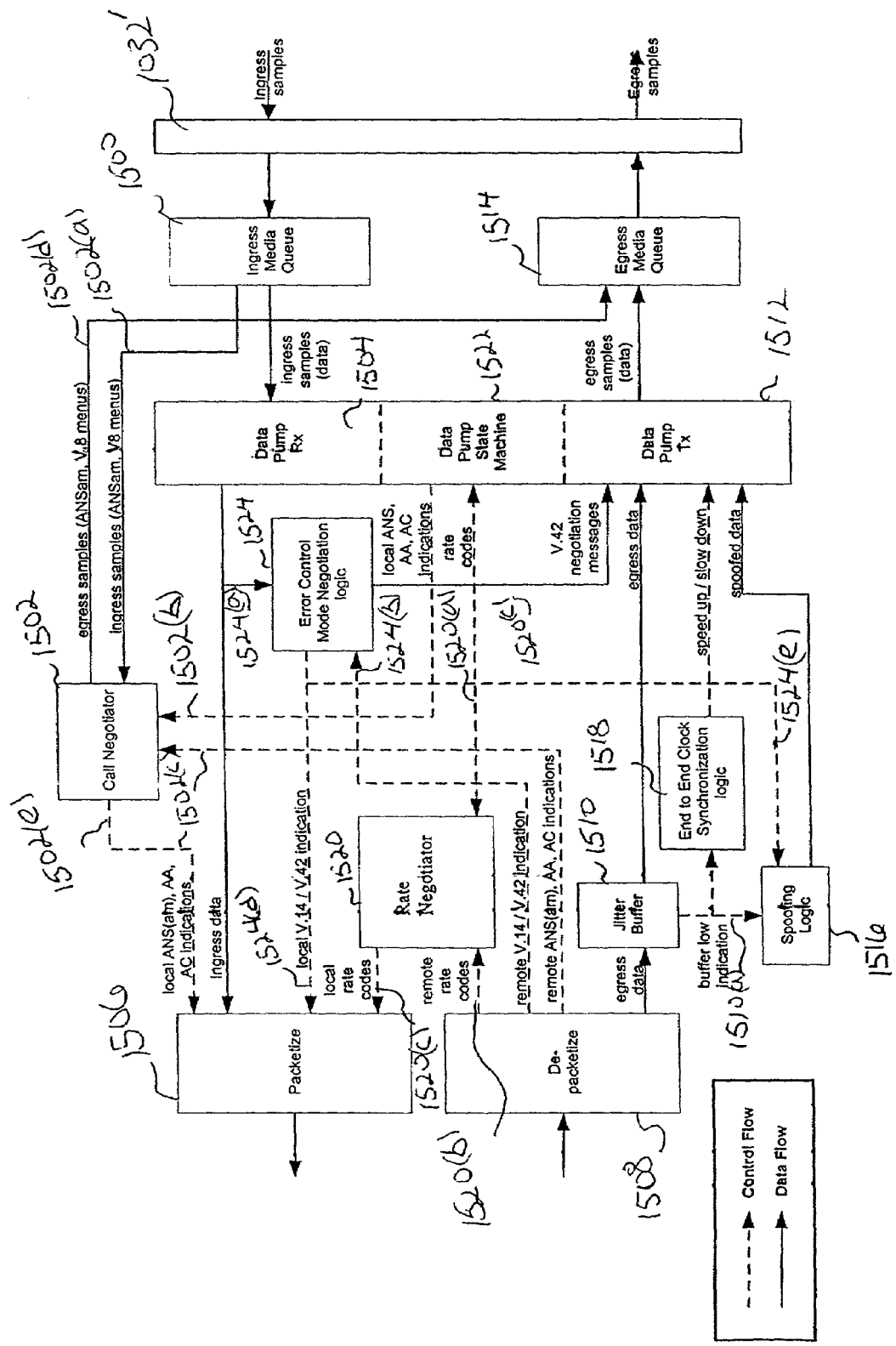
FIG. 32 is a system block diagram of a signal processing system operating in a modem relay mode in accordance with a preferred embodiment of the present invention.

The services invoked by the network VHD in the voice mode and the associated PXD is shown schematically in FIG. 30. In the described exemplary embodiment, the PXD 1060 provides two way communication with a telephone or a circuit switched network, such as a PSTN line (e.g. DS0) carrying a 64 kb/s pulse code modulated (PCM) signal, i.e., digital voice samples.

The incoming PCM signal 1060a is initially processed by the PXD 1060 to remove far end echos. As the name implies, echos in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 1070 is used to remove echos from far end speech present on the incoming PCM signal 1060a before routing the incoming PCM signal 1060a back to the far end user. The echo canceller 1070 samples an outgoing PCM signal 1060b from the far end user, filters it, and combines it with the incoming PCM signal 1060a. Preferably, the echo canceller 1070 is followed by a non-linear processor (NLP) 1072 which may mute the digital voice samples when far end speech is detected in the absence of near end speech. The echo canceller 1070 may also inject comfort noise which in the absence of near end speech may be roughly at the same level as the true background noise or at a fixed level.

After echo cancellation, the power level of the digital voice samples is normalized by an automatic gain control (AGC) 1074 to ensure that the conversation is of an acceptable loudness. Alternatively, the AGC can be performed before the echo canceller 1070, however, this approach would entail a more complex design because the gain would also have to be applied to the sampled outgoing PCM signal 1060b. In the described exemplary embodiment, the AGC 1074 is designed to adapt slowly, although it should adapt fairly quickly if overflow or clipping is detected. The AGC adaptation should be held fixed if the NLP 1072 is activated.

After AGC, the digital voice samples are placed in the media queue 1066 in the network VHD 1062 via the switchboard 32'. In the voice mode, the network VHD 1062 invokes three services, namely call discrimination, packet voice exchange, and packet tone exchange. The call discriminator 1068 analyzes the digital voice samples from the media queue to determine whether a 2100 Hz, a 1100 Hz. tone or V.21 modulated HDLC flags are present. As described above with reference to FIG. 4, if either tone or HDLC flags are detected, the voice mode services are terminated and the appropriate service for fax or modem operation is initiated. In the absence of a 2100 Hz, a 1100 Hz. tone, or HDLC flags, the digital voice samples are coupled to the encoder system which includes a voice encoder 1082, a voice activity detector (VAD) 1080, a comfort noise estimator 1081, a DTMF detector 1076, a call progress tone detector 1077 and a packetization engine 1078.

Typical telephone conversations have as much as sixty percent silence or inactive content. Therefore, high bandwidth gains can be realized if digital voice samples are suppressed during these periods. A VAD 1080, operating under the packet voice exchange, is used to accomplish this function. The VAD 1080 attempts to detect digital voice samples that do not contain active speech. During periods of inactive speech, the comfort noise estimator 1081 couples silence identifier (SID) packets to a packetization engine 1078. The SID packets contain voice parameters that allow the reconstruction of the background noise at the far end.

From a system point of view, the VAD 1080 may be sensitive to the change in the NLP 1072. For example, when the NLP 1072 is activated, the VAD 1080 may immediately declare that voice is inactive. In that instance, the VAD 1080 may have problems tracking the true background noise level. If the echo canceller 1070 generates comfort noise during periods of inactive speech, it may have a different spectral characteristic from the true background noise. The VAD 1080 may detect a change in noise character when the NLP 1072 is activated (or deactivated) and declare the comfort noise as active speech. For these reasons, the VAD 1080 should be disabled when the NLP 1072 is activated. This is accomplished by a "NLP on" message 1072a passed from the NLP 1072 to the VAD 1080.

The voice encoder 1082, operating under the packet voice exchange, can be a straight 16 bit PCM encoder or any voice encoder which supports one or more of the standards promulgated by ITU. The encoded digital voice samples are formatted into a voice packet (or packets) by the packetization engine 1078. These voice packets are formatted according to an applications protocol and outputted to the host (not shown). The voice encoder 1082 is invoked only when digital voice samples with speech are detected by the VAD 1080. Since the packetization interval may be a multiple of an encoding interval, both the VAD 1080 and the packetization engine 1078 should cooperate to decide whether or not the voice encoder 1082 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 1080 passing an "active" flag 1080a to the packetization engine 1078, and the packetization engine 1078 controlling whether or not the voice encoder 1082 is invoked.

In the described exemplary embodiment, the VAD 1080 is applied after the AGC 1074. This approach provides optimal flexibility because both the VAD 1080 and the voice encoder 1082 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 1076 determines whether or not there is a DTMF signal present at the near end. The DTMF detector 1076 also provides a pre-detection flag 1076a which indicates whether or not it is likely that the digital voice sample might be a portion of a DTMF signal. If so, the pre-detection flag 1076a is relayed to the packetization engine 1078 instructing it to begin holding voice packets. If the DTMF detector 1076 ultimately detects a DTMF signal, the voice packets are discarded, and the DTMF signal is coupled to the packetization engine 1078. Otherwise the voice packets are ultimately released from the packetization engine 1078 to the host (not shown). The benefit of this method is that there is only a temporary impact on voice packet delay when a DTMF signal is pre-detected in error, and not a constant buffering delay. Whether voice packets are held while the pre-detection flag 1076a is active could be adaptively controlled by the user application layer.

Similarly, a call progress tone detector 1077 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 1077 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 1062 essentially performs the inverse operation of the encoding system. The decoding system of the network VHD 1062 comprises a depacketizing engine 1084, a voice queue 1086, a DTMF queue 1088, a precision tone queue 1087, a voice synchronizer 1090, a DTMF synchronizer 1102, a precision tone synchronizer 1103, a voice decoder 1096, a VAD 1098, a comfort noise estimator 1100, a comfort noise generator 1092, a lost packet recovery engine 1094, a tone generator 1104, and a precision tone generator 1105.

The depacketizing engine 1084 identifies the type of packets received from the host (i.e., voice packet, DTMF packet, call progress tone packet, SID packet), transforms them into frames which are protocol independent. The depacketizing engine 1084 then transfers the voice frames (or voice parameters in the case of SID packets) into the voice queue 1086, transfers the DTMF frames into the DTMF queue 1088 and transfers the call progress tones into the call progress tone queue 1087. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer for voice includes a voice synchronizer 1090 that operates in conjunction with a voice queue 1086 to provide an isochronous stream of voice frames to the voice decoder 1096.

Sequence numbers embedded into the voice packets at the far end can be used to detect lost packets, packets arriving out of order, and short silence periods. The voice synchronizer 1090 can analyze the sequence numbers, enabling the comfort noise generator 1092 during short silence periods and performing voice frame repeats via the lost packet recovery engine 1094 when voice packets are lost. SID packets can also be used as an indicator of silent periods causing the voice synchronizer 1090 to enable the comfort noise generator 1092. Otherwise, during far end active speech, the voice synchronizer 1090 couples voice frames from the voice queue 1086 in an isochronous stream to the voice decoder 1096. The voice decoder 1096 decodes the voice frames into digital voice samples suitable for transmission on a circuit switched network, such as a 64 kb/s PCM signal for a PSTN line. The output of the voice decoder 1096 (or the comfort noise generator 1092 or lost packet recovery engine 1094 if enabled) is written into a media queue 1106 for transmission to the PXD 1060.

The comfort noise generator 1092 provides background noise to the near end user during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator 1092 from the voice parameters in the SID packets buffered in the voice queue 1086. However, for some protocols, namely, FRF-11, the SID packets are optional, and other far end users may not support SID packets at all. In these systems, the voice synchronizer 1090 must continue to operate properly. In the absence of SID packets, the voice parameters of the background noise at the far end can be determined by running the VAD 1098 at the voice decoder 1096 in series with a comfort noise estimator 1100.

Preferably, the voice synchronizer 1090 is not dependent upon sequence numbers embedded in the voice packet. The voice synchronizer 1090 can invoke a number of mechanisms to compensate for delay jitter in these systems. For example, the voice synchronizer 1090 can assume that the voice queue 1086 is in an underflow condition due to excess jitter and perform packet repeats by enabling the lost frame recovery engine 1094. Alternatively, the VAD 1098 at the voice decoder 1096 can be used to estimate whether or not the underflow of the voice queue 1086 was due to the onset of a silence period or due to packet loss. In this instance, the spectrum and/or the energy of the digital voice samples can be estimated and the result 1098a fed back to the voice synchronizer 1090. The voice synchronizer 1090 can then invoke the lost packet recovery engine 1094 during voice packet losses and the comfort noise generator 1092 during silent periods.

When DTMF packets arrive, they are depacketized by the depacketizing engine 1084. DTMF frames at the output of the depacketizing engine 1084 are written into the DTMF queue 1088. The DTMF synchronizer 1102 couples the DTMF frames from the DTMF queue 1088 to the tone generator 1104. Much like the voice synchronizer, the DTMF synchronizer 1102 is employed to provide an isochronous stream of DTMF frames to the tone generator 1104. Generally speaking, when DTMF packets are being transferred, voice frames should be suppressed. To some extent, this is protocol dependent. However, the capability to flush the voice queue 1086 to ensure that the voice frames do not interfere with DTMF generation is desirable. Essentially, old voice frames which may be queued are discarded when DTMF packets arrive. This will ensure that there is a significant inter-digit gap before DTMF tones are generated. This is achieved by a "tone present" message 1088a passed between the DTMF queue and the voice synchronizer 1090.

The tone generator 1104 converts the DTMF signals into a DTMF tone suitable for a standard digital or analog telephone. The tone generator 1104 overwrites the media queue 1106 to prevent leakage through the voice path and to ensure that the DTMF tones are not too noisy.

There is also a possibility that DTMF tone may be fed back as an echo into the DTMF detector 1076. To prevent false detection, the DTMF detector 1076 can be disabled entirely (or disabled only for the digit being generated) during DTMF tone generation. This is achieved by a "tone on" message 1104a passed between the tone generator 1104 and the DTMF detector 1076. Alternatively, the NLP 1072 can be activated while generating DTMF tones.

When call progress tone packets arrive, they are depacketized by the depacketizing engine 1084. Call progress tone frames at the output of the depacketizing engine 1084 are written into the call progress tone queue 1087. The call progress tone synchronizer 1103 couples the call progress tone frames from the call progress tone queue 1087 to a call progress tone generator 1105. Much like the DTMF synchronizer, the call progress tone synchronizer 1103 is employed to provide an isochronous stream of call progress tone frames to the call progress tone generator 1105. And much like the DTMF tone generator, when call progress tone packets are being transferred, voice frames should be suppressed. To some extent, this is protocol dependent. However, the capability to flush the voice queue 1086 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 1087a passed between the call progress tone queue 1087 and the voice synchronizer 1090.

The call progress tone generator 1105 converts the call progress tone signals into a call progress tone suitable for a standard digital or analog telephone. The call progress tone generator 1105 overwrites the media queue 1106 to prevent leakage through the voice path and to ensure that the call progress tones are not too noisy.

The outgoing PCM signal in the media queue 1106 is coupled to the PXD 1060 via the switchboard 1032'. The outgoing PCM signal is coupled to an amplifier 1108 before being outputted on the PCM output line 1060b.

An exemplary voice signal processor is disclosed U.S. patent application Ser. No. 09/522,185, entitled "Voice and Data Exchange Over a Packet Based Network," the contents of which is hereby incorporated by reference as though fully set forth herein.

B. The Fax Relay Mode

Fax relay mode provides signal processing of fax signals. Fax relay mode enables the transmission of fax signals over a packet based system such as VoIP, VoFR, FRF-11, VTOA, or any other proprietary network. For the purposes of explanation, first fax machine is called a sending fax that is connected to the sending network gateway 1378a through a PSTN. The sending network gateway is connected to a CMTS via a HFC network. Additional fax machines may be on line connections coupled to the other end of the CMTS via a network gateway and a HFC network, or off line connections, coupled to the CMTS for example by a telephone network gateway and a PSTN.

The transfer of fax signals over packet based networks may be accomplished by at least three alternative methods. In the first method, fax data signals are exchanged in real time. Typically, the sending and receiving fax machines are spoofed to allow transmission delays plus jitter of up to about 1.2 seconds. The second, store and forward mode, is a non real time method of transferring fax data signals. Typically, the fax communication is transacted locally, stored into memory and transmitted to the destination fax machine at a subsequent time. The third mode is a combination of store and forward mode with minimal spoofing to provide an approximate emulation of a typical fax connection.

In the fax relay mode, the network VHD invokes the packet fax data exchange. The packet fax data exchange provides demodulation and re-modulation of fax data signals. This approach results in considerable bandwidth savings since only the underlying unmodulated data signals are transmitted across the packet based network. The packet fax data exchange also provides compensation for network jitter with a jitter buffer similar to that invoked in the packet voice exchange. Additionally, the packet fax data exchange compensates for lost data packets with error correction processing. Spoofing may also be provided during various stages of the procedure between the fax machines to keep the connection alive.

The packet fax data exchange is divided into two basic functional units, a demodulation system and a re-modulation system. In the demodulation system, the network VHD couples fax data signals from a circuit switched network, or a fax machine, to the packet based network. In the re-modulation system, the network VHD couples fax data signals from the packet network to the switched circuit network, or a fax machine directly.

During real time relay of fax data signals over a packet based network, the sending and receiving fax machines are spoofed to accommodate network delays plus jitter. Typically, the packet fax data exchange can accommodate a total delay of up to about 1.2 seconds. Preferably, the packet fax data exchange supports error correction mode (ECM) relay functionality, although a full ECM implementation is typically not required. In addition, the packet fax data exchange should preferably preserve the typical call duration required for a fax session over a PSTN/ISDN when exchanging fax data signals between two terminals.

The packet fax data exchange for the real time exchange of fax data signals between a circuit switched network and a packet based network is shown schematically in FIG. 46. In this exemplary embodiment, a connecting PXD (not shown) connecting the fax machine to the switch board 1032' is transparent, although those skilled in the art will appreciate that various signal conditioning algorithms could be programmed into PXD such as echo cancellation and gain.

After the PXD (not shown), the incoming fax data signal 1390*a* is coupled to the demodulation system of the packet fax data exchange operating in the network VHD via the switchboard 1032'. The incoming fax data signal 1390*a* is received and buffered in an ingress media queue 1390. A V.21 data pump 1392 demodulates incoming T.30 message so that T.30 relay logic 1394 can decode the received T.30 messages 1394*a*. Local T.30 indications 1394*b* are packetized by a packetization engine 1396 and if required, translated into T.38 packets via a T.38 shim 1398 for transmission to a T.38 compliant remote network gateway (not shown) across the packet based network. The V.21 data pump 1392 is selectively enabled/disabled 1394*c* by the T.30 relay logic 1394 in accordance with the reception/ transmission of the T.30 messages or fax data signals. The V.21 data pump 1392 is common to the demodulation and re-modulation system. The V.21 data pump 1392 communicates T.30 messages such as for example called station tone (CED) and calling station tone (CNG) to support fax setup between a local fax device (not shown) and a remote fax device (not shown) via the remote network gateway.

The demodulation system further includes a receive fax data pump 1400 which demodulates the fax data signals during the data transfer phase. The receive fax data pump 1400 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The V.34 fax standard, once approved, may also be supported. The T.30 relay logic 1394 enables/disables 1394*d* the receive fax data pump 1400 in accordance with the reception of the fax data signals or the T.30 messages.

If error correction mode (ECM) is required, receive ECM relay logic 1402 performs high level data link control( HDLC )de-framing, including bit de-stuffing and preamble removal on ECM frames contained in the data packets. The resulting fax data signals are then packetized by the packetization engine 1396 and communicated across the packet based network. The T.30 relay logic 1394 selectively enables/disables 1394*e* the receive ECM relay logic 1402 in accordance with the error correction mode of operation.

In the re-modulation system, if required, incoming data packets are first translated from a T.38 packet format to a protocol independent format by the T.38 packet shim 1398. The data packets are then de-packetized by a depacketizing engine 1406. The data packets may contain T.30 messages or fax data signals. The T.30 relay logic 1394 reformats the remote T.30 indications 1394*f* and forwards the resulting T.30 indications to the V.21 data pump 1392. The modulated output of the V.21 data pump 1392 is forwarded to an egress media queue 1408 for transmission in either analog format or after suitable conversion, as 64 kbps PCM samples to the local fax device over a circuit switched network, such as for example a PSTN line.

De-packetized fax data signals are transferred from the depacketizing engine 1406 to a jitter buffer 1410. If error correction mode (ECM) is required, transmitting ECM relay logic 1412 performs HDLC de-framing, including bit stuffing and preamble addition on ECM frames. The transmitting ECM relay logic 1412 forwards the fax data signals, (in the appropriate format) to a transmit fax data pump 1414 which modulates the fax data signals and outputs 8 KHz digital samples to the egress media queue 1408. The T.30 relay logic selectively enables/disables (1394*g*) the transmit ECM relay logic 1412 in accordance with the error correction mode of operation.

The transmit fax data pump 1414 supports the V.27 ter standard for fax data signal transfer at 2400/4800 bps, the V.29 standard for fax data signal transfer at 7200/9600 bps, as well as the V.17 standard for fax data signal transfer at 7200/9600/12000/14400 bps. The T.30 relay logic selectively enables/disables (1394*h*) the transmit fax data pump 1414 in accordance with the transmission of the fax data signals or the T.30 message samples.

If the jitter buffer 1410 underflows, a buffer low indication 1410a is coupled to spoofing logic 1416. Upon receipt of a buffer low indication during the fax data signal transmission, the spoofing logic 1416 inserts "spoofed data" at the appropriate place in the fax data signals via the transmit fax data pump 1414 until the jitter buffer 1410 is filled to a predetermined level, at which time the fax data signals are transferred out of the jitter buffer 1410. Similarly, during the transmission of the T.30 message indications, the spoofing logic 1416 can insert "spoofed data" at the appropriate place in the T.30 message samples via the V.21 data pump 1392.

An exemplary fax relay is disclosed U.S. patent application Ser. No. 09/522,185, entitled "Voice and Data Exchange Over a Packet Based Network," the contents of which has been previously incorporated herein by reference.

C. Data Relay Mode

Data relay mode provides full duplex signal processing of data signals. Data relay mode enables the transmission of data signals over a packet based system such as VoIP, VoFR, FRF-11, VTOA, or any other proprietary network. The data relay mode should also permit data signals to be carried over traditional media such as TDM. Network gateways, support the exchange of data signals other network gateways via a HFC network and CMTS or off line devices via for example a circuit switched network such as the PSTN. For the purposes of explanation, the first modem is referred to as a call modem. Far end modems are typically called answer modems.

In data relay mode, a local modem connection is established on each end of the packet based network 1494. That is, the call modem 1492a and the call network gateway 496a establish a local modem connection, as does the destination answer modem1 492b and its respective answer network gateway 1496b. Next, data signals are relayed across the packet based network 1494. The call network gateway 1496a demodulates the data signal and formats the demodulated data signal for the particular packet based network 1494. The answer network gateway 1496b compensates for network impairments and remodulates the encoded data in a format suitable for the destination answer modem 1492b. This approach results in considerable bandwidth savings since only the underlying demodulated data signals are transmitted across the packet based network.

In the data relay mode, the packet data modem exchange provides demodulation and modulation of data signals. With full duplex capability, both modulation and demodulation of data signals can be performed simultaneously. The packet data modem exchange also provides compensation for network jitter with a jitter buffer similar to that invoked in the packet voice exchange. Additionally, the packet data modem exchange compensates for system clock jitter between modems with a dynamic phase adjustment and resampling mechanism. Spoofing may also be provided during various stages of the call negotiation procedure between the modems to keep the connection alive.

The packet data modem exchange invoked by the network VHD in the data relay mode is shown schematically in FIG. 49. In the described exemplary embodiment, a connecting PXD (not shown) connecting a modem to the switch board 1032' is transparent, although those skilled in the art will appreciate that various signal conditioning algorithms could be programmed into the PXD such as filtering, echo cancellation and gain.

After the PXD, the data signals are coupled to the network VHD via the switchboard 1032'. The packet data modem exchange provides two way communication between a circuit switched network and packet based network with two basic functional units, a demodulation system and a remodulation system. In the demodulation system, the network VHD exchanges data signals from a circuit switched network, or a telephony device directly, to a packet based network. In the remodulation system, the network VHD exchanges data signals from the packet based network to the PSTN line, or the telephony device.

In the demodulation system, the data signals are received and buffered in an ingress media queue 1500. A data pump receiver 1504 demodulates the data signals from the ingress media queue 1500. The data pump receiver 1504 supports the V.22 bis standard for the demodulation of data signals at 1200/2400 bps; the V.32 bis standard for the demodulation of data signals at 4800/7200/9600/12000/14400 bps, as well as the V.34 standard for the demodulation of data signals up to 33600 bps. Moreover, the V.90 standard may also be supported. The demodulated data signals are then packetized by the packetization engine 1506 and transmitted across the packet based network.

In the remodulation system, packets of data signals from the packet based network are first depacketized by a depacketizing engine 1508 and stored in a jitter buffer 1510. A data pump transmitter 1512 modulates the buffered data signals with a voiceband carrier. The modulated data signals are in turn stored in the egress media queue 1514 before being output to the PXD (not shown) via the switchboard 1032'. The data pump transmitter 1512 supports the V.22 bis standard for the transfer of data signals at 1200/2400 bps; the V.32 bis standard for the transfer of data signals at 4800/7200/9600/12000/14400 bps, as well as the V.34 standard for the transfer of data signal up to 33600 bps. Moreover, the V.90 standard may also be supported.

During jitter buffer underflow, the jitter buffer 1510 sends a buffer low indication 1510a to spoofing logic 1516. When the spoofing logic 1516 receives the buffer low signal indicating that the jitter buffer 1510 is operating below a predetermined threshold level, it inserts spoofed data at the appropriate place in the data signal via the data pump transmitter 1512. Spoofing continues until the jitter buffer 1510 is filled to the predetermined threshold level, at which time data signals are again transferred from the jitter buffer 1510 to the data pump transmitter 1512.

End to end clock logic 1518 also monitors the state of the jitter buffer 1510. The clock logic 1518 controls the data transmission rate of the data pump transmitter 1512 in correspondence to the state of the jitter buffer 1510. When the jitter buffer 1510 is below a predetermined threshold level, the clock logic 1518 reduces the transmission rate of the data pump transmitter 1512. Likewise, when the jitter buffer 1510 is above a predetermined threshold level, the clock logic 1518 increases the transmission rate of the data pump transmitter 1512.

Before the transmission of data signals across the packet Abased network, the connection between the two modems must first be negotiated through a handshaking sequence. This entails a two-step process. First, a call negotiator 1502 determines the type of modem (i.e., V.22, V.32bis, V.34, V.90, etc.) connected to each end of the packet based network. Second, a rate negotiator 1520 negotiates the data signal transmission rate between the two modems.

The call negotiator 1502 determines the type of modem connected locally, as well as the type of modem connected remotely via the packet based network. The call negotiator 1502 utilizes V.25 automatic answering procedures and V.8 auto-baud software to automatically detect modem capability. The call negotiator 1502 receives protocol indication signals 1502*a* (ANSam and V.8 menus) from the ingress media queue 1500, as well as AA, AC and other message indications 1502*b* from the local modem via a data pump state machine 1522, to determine the type of modem in use locally. The call negotiator 1502 relays the ANSam answer tones and other indications 1502*e* from the data pump state machine 1522 to the remote modem via a packetization engine 1506. The call negotiator also receives ANSam, AA, AC and other indications 1502*c* from a remote modem (not shown) located on the opposite end of the packet based network via a depacketizing engine 1508. The call negotiator 1502 relays ANSam answer tones and other indications 1502*d* to a local modem (not shown) via an egress media queue 1514 of the modulation system. With the ANSam, AA, AC and other indications from the local and remote modems, the call negotiator 1502 can then negotiate a common standard (i.e., V.22, V.32 bis, V.34, V.90, etc.) in which the data pumps must communicate with the local modem and the remote modems.

The packet data modem exchange preferably utilizes indication packets as a means for communicating answer tones, AA, AC and other indication signals across the packet based network However, the packet data modem exchange supports data pumps such as V.22 bis and V.32 bis which do not include a well defined error recovery mechanism, so that the modem connection may be terminated whenever indication packets are lost. Therefore, either the packet data modem exchange or the application layer should ensure proper delivery of indication packets when operating in a network environment that does not guarantee packet delivery.

The packet data modem exchange can ensure delivery of the indication packets by periodically retransmitting the indication packet until some expected packets are received. For example, in V.32 bis relay, the call negotiator operating under the packet data modem exchange on the answer network gateway periodically retransmits ANSam answer tones from the answer modem to the call modem, until the calling modem connects to the line and transmits carrier state AA.

Alternatively, the packetization engine can embed the indication information directly into the packet header. In this approach, an alternate packet format is utilized to include the indication information. During modem handshaking, indication packets transmitted across the packet based network include the indication information, so that the system does not rely on the successful transmission of individual indication packets. Rather, if a given packet is lost, the next arriving packet contains the indication information in the packet header. Both methods increase the traffic across the network. However, it is preferable to periodically retransmit the indication packets because it has less of a detrimental impact on network traffic.

A rate negotiator 1520 synchronizes the connection rates at the network gateways 1496*a*, 1496*b*, 1496*c* (see FIG. 49). The rate negotiator receives rate control codes 1520*a* from the local modem via the data pump state machine 1522 and rate control codes 1520*b* from the remote modem via the depacketizing engine 1508. The rate negotiator 1520 also forwards the remote rate control codes 1520*a* received from the remote modem to the local modem via commands sent to the data pump state machine 1522. The rate negotiator 1520 forwards the local rate control codes 520*c* received from the local modem to the remote modem via the packetization engine 1506. Based on the exchanged rate codes the rate negotiator 1520 establishes a common data rate between the calling and answering modems. During the data rate exchange procedure, the jitter buffer 1510 should be disabled by the rate negotiator 1520 to prevent data transmission between the call and answer modems until the data rates are successfully negotiated.

Similarly error control (V.42) and data compression (V.42bis) modes should be synchronized at each end of the packet based network. Error control logic 1524 receives local error control messages 1524*a* from the data pump receiver 1504 and forwards those V.14/V.42 negotiation messages 1524*c* to the remote modem via the packetization engine 1506. In addition, error control logic 1524 receives remote V.14/V.42 indications 1524*b* from the depacketizing engine 1508 and forwards those V.14/V.42 indications 1524*d* to the local modem. With the V.14/V.42 indications from the local and remote modems, the error control logic 1524 can negotiate a common standard to ensure that the network gateways utilize a common error protocol. In addition, error control logic 1524, communicates the negotiated error control protocol 1524(*e*) to the spoofing logic 1516 to ensure data mode spoofing is in accordance with the negotiated error control mode.

V.42 is a standard error correction technique using advanced cyclical redundancy checks and the principle of automatic repeat requests (ARQ). In accordance with the V.42 standard, transmitted data signals are grouped into blocks and cyclical redundancy calculations add error checking words to the transmitted data signal stream. The receiving modem calculates new error check information for the data signal block and compares the calculated information to the received error check information. If the codes match, the received data signals are valid and another transfer takes place. If the codes do not match, a transmission error has occurred and the receiving modem requests a repeat of the last data block. This repeat cycle continues until the entire data block has been received without error.

Various voiceband data modem standards exist for error correction and data compression. V.42 bis and MNP5 are examples of data compression standards. The handshaking sequence for every modem standard is different so that the packet data modem exchange should support numerous data transmission standards as well as numerous error correction and data compression techniques.

An exemplary data relay is disclosed U.S. patent application Ser. No. 09/522,185, entitled "Voice and Data Exchange Over a Packet Based Network," the contents of which has been previously incorporated herein by reference.

Although a preferred embodiment of the present invention has been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of synchronizing data sampled by a first clock to a second clock, comprising:

periodically generating a data received flag as a function of said first clock and a data complete flag as a function of said second clock;

generating a clock error signal as a function of said data received and data complete flags; and fractionally resampling the data as a function of the clock error signal, wherein the clock error signal generation comprises counting at least a portion of a period between data receive flags and counting at least a portion of a period between data complete flags, the fractional resampling being a function of ratio of counts.

2. The method of claim 1 wherein the data comprises voice.

3. The method of claim 1 further comprising receiving the data sampled with the first clock, wherein the received data is partitioned into a plurality of data packets, and wherein said data received flag is generated upon receipt of each of the data packets.

4. The method of claim 3 buffering said received data packets as a function of said first clock and outputting said received data packets from said buffer as a function of said second clock, wherein said data complete flag is generated when each data packet is output from the buffer.

5. The method of claim 1 further comprising filtering the data receive count and the data complete count, the data resampling being a function of the filtered counts.

6. The method of claim 5 further comprising subtracting said filtered data receive count and said filtered data complete count, the data resampling being a function of the difference between counts.

7. The method of claim 6 wherein the fractional resampling comprises upsampling the data if the data received count exceeds the data complete count and downsampling the data if the data complete count exceeds the data received count.

8. The method of claim 1 further comprising generating a third clock, wherein the data receive count and data complete clock count comprises incrementing the count using the third clock.

9. A synchronization circuit, comprising:
an error generation unit that generates a clock error signal as a; and
a sample tracker adapted to receive sampled data packets, wherein the sample tracker fractionally resamples the sampled data as a function of the clock error signal, wherein said error generation unit comprises one or more counters incremented by a local reference clock, a first latch adapted to store count of at least a portion of a cycle between packet arrivals, a second latch adapted to store at least a portion of a cycle between packet completions, wherein said clock error signal is a function of ratio of packet arrival count and packet completion count.

10. The synchronization circuit of claim 9 wherein the sample tracker upsamples the data if the packet arrival count exceeds the packet completion count and downsamples the data if the packet completion count exceeds the packet arrival count.

11. The synchronization circuit of claim 9 further comprising a filter between the first latch and the sample tracker for averaging transition between different sampling rates.

12. The synchronization circuit of claim 11 wherein the filter is a single pole, low pass filter.

13. The synchronization circuit of claim 9 further comprising a digital-to-analog converter to convert the fractionally resampled data to an analog voice signal.

14. The synchronization circuit of claim 9 further comprising a processor to activate the first latch each time a packet of sampled data is received.

15. A network gateway adapted to exchange voice signals between a network line at a first clock frequency and a packet based network at a second clock frequency, comprising:
a network port to interface with the packet based network;
a telephony port to interface with a telephony device;
a processor coupled to each of the ports; and
a voice synchronizer coupled between said network and telephony ports and comprising an error generation unit for generating a clock error signal in accordance with ratio of said first and second clocks and a sample tracker, and adapted to receive data packets, wherein the sample tracker fractionally resamples the received data as a function of the clock error signal.

16. The network gateway of claim 15 further comprising a transceiver coupled between the processor and the network port.

17. The network gateway of claim 16 wherein the transceiver comprises a media access controller (MAC) coupled to the processor, and a modulator and a demodulator both disposed between the MAC and the network port.

18. The network gateway of claim 15 further comprising a voice circuit coupled between the telephony port and the processor.

19. The network gateway of claim 18 wherein the voice circuit formats voice signals flowing from the telephony port to the processor into voice signal packets, and formats voice signals flowing from the processor to the telephony port into a telephony format.

20. The network gateway of claim 19 wherein the telephony format comprises pulse code modulation.

21. The network gateway of claim 15 wherein said error generation unit comprises one or more counters incremented by a local reference clock, a first latch adapted to store count of at least a portion of a cycle between packet arrivals, a second latch adapted to store at least a portion of a cycle between packet completions, wherein said clock error signal is a function of ratio of packet arrival count and packet completion count.

22. The network gateway of claim 21 wherein the sample tracker upsamples the data if the packet arrival count exceeds the packet completion count and downsamples the data if the packet completion count exceeds the packet arrival count.

23. The network gateway of claim 21 further comprising a filter between the first latch and the sample tracker for averaging transition between different sampling rates.

24. The network gateway of claim 23 wherein the filter is a single pole, low pass filter.

25. The network gateway of claim 21 further comprising a digital-to-analog converter to convert the fractionally resampled data to an analog voice signal.

26. The network gateway of claim 21 further comprising a processor to activate the first latch each time a packet of sampled data is received.

* * * * *